(12) United States Patent
Song et al.

(10) Patent No.: US 12,533,198 B2
(45) Date of Patent: Jan. 27, 2026

(54) SURGICAL ROBOT ARM

(71) Applicant: LIVSMED INC., Seongnam-si (KR)

(72) Inventors: Youngjae Song, Seongnam-si (KR); Jung Joo Lee, Seongnam-si (KR); Heejin Kim, Seongnam-si (KR); Dongkyu Jang, Seongnam-si (KR)

(73) Assignee: LIVSMED INC., Seongnam-si (KR)

( * ) Notice: Subject to any disclaimer, the term of this patent is extended or adjusted under 35 U.S.C. 154(b) by 114 days.

(21) Appl. No.: 18/641,860

(22) Filed: Apr. 22, 2024

(65) Prior Publication Data

US 2024/0268906 A1 Aug. 15, 2024

Related U.S. Application Data

(63) Continuation of application No. PCT/KR2022/016253, filed on Oct. 24, 2022.

(30) Foreign Application Priority Data

Oct. 22, 2021 (KR) .......................... 10-2021-0142218

(51) Int. Cl.
  *A61B 34/30* (2016.01)
  *A61B 90/50* (2016.01)
(52) U.S. Cl.
  CPC .............. *A61B 34/30* (2016.02); *A61B 90/50* (2016.02); *A61B 2034/306* (2016.02); *A61B 2090/506* (2016.02)

(58) Field of Classification Search
  CPC .............. A61B 34/20; A61B 34/30–37; A61B 34/70–77; A61B 2034/2046–2074; A61B 2034/301–306; A61B 2034/715–744; B25J 18/00–06
  See application file for complete search history.

(56) References Cited

U.S. PATENT DOCUMENTS

| 7,822,466 | B2 | 10/2010 | Stoianovici et al. |
| 2003/0221504 | A1* | 12/2003 | Stoianovici .............. B25J 9/104 74/490.04 |
| 2014/0276953 | A1* | 9/2014 | Swarup .................. A61B 50/13 606/130 |
| 2019/0202066 | A1 | 7/2019 | Maret |
| 2021/0015519 | A1 | 1/2021 | Meglan et al. |

FOREIGN PATENT DOCUMENTS

| KR | 10-2012-0014758 A | 2/2012 |
| KR | 10-2019-0140818 A | 12/2019 |

* cited by examiner

*Primary Examiner* — Elizabeth Houston
(74) *Attorney, Agent, or Firm* — Bridgeway IP Law Group, PLLC; Sang Ho Lee; Hyun Woo Shin

(57) ABSTRACT

Provided is a surgical robot arm, and more particularly, a minimally invasive surgical robot arm formed in a modular form to be used in laparoscopic surgery or various other surgeries.

24 Claims, 41 Drawing Sheets

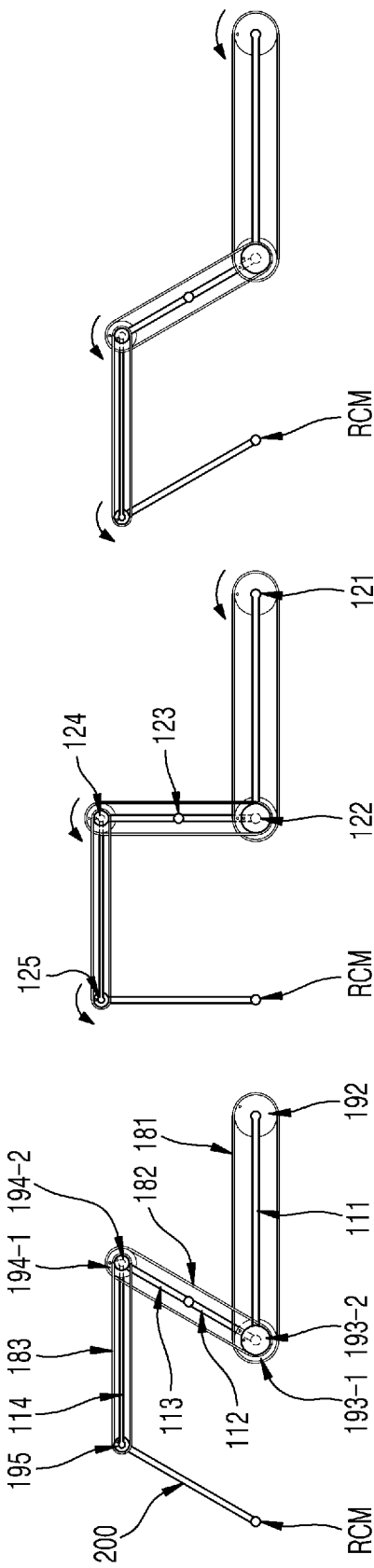

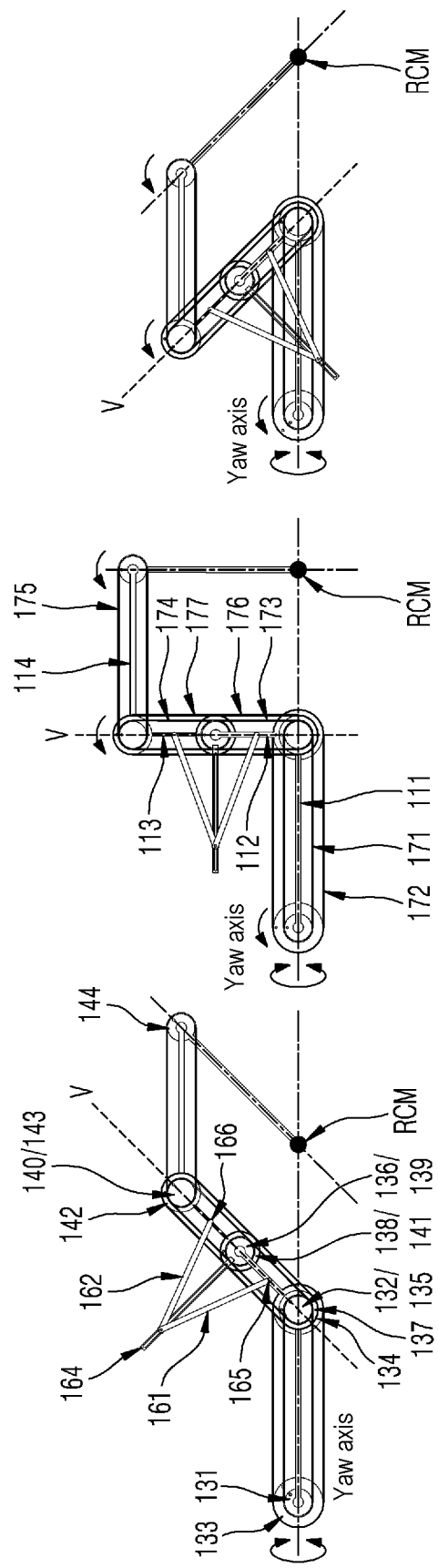

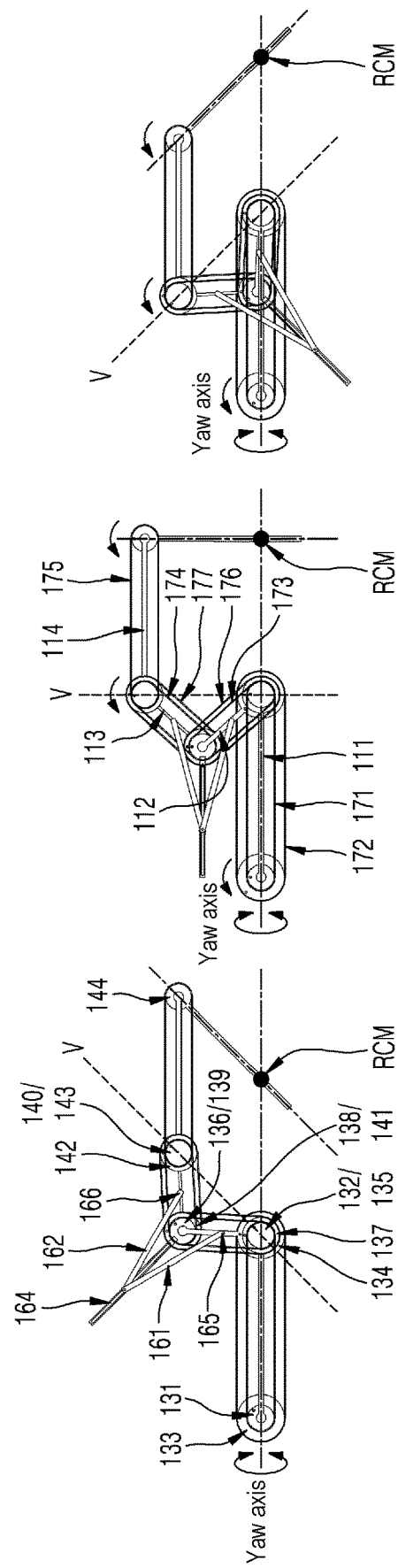

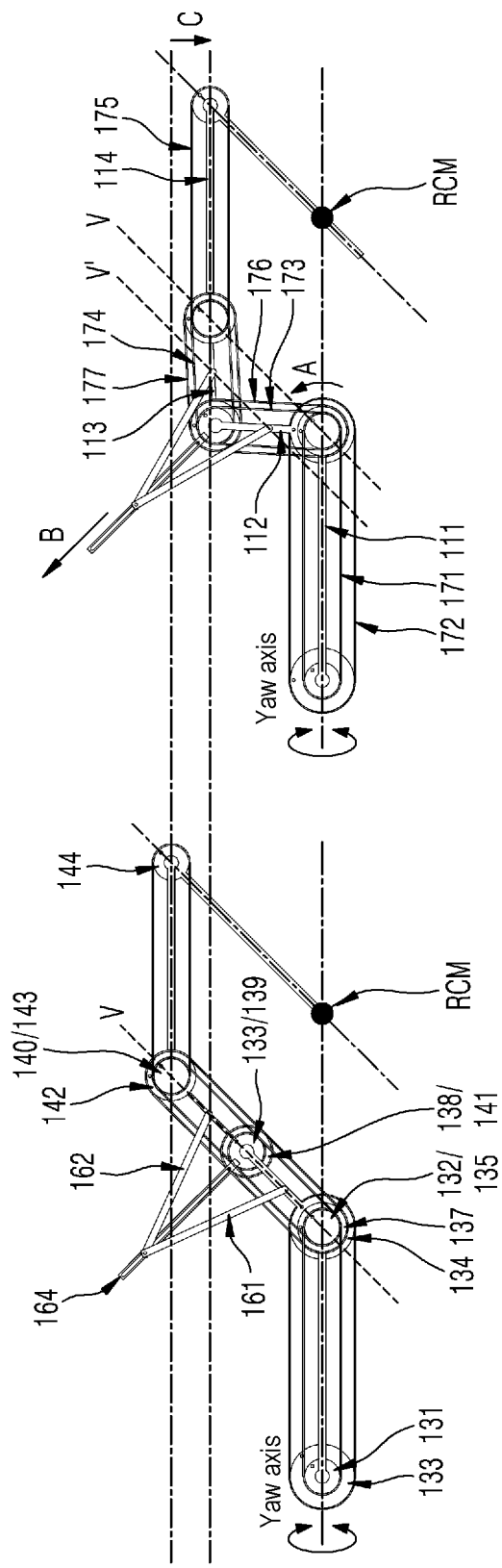

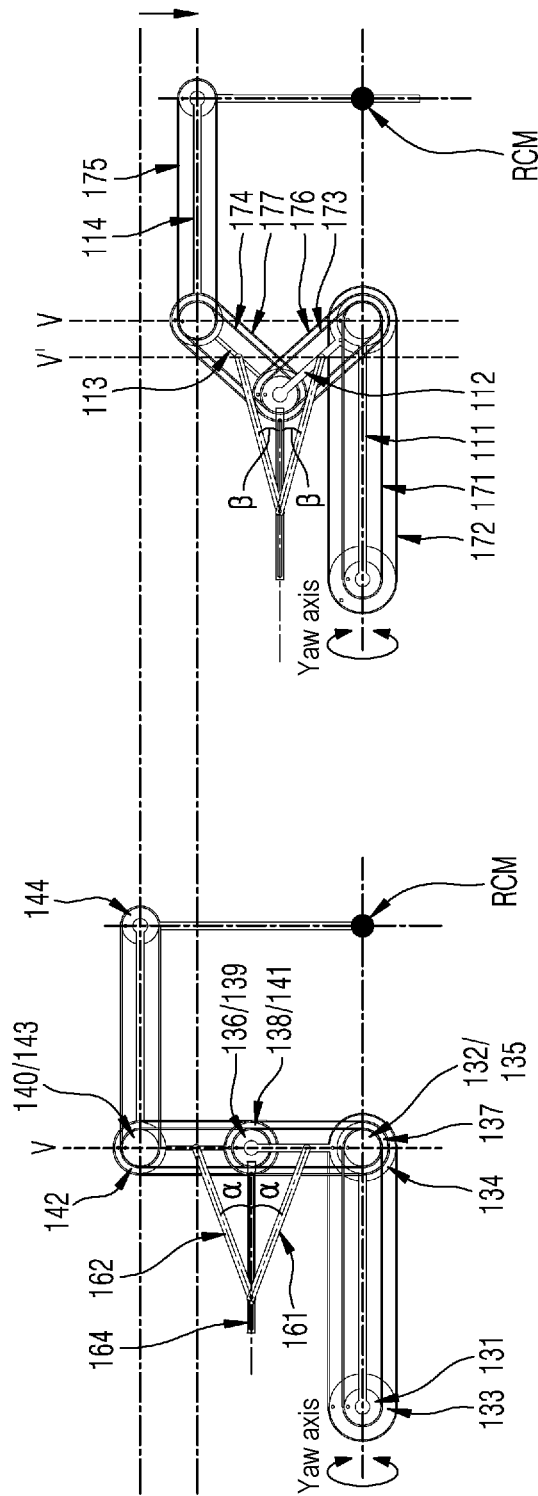

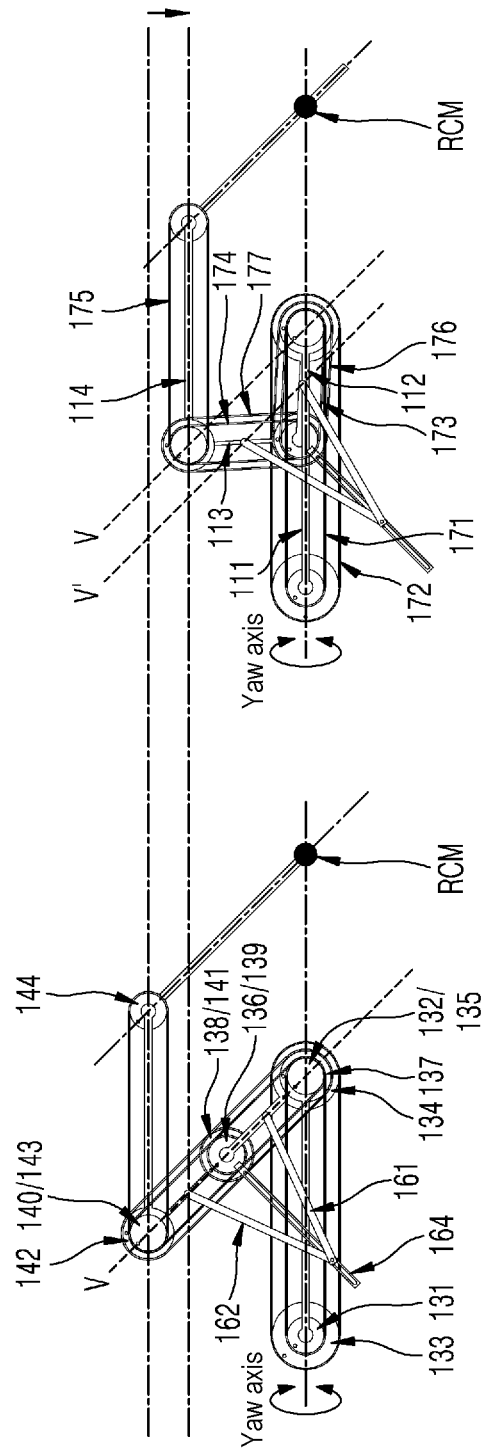

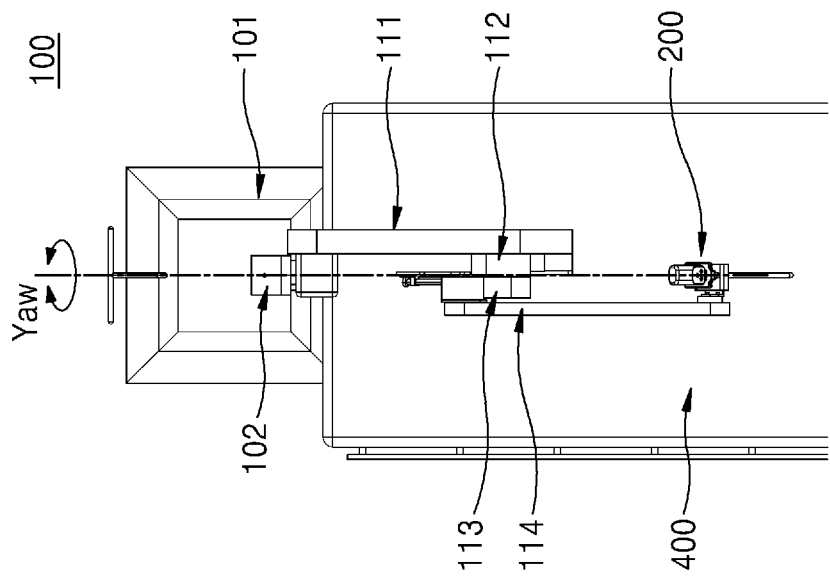
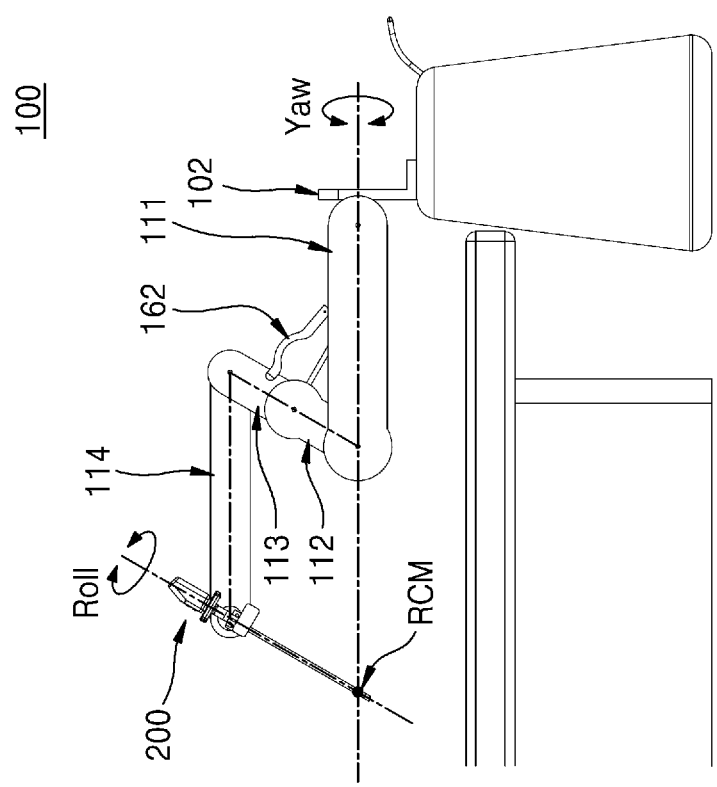
FIG. 22A
FIG. 22B

SURGICAL ROBOT ARM

CROSS-REFERENCE TO RELATED APPLICATION(S)

This application is a continuation application of international application No. PCT/KR2022/016253, filed on Oct. 24, 2022, and claims priority to Korean Patent Application No. 10-2021-0142218, filed on Oct. 22, 2021, with the Korean Intellectual Property Office, the entire disclosures of which are incorporated herein by reference.

TECHNICAL FIELD

The present disclosure relates to a surgical robot arm, and more particularly, to a minimally invasive surgical robot arm formed in a modular form to be used in laparoscopic surgery or various other surgeries.

BACKGROUND ART

In medical terms, a surgery refers to curing an illness by cutting, incising, or manipulating the skin, mucous membranes, or other tissues by using medical devices. In particular, an open surgery, which involves cut-opening the skin at a surgical site and treating, shaping, or removing organs inside, causes problems such as bleeding, side effects, patient's pain, and scarring. Therefore, recently, a surgery performed by forming a certain hole in the skin and inserting a medical device such as a laparoscope, a surgical instrument, or a microsurgical microscope, or a surgery using a robot, is attracting attention as an alternative.

In this regard, a surgical robot refers to a robot that has the function of performing surgical actions used to be performed by a surgeon. Such a surgical robots has advantages of being able to perform accurate and precise motions as compared to human and enabling a remote surgery.

Surgical robots currently being developed around the world include bone surgery robots, laparoscopic surgery robots, and stereotactic surgery robots. In this regard, the laparoscopic surgical robot is a robot that performs a minimally invasive surgery using a laparoscope and small surgical tools.

The laparoscopic surgery is a cutting-edge surgical technique that involves puncturing a small hole in the navel region and inserting a laparoscope, which is an endoscope to look inside the stomach, and then performing a surgery. It is a field that is expected to see a lot of development in the future. Recently, laparoscopes are equipped with computer chips, so they can obtain clearer and enlarged images than those seen with the naked eye, and are also developed to the point where any surgery is possible by using specially designed laparoscopic surgical instruments while viewing the screen through a monitor.

Moreover, the laparoscopic surgery has the advantages of having almost the same scope of surgery as an open surgery, having fewer complications than the open surgery, treatment can be started much earlier after the surgery, and having an excellent ability to maintain a patient's physical strength and immune function. As a result, the laparoscopic surgery is gradually being recognized as a standard surgery in the treatment of the colon cancer in the United States and Europe.

Meanwhile, a surgical robot generally includes a master robot and a slave robot. When an operator manipulates a control lever (e.g., a handle) provided on the master robot, a surgical tool coupled to a robot arm of the slave robot or held by the robot arm is manipulated to perform a surgery.

The above-mentioned background technology is technical information that the inventor possessed for deriving the present disclosure or acquired in the process of deriving the present disclosure and may not necessarily be considered as known technology disclosed to the general public before filing the application for the present disclosure.

DETAILED DESCRIPTION OF THE DISCLOSURE

Technical Problem

The present disclosure provides a surgical robot arm capable of performing an RCM motion and a translation motion by controlling only two motors.

Technical Solution to Problem

According to an embodiment of the present disclosure, a surgical robot arm includes a main body, a first link connected to the main body, a second link axially coupled to the first link to be rotatable around a second joint with respect to the first link, a third link axially coupled to the second link to be rotatable around a third joint with respect to the second link, a fourth link axially coupled to the third link to be rotatable around a fourth joint with respect to the third link, a fifth link is axially coupled to the fourth link to be rotatable around a fifth joint with respect to the fourth link, wherein a remote center of motion (RCM) is formed at a remaining vertex of a parallelogram whose the other vertices correspond to the second joint, the fourth joint, and the fifth joint, when the second link and the third link rotate together around the second joint, an RCM motion is performed in which the fifth link rotates around the RCM, and, when the third link rotates with respect to the second link around the third joint, a translation motion in which the fifth link moves along a roll axis is performed.

Advantageous Effects of Disclosure

Therefore, according to the present disclosure, it is possible to achieve the effect of mechanically performing an RCM motions and a translation motions without controlling five joints through software. In other words, instead of controlling all 5 degrees of freedom by attaching motors to all 5 joints (degrees of freedom), the effect of enabling an RCM motion and a translation motion by controlling only two motors may be obtained. Furthermore, an RCM motion may be performed mechanically without a separate control, and a translation motion or an RCM motion may each be performed independently without affecting the other motion.

BRIEF DESCRIPTION OF DRAWINGS

FIGS. 5A-5C are diagrams showing the operating state of the RCM mechanism of a belt structure.

FIGS. 14A to 15C are conceptual diagrams showing an RCM motion (pitch motion) of the surgical robot arm of FIG. 2.

FIGS. 16A to 19B are conceptual diagrams showing a translation motion of the surgical robot arm of FIG. 2.

FIGS. 20A to 22B are side and top views showing RCM motion (pitch motion) around a pitch axis P of the surgical robot arm of FIG. 2.

FIGS. 38A and 38B are diagrams showing a state in which the surgical robot arm of FIGS. 37A and 37B and a surgical instrument coupled thereto are arranged in parallel to each other.

Best Mode

Figure 1A:
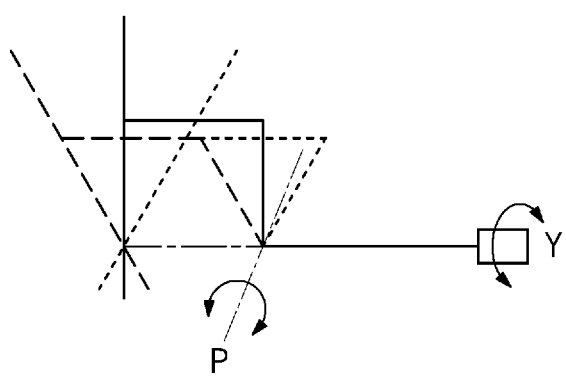
FIGS. 1A and 1B are conceptual diagrams of surgical robot arms according to the present disclosure.

According to the present disclosure, the surgical robot arm may further include a motion guide assembly interconnecting the second link, the third link, and the third joint, wherein, in a first motion mode of the motion guide assembly, the second link and the third link may integrally rotate together around the second joint, and, in the second motion mode of the motion guide assembly, the third link may rotate with respect to the second link.

According to the present disclosure, in the first motion mode, when the motion guide assembly maintains its shape and rotates around the second joint, the second link and the third link integrally may rotate together around the second joint, and, in the second motion mode, when the third link rotates with respect to the second link, the shape of the motion guide assembly may change.

According to the present disclosure, the motion guide assembly may include a first auxiliary link axially coupled to a region of the second link and rotatable with respect to the second link, a second auxiliary link axially coupled to a region of the third link and rotatable with respect to the third link, and a fourth auxiliary link fixedly coupled to the third joint, rotating together with the third joint, and connected to each of the first auxiliary link and the second auxiliary link.

According to the present disclosure, an angle formed by an extension line of the first auxiliary link and an extension line of the fourth auxiliary link and an angle formed by an extension line of the second auxiliary link and an extension line of the fourth auxiliary link may be always identical to each other.

According to the present disclosure, when the second link and the third link integrally rotate together around the second joint, the angle formed by the extension line of the first auxiliary link and the extension line of the fourth auxiliary link may be maintained constant.

According to the present disclosure, when the third link rotates with respect to the second link, the angle formed by the extension line of the first auxiliary link and the extension line of the fourth auxiliary link may change.

According to the present disclosure, when the second link rotates at the same angle as the fourth auxiliary link, the motion guide assembly including the fourth auxiliary link may rotate around the second joint while maintaining its shape, and the second link and the third link integrally may rotate together around the second joint.

According to the present disclosure, when the second link rotates with respect to the fourth link, the first auxiliary link and the second auxiliary link may rotate with respect to the fourth auxiliary link, and the third link may rotate with respect to the second link due to a rotation of the second auxiliary link.

According to the present disclosure, during the RCM motion, while the second link and the fifth link maintain a state of being parallel to each other, a distance between the second joint and the fourth joint may be maintained constant.

According to the present disclosure, during the translation motion, while the second link and the fifth link maintain a state of being parallel to each other, a distance between the second joint and the fourth joint may change.

According to the present disclosure, during the translation motion, the fourth link may move in parallel while an extension line interconnecting the second joint and the RCM and the fourth link remain parallel to each other.

According to the present disclosure, a position of the RCM may be maintained constant regardless of rotation of the second link.

According to the present disclosure, in any motion state of the surgical robot arm, the second link and the fifth link may maintain a state of being parallel to each other, and the extension line interconnecting the second joint and the RCM and the fourth link may maintain a state of being parallel to each other.

According to the present disclosure, during the translation motion, the second link and the third link may rotate together around the third joint.

According to the present disclosure, during the translation motion, the second link and the third link may rotate by a same angle around the third joint.

According to the present disclosure, the surgical robot arm may further include a base link formed on one side of the main body, and a yaw driving part coupled to the base link and configured to yaw-rotate around the yaw axis with respect to the base link, wherein the first link may be fixedly coupled to the yaw driving part around the first joint.

According to the present disclosure, an extension line interconnecting the second joint and the RCM and the yaw axis may be formed to be different from each other.

According to the present disclosure, the RCM may be located on an extension of the yaw axis.

According to the present disclosure, the third link, the fourth link, and the fifth link may be formed to be offset to a certain degree in a direction of their own rotation axes.

According to the present disclosure, the surgical robot arm may further include a base link formed on one side of the main body, and a setup link assembly formed between the main body and the base link and interconnecting the main body and the base link.

According to the present disclosure, the setup link assembly may include a vertical setup link that interconnects the main body and the base link and formed to be movable in a Z-axis direction with respect to the main body.

According to the present disclosure, the setup link assembly may include one or more horizontal setup links that interconnect the main body and the base link and formed to be rotatable around the Z-axis direction with respect to the main body.

According to the present disclosure, the setup link assembly may include a pitch positioning joint that interconnects the main body and the base link, and is formed to be rotatable with respect to the base link around an axis substantially parallel to a rotation axis of the third joint.

According to the present disclosure, the setup link assembly may be formed to be operable only during a setup period in which the surgical robot arm is deployed at an appropriate position on one side of a patient.

According to an embodiment of the present disclosure, a surgical robot arm includes a main body, a first link connected to the main body by a first joint, a second link axially coupled to the first link to be rotatable around a second joint with respect to the first link, a third link axially coupled to the second link to be rotatable around a third joint with respect to the second link, a fourth link axially coupled to the third link to be rotatable around a fourth joint with respect to the third link, a fifth link axially coupled to the fourth link to be rotatable around a fifth joint with respect to the fourth link, a first driving part that provides driving force to rotate one or more pulleys, a second driving part that provides driving force to rotate one or more pulleys, a first set of pulleys including one or more pulleys that rotate together by a same angle due to rotation of the first driving part, and a second set of pulleys including one or more pulleys that rotate together by a same angle due to rotation of the second driving part, wherein, when the first set of pulleys and the second set of pulleys rotate together, the second link and the third link integrally rotate together around the second joint, and, when only the second set of pulleys rotate, the third link rotates with respect to the second link around the third joint.

According to the present disclosure, a remote center of motion (RCM) may be formed at a remaining vertex of a parallelogram whose the other vertices correspond to the second joint, the fourth joint, and the fifth joint.

According to the present disclosure, when the first set of pulleys and the second set of pulleys rotate together, an RCM motion may be performed in which the fifth link rotates around the RCM, and, when only the second set of pulleys rotate, a translation motion may be performed in which the fifth link moves along a roll axis.

According to the present disclosure, when the first set of pulleys and the second set of pulleys rotate together, the second link and the third link integrally may rotate together around the second joint and the RCM motion may be performed, and, when only the second set of pulleys rotate, the third link may rotate with respect to the second link around the third joint and the translation motion may be performed.

According to the present disclosure, the surgical robot arm may further include a motion guide assembly interconnecting the second link, the third link, and the third joint, wherein, in a first motion mode of the motion guide assembly, the first set of pulleys and the second set of pulleys may rotate together, and, in a second motion mode of the motion guide assembly, only the second set of pulleys may rotate.

According to the present disclosure, the motion guide assembly may include a first auxiliary link axially coupled to a region of the second link and rotatable with respect to the second link, a second auxiliary link axially coupled to a region of the third link and rotatable with respect to the third link, and a fourth auxiliary link fixedly coupled to the third joint, rotating together with the third joint, and connected to each of the first auxiliary link and the second auxiliary link.

According to the present disclosure, the first set of pulleys may include a pulley included in the first joint, one or more pulleys included in the second joint, one or more pulleys included in the third joint, one or more pulleys included in the fourth joint, and a pulley included in the fifth joint, and the second set of pulleys may include a pulley included in the first joint and a pulley included in the second joint.

According to the present disclosure, the one or more pulleys included in the third joint of the first set of pulleys may rotate together with the fourth auxiliary link, and the pulley included in the second joint of the second set of pulleys may rotate together with the second link.

According to the present disclosure, when the first set of pulleys and the second set of pulleys rotate together, the fourth auxiliary link and the second link may rotate around the second joint while maintaining an angle between the fourth auxiliary link and the second link constant so that the second link and the third link integrally may rotate together around the second joint.

According to the present disclosure, when only the second set of pulleys rotate, the second link may rotate with respect to the fourth auxiliary link, as a result, the first auxiliary link and the second auxiliary link may rotate with respect to the fourth auxiliary link, and the third link may rotate with respect to the second link due to a rotation of the second auxiliary link.

According to the present disclosure, the surgical robot arm may further include a third set of pulleys including one or more pulleys that do not rotate around their own axes, wherein the third set of pulleys may include a pulley included in the second joint, a pulley included in the third joint, and a pulley included in the fourth joint.

According to the present disclosure, an extension line interconnecting the second joint and the RCM and the fourth link may be maintained parallel to each other by the third set of pulleys.

According to the present disclosure, the pulley included in the second joint of the third set of pulleys may be fixedly coupled to the first link, and the pulley included in the fourth joint of the third set of pulleys may be fixedly coupled to the fourth link.

According to the present disclosure, one or more pulleys in each set of pulleys may be sequentially connected to one another by one or more power transmission members.

According to the present disclosure, during the RCM motion, while the second link and the fifth link maintain a state of being parallel to each other, a distance between the second joint and the fourth joint may be maintained constant.

According to the present disclosure, during the translation motion, while the second link and the fifth link maintain a state of being parallel to each other, a distance between the second joint and the fourth joint may change.

According to the present disclosure, during the translation motion, the fourth link may move in parallel while an extension line interconnecting the second joint and the RCM and the fourth link remain parallel to each other.

According to the present disclosure, a position of the RCM may be maintained constant regardless of rotation of the second link.

According to the present disclosure, in any motion state of the surgical robot arm, the second link and the fifth link may maintain a state of being parallel to each other, and the extension line interconnecting the second joint and the RCM and the fourth link may maintain a state of being parallel to each other.

According to the present disclosure, during the translation motion, the second link and the third link may rotate together around the third joint.

According to the present disclosure, during the translation motion, the second link and the third link may rotate by a same angle around the third joint.

According to an embodiment of the present disclosure, a surgical robot arm includes a main body, a base link formed on one side of the main body, a yaw driving part coupled to the base link and configured to yaw-rotate around the yaw axis with respect to the base link, a first link fixedly coupled to the yaw driving part around a first joint, a second link axially coupled to the first link to be rotatable around a second joint with respect to the first link, a third link axially coupled to the second link to be rotatable around a third joint with respect to the second link, a fourth link axially coupled to the third link to be rotatable around a fourth joint with respect to the third link, a fifth link axially coupled to the fourth link to be rotatable around a fifth joint with respect to the fourth link, a first driving part disposed at the first joint and connected to links to provide driving force to rotate at least some of the links, and a second driving part coupled to a rotation axis of the first driving part, rotating together with the rotation axis of the first driving part, and connected to the links to provide driving force for rotating at least some of the links.

According to the present disclosure, a remote center of motion (RCM) may be formed at a remaining vertex of a parallelogram whose the other vertices correspond to the second joint, the fourth joint, and the fifth joint.

According to the present disclosure, when the rotation axis of the first driving part rotates, an RCM motion may be performed in which the fifth link rotates around the RCM, and, when only a rotation axis of the second driving part rotates, a translation motion may be performed in which the fifth link moves along a roll axis.

According to the present disclosure, when the rotation axis of the first driving part rotates, the second link and the third link may integrally rotate together around the second joint and the RCM motion is performed, and, when the rotation axis of the second driving part rotates, the third link may rotate with respect to the second link around the third joint and the translation motion is performed.

According to the present disclosure, the surgical robot arm may further include a motion guide assembly interconnecting the second link, the third link, and the third joint, wherein, in a first motion mode of the motion guide assembly, the rotation axis of the first driving part may rotate, and, in a second motion mode of the motion guide assembly, only the rotation axis of the second driving part may rotate.

According to the present disclosure, the motion guide assembly may include a first auxiliary link axially coupled to a region of the second link and rotatable with respect to the second link, a second auxiliary link axially coupled to a region of the third link and rotatable with respect to the third link, and a fourth auxiliary link fixedly coupled to the third joint, rotating together with the third joint, and connected to each of the first auxiliary link and the second auxiliary link.

According to the present disclosure, when the rotation axis of the first driving part rotates, a pulley of the first joint connected to the rotation axis of the first driving part, a pulley of the second joint connected thereto, a pulley of the third joint connected thereto, a pulley of the fourth joint connected thereto, and a pulley of the fifth joint connected thereto may rotate together, and, at the same time, the pulley of the first joint coupled to the rotation axis of the second driving part, the pulley of the second joint connected thereto, the second link connected thereto, and the third link connected thereto may rotate together.

According to the present disclosure, when only the rotation axis of the second driving part rotates, the pulley of the first joint coupled to the rotation axis of the second driving part, the pulley of the second joint connected thereto, and the second link connected thereto may rotate, and the third link, which is axially coupled to the second link, may rotate with respect to the second link as the second link rotates.

According to the present disclosure, when the rotation axis of the first driving part rotates, the fourth auxiliary link connected to the first driving part and the second link connected to the second driving part may rotate together.

According to the present disclosure, when the rotation axis of the first driving part rotates, the fourth auxiliary link and the second link may rotate around the second joint while maintaining an angle between the fourth auxiliary link and the second link constant so that the second link and the third link may integrally rotate together around the second joint.

According to the present disclosure, when only the rotation axis of the second driving part rotates, the second link connected to the second driving part may rotate with respect to the fourth auxiliary link connected to the first driving part.

According to the present disclosure, when only the rotation axis of the second driving part rotates, the second link may rotate with respect to the fourth auxiliary link, as a result, the first auxiliary link and the second auxiliary link may rotate with respect to the fourth auxiliary link, and the third link may rotate with respect to the second link due to a rotation of the second auxiliary link.

According to the present disclosure, during the RCM motion, while the second link and the fifth link maintain a state of being parallel to each other, a distance between the second joint and the fourth joint may be maintained constant.

According to the present disclosure, during the translation motion, while the second link and the fifth link maintain a state of being parallel to each other, a distance between the second joint and the fourth joint may change.

According to the present disclosure, during the translation motion, the fourth link may move in parallel while an extension line interconnecting the second joint and the RCM and the fourth link remain parallel to each other.

According to the present disclosure, a position of the RCM may be maintained constant regardless of rotation of the second link.

According to the present disclosure, in any motion state of the surgical robot arm, the second link and the fifth link may maintain a state of being parallel to each other, and the extension line interconnecting the second joint and the RCM and the fourth link may maintain a state of being parallel to each other.

According to the present disclosure, during the translation motion, the second link and the third link may rotate together around the third joint.

According to the present disclosure, during the translation motion, the second link and the third link may rotate by a same angle around the third joint.

Other aspects, features, and advantages will become apparent from the following drawings, claims, and detailed description of the invention.

Mode of Disclosure

The present disclosure may include various embodiments and modifications, and embodiments thereof will be illustrated in the drawings and will be described herein in detail. However, this is not intended to limit the present disclosure to particular modes of practice, and it is to be appreciated that all changes, equivalents, and substitutes that do not depart from the spirit and technical scope of the present disclosure are encompassed in the present disclosure. In describing the present disclosure, when it is determined that detailed descriptions of related known technologies may obscure the gist of the present disclosure, the detailed descriptions will be omitted.

While such terms as "first," "second," etc., may be used to describe various elements, such elements must not be limited to the above terms. The above terms may be used only to distinguish one element from another.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Reference will now be made in detail to embodiments, examples of which are illustrated in the accompanying drawings. In the drawings, the same elements are denoted by the same reference numerals, and a repeated explanation thereof will not be given.

In some embodiments, in describing various embodiments of the present disclosure, each embodiment is not to be interpreted or implemented independently, and it should be understood that the technical spirits described in each embodiment may be interpreted or implemented in combination with other embodiments described individually.

Hereinafter, embodiments of the present disclosure will be described with reference to the attached drawings.

Figure 41A:
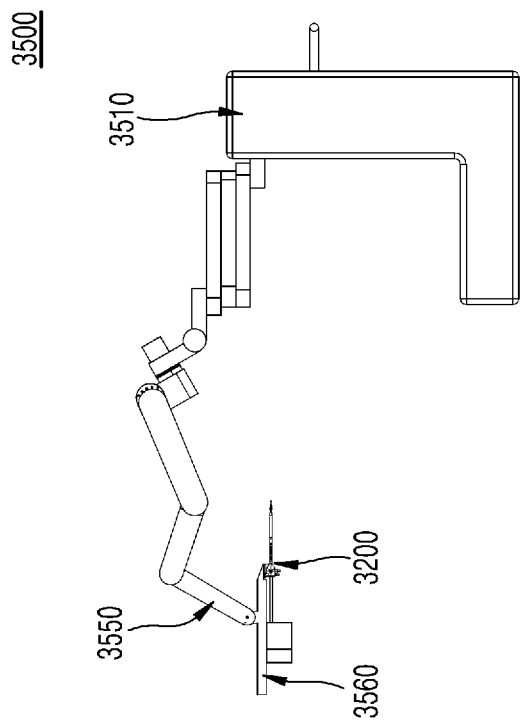
FIGS. 41A and 41B are diagrams showing a surgical robot arm.
Figure 41B:
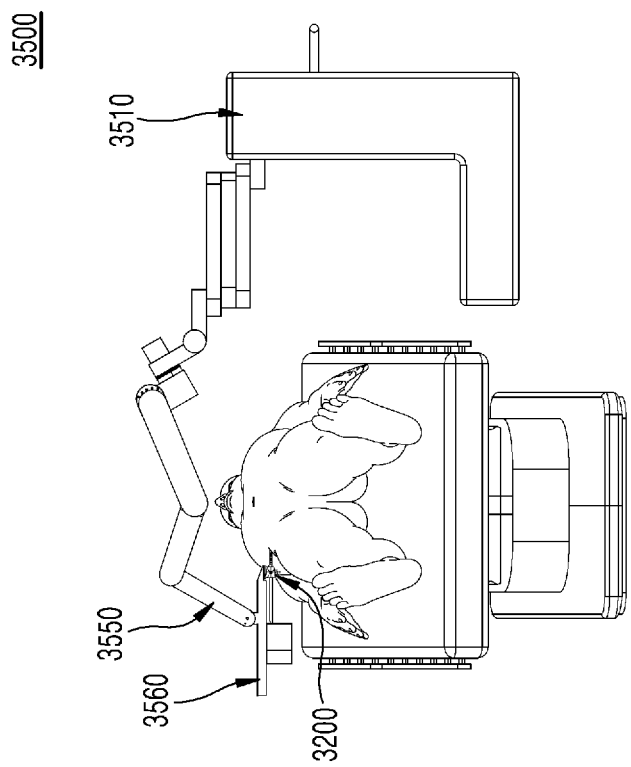

FIGS. 41A and 41B are diagrams showing a surgical robot arm.

As shown in FIGS. 41A and 41B, a surgical robot arm 3500 generally has one or more robot arms extending from one tower. Generally, in such a structure, in the case of a surgery in which a surgical instrument 3200 needs to be inserted in a direction parallel to the plane of an operating table on which a patient lies, a tower 3510 is located beyond a surgical site of the patient, the surgical robot arm 3500 is deployed to extend from the tower 3510 above the patient's body like the surgical robot arm 3500 covers the patient's body, and the surgical instrument 3200 is disposed in the opposite direction toward the patient again. Therefore, there may be disadvantages such as deployment of a plurality of robot arms over a patient and increased vibration and deteriorated strength of the surgical robot arm 3500 due to the shape extending long from the tower 3510, which is the support base of the surgical robot arm 3500.

Figure 1B:
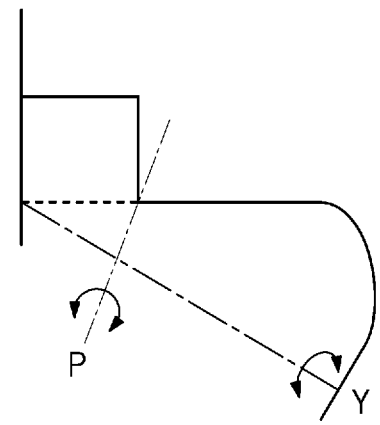

To solve such problems, as shown in FIGS. 1A and 1B, each robot arm may be formed in a modular form and each module may be placed nearby a surgical site, such that a surgical instrument may face directly toward a patient.

In other words, according to the present disclosure, a surgical robot arm is formed in a modular form, such that one surgical instrument is deployed from the body of one surgical robot arm. In some embodiments, a plurality of modular surgical robot arms each equipped with one surgical instrument are provided. In some embodiments, such surgical robot arms are arranged nearby a plurality of ports of a patient, and thus that the overall length of the overall length of a deployed surgical robot arm is reduced. As a result, vibration of a surgical robot arm may be reduced and the strength of the surgical robot arm may be improved.

FIGS. 1A and 1B are conceptual diagrams of surgical robot arms according to embodiments of the present disclosure.

In detail, FIG. 1A is a conceptual diagram of a surgical robot arm according to a first embodiment of the present disclosure. In FIG. 1A, the yaw axis is disposed in the horizontal direction, that is, the yaw axis is arranged on the XY plane.

Meanwhile, FIG. 1B is a conceptual diagram of a surgical robot arm according to a fourth embodiment of the present disclosure. In FIG. 1B, one yaw axis is disposed to be inclined in a direction different from the horizontal direction. In detail, the yaw axis is disposed to be inclined upward when viewed on the XZ plane. With this configuration, gimbal lock may be prevented regardless the placement state of mainly used surgical instruments (i.e., when surgical instruments are placed horizontally), and thus the overall surgical robot may become more compact.

The detailed configurations of embodiments will be described below.

First Embodiment of Surgical Robot Arm

Hereinafter, the first embodiment of the present disclosure will be described with reference to the attached drawings.

Figure 2:
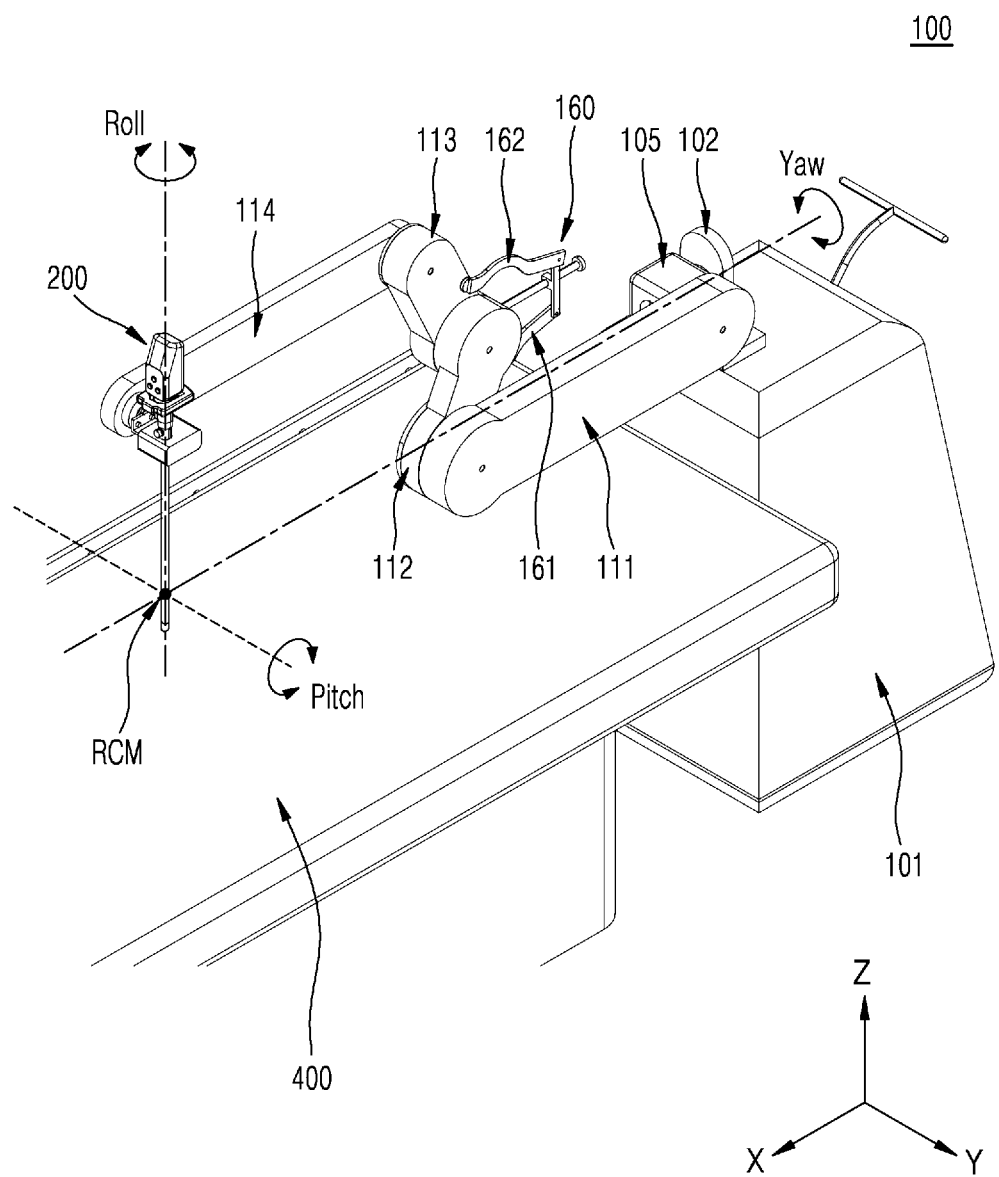
FIGS. 2 and 3 are perspective views of a surgical robot arm according to the first embodiment of the present disclosure.
Figure 3:
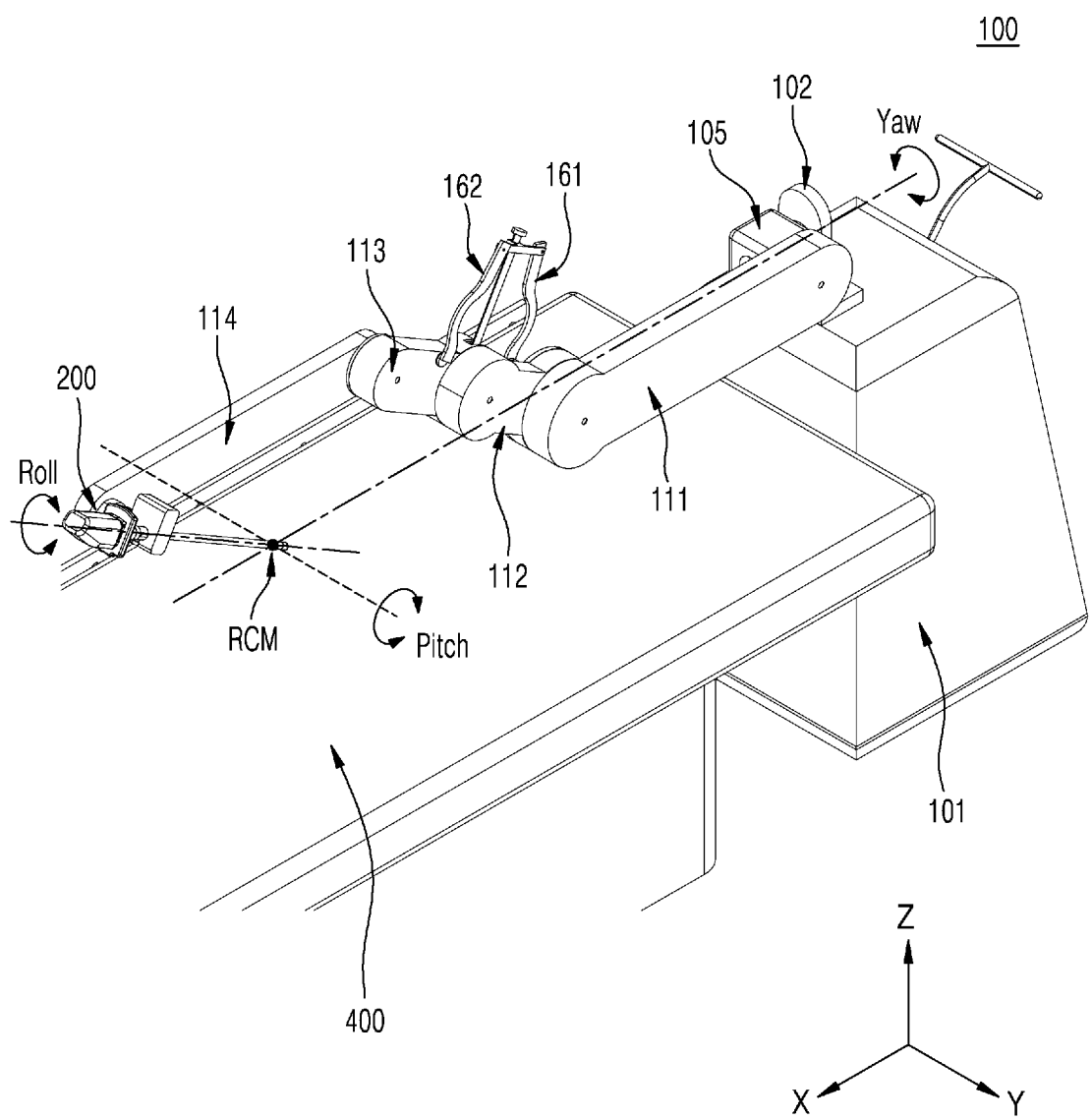
Figure 4C:
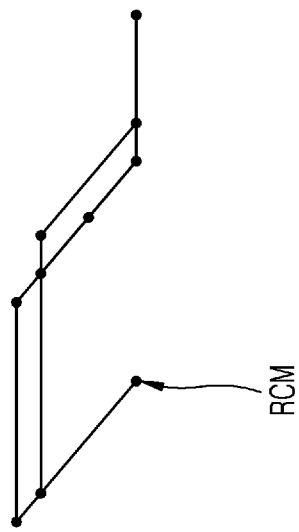
FIGS. 4A-4C are diagrams showing the operating state of an RCM mechanism of a link structure.
Figure 4B:
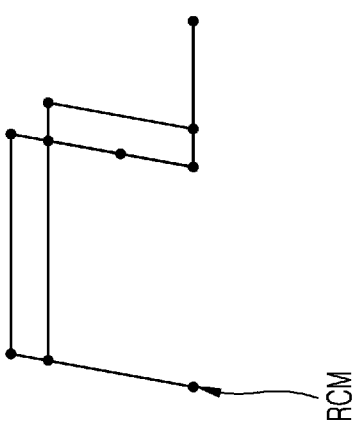
Figure 4A:
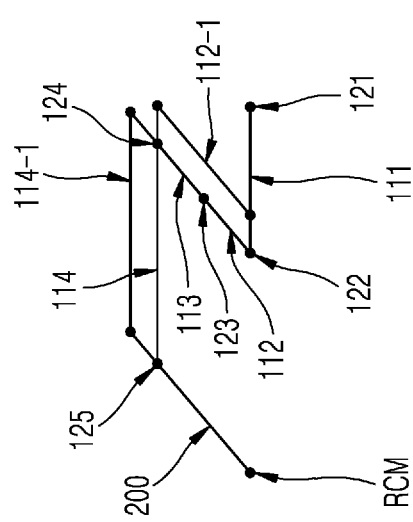
Figure 6:
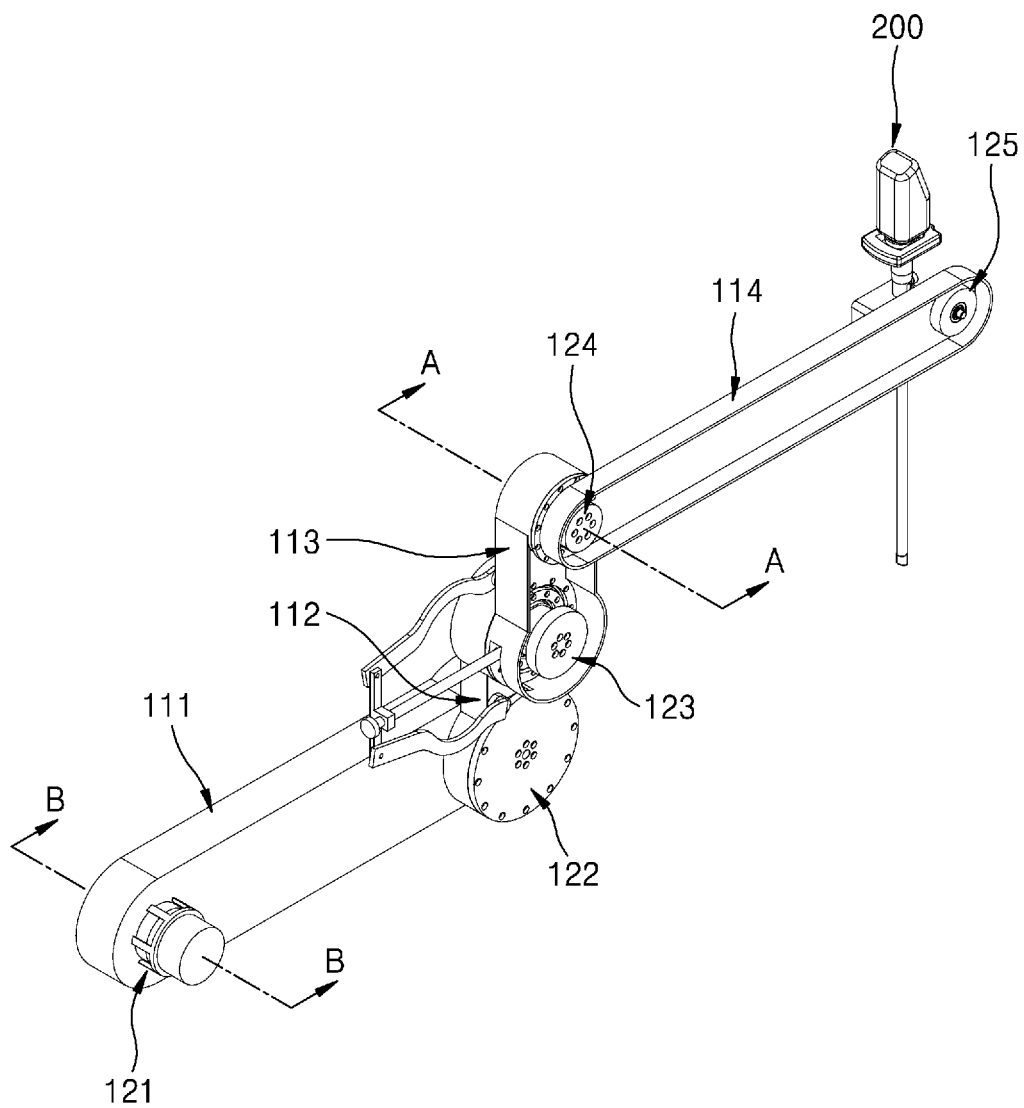
FIG. 6 is a perspective view of a link structure of the surgical robot arm of FIG. 2.
Figure 7:
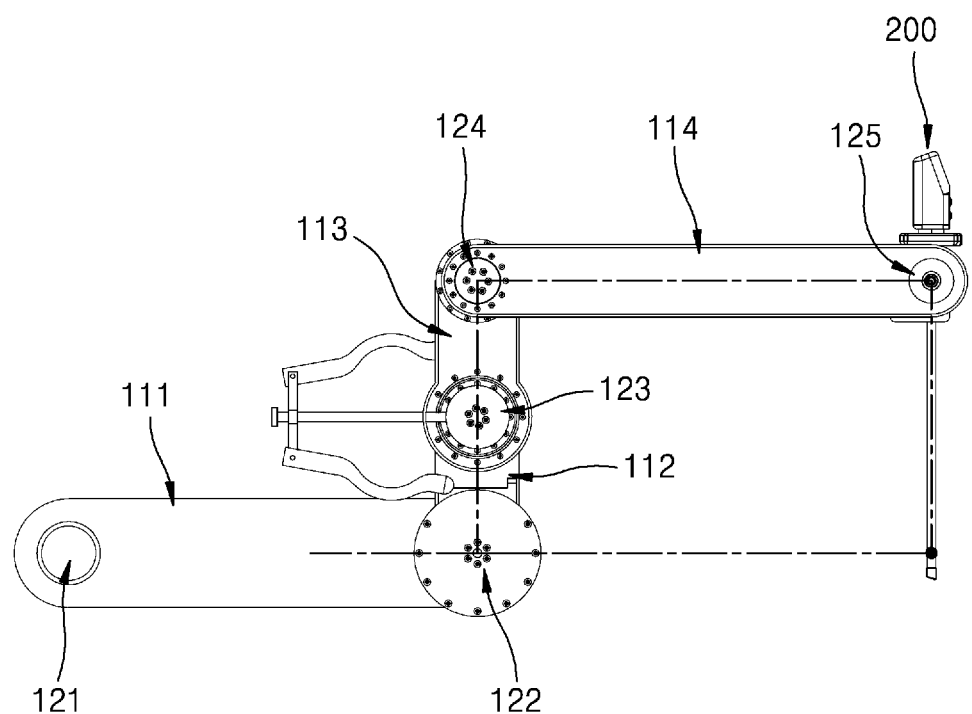
FIG. 7 is a side view of the link structure of the surgical robot arm of FIG. 2.
Figure 8:
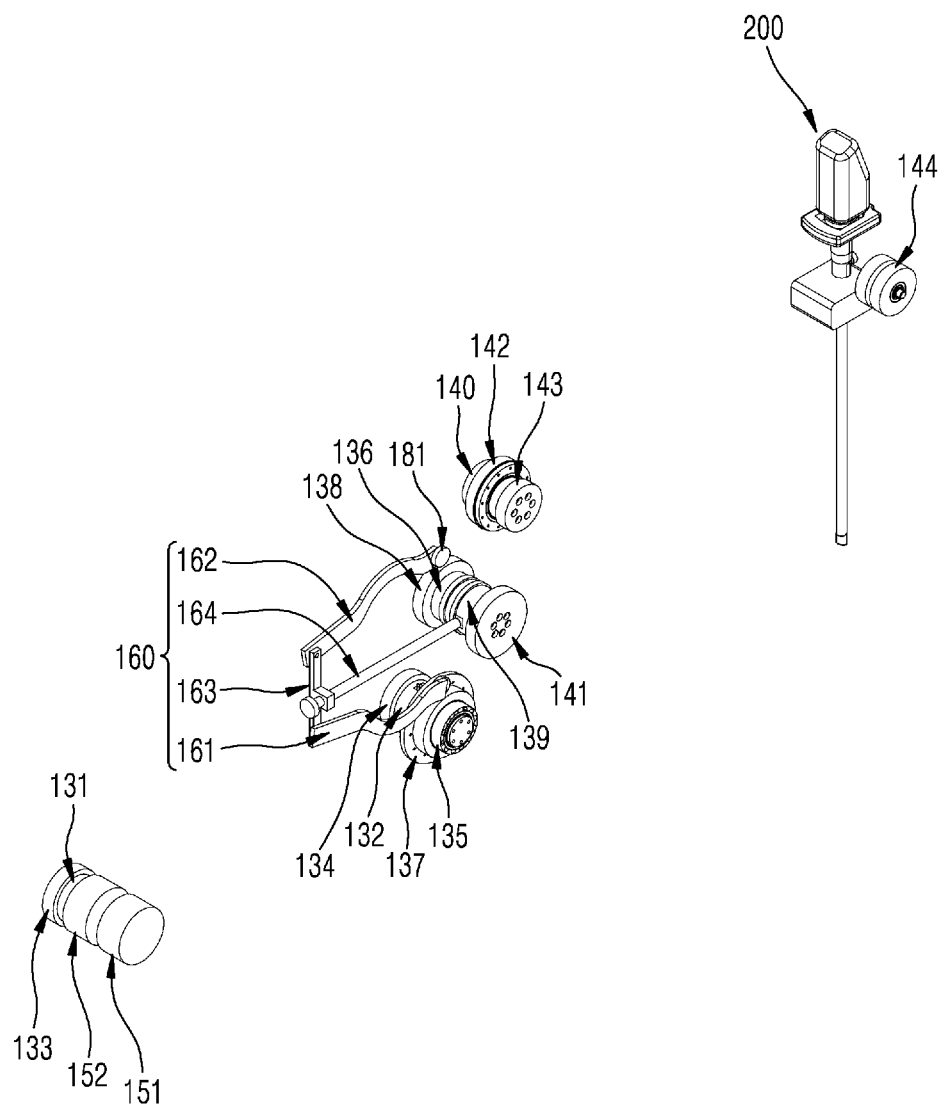
FIG. 8 is an exploded perspective view of a pulley structure of the surgical robot arm of FIG. 2.
Figure 9:
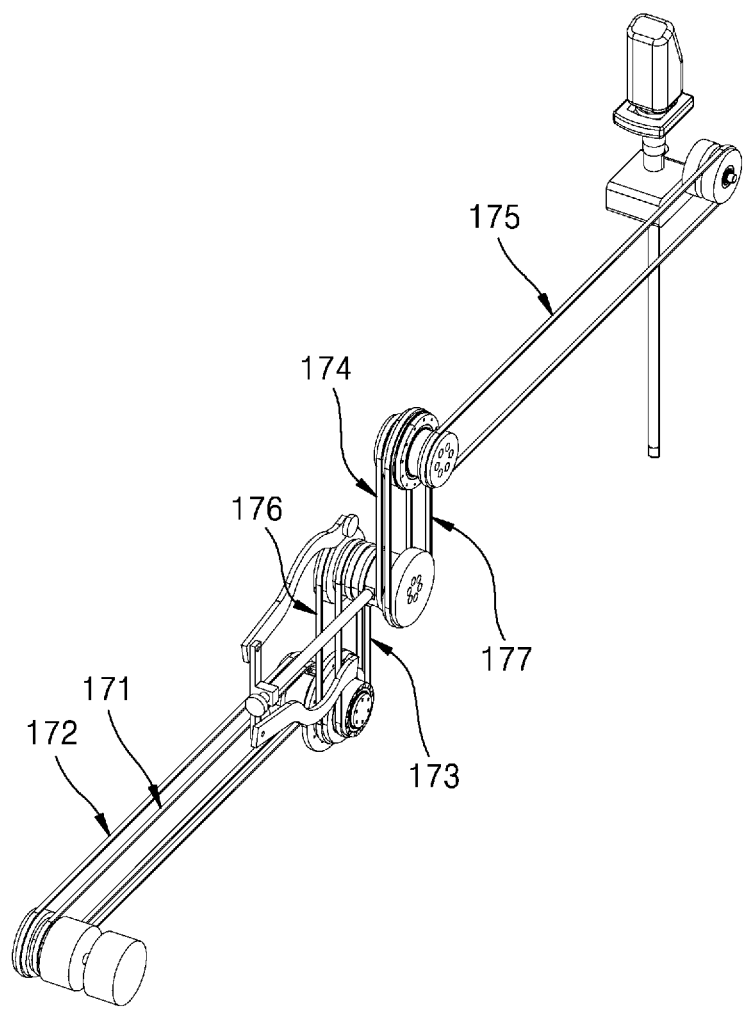
FIG. 9 is an exploded perspective view of the structure of a pulley and a power transmission member of the surgical robot arm of FIG. 2.
Figure 10:
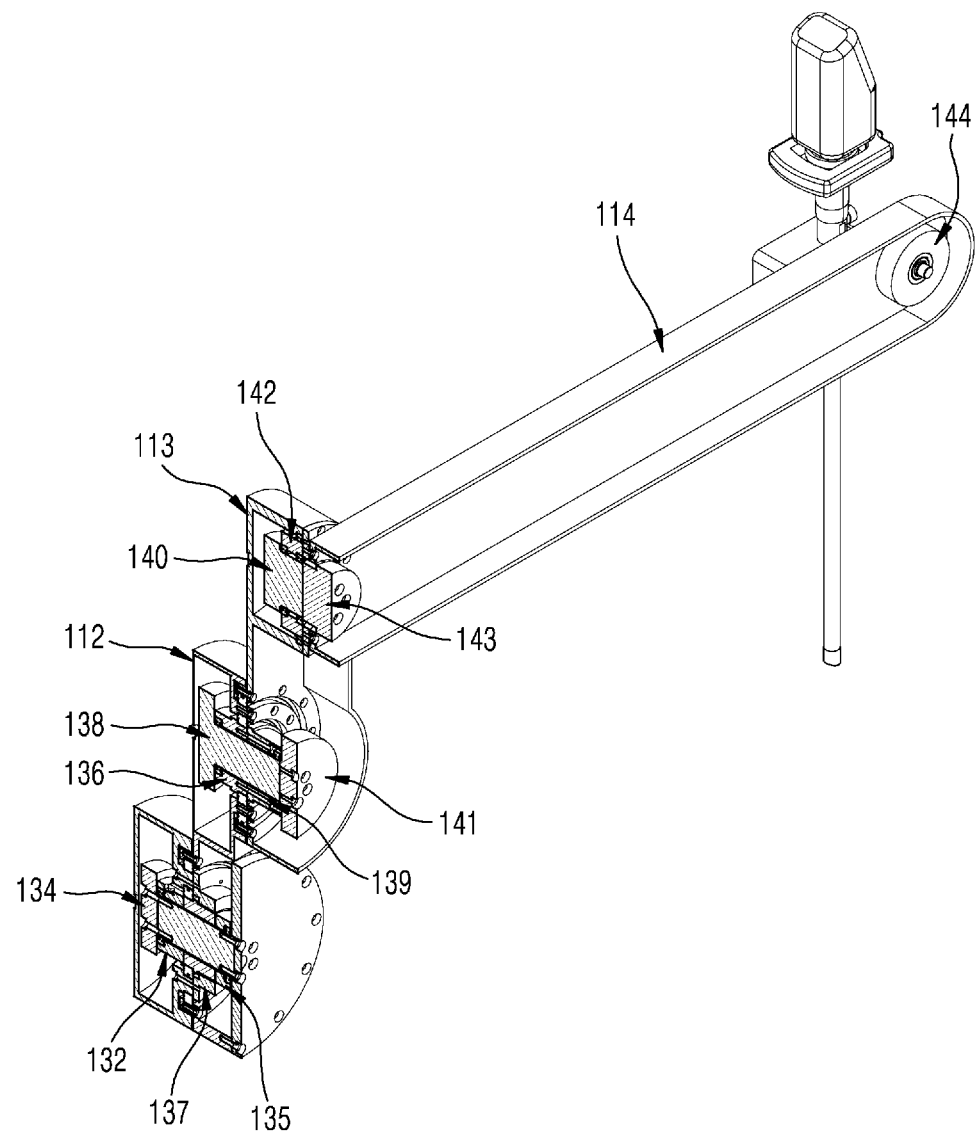
FIG. 10 is a cross-sectional perspective view taken along a line A-A of FIG. 6.
Figure 11:
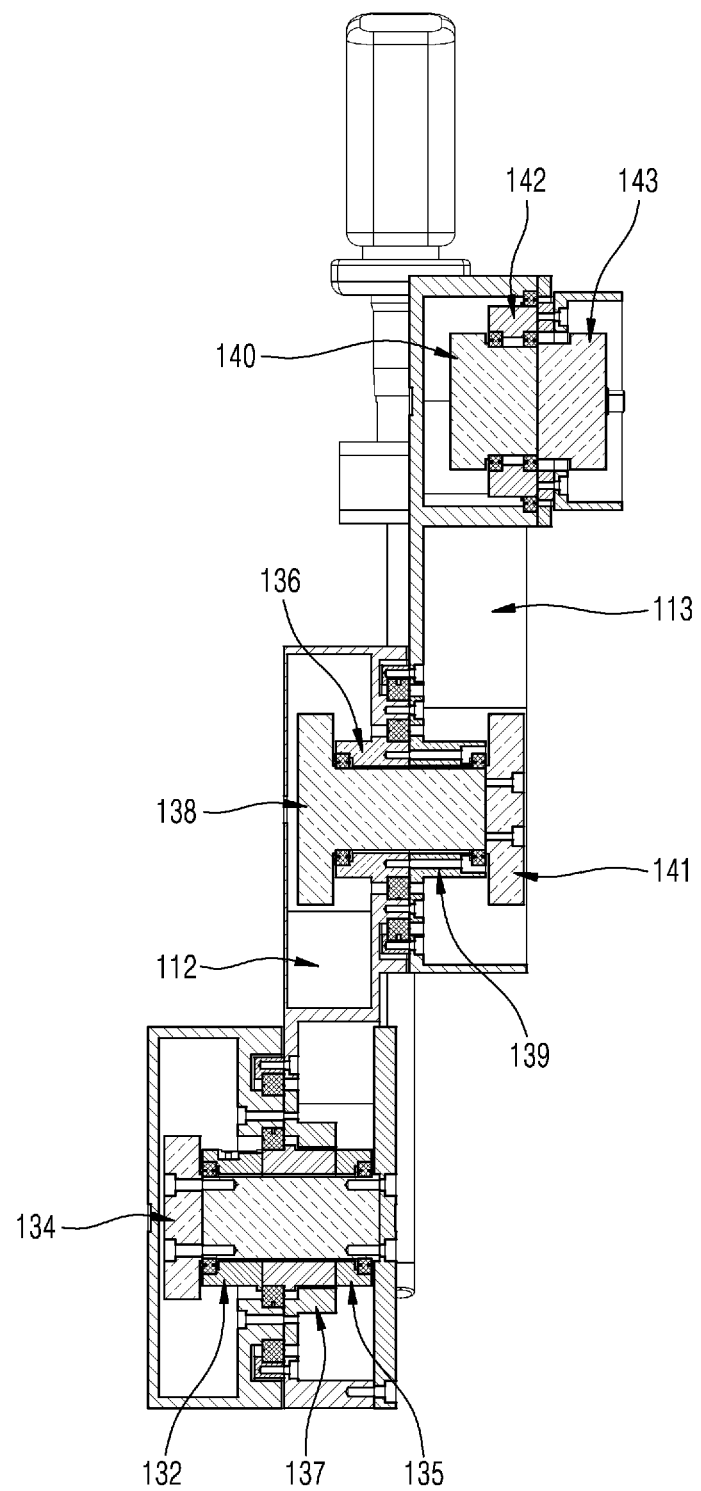
FIG. 11 is a front cross-sectional view taken along the line A-A of FIG. 6.
Figure 12:
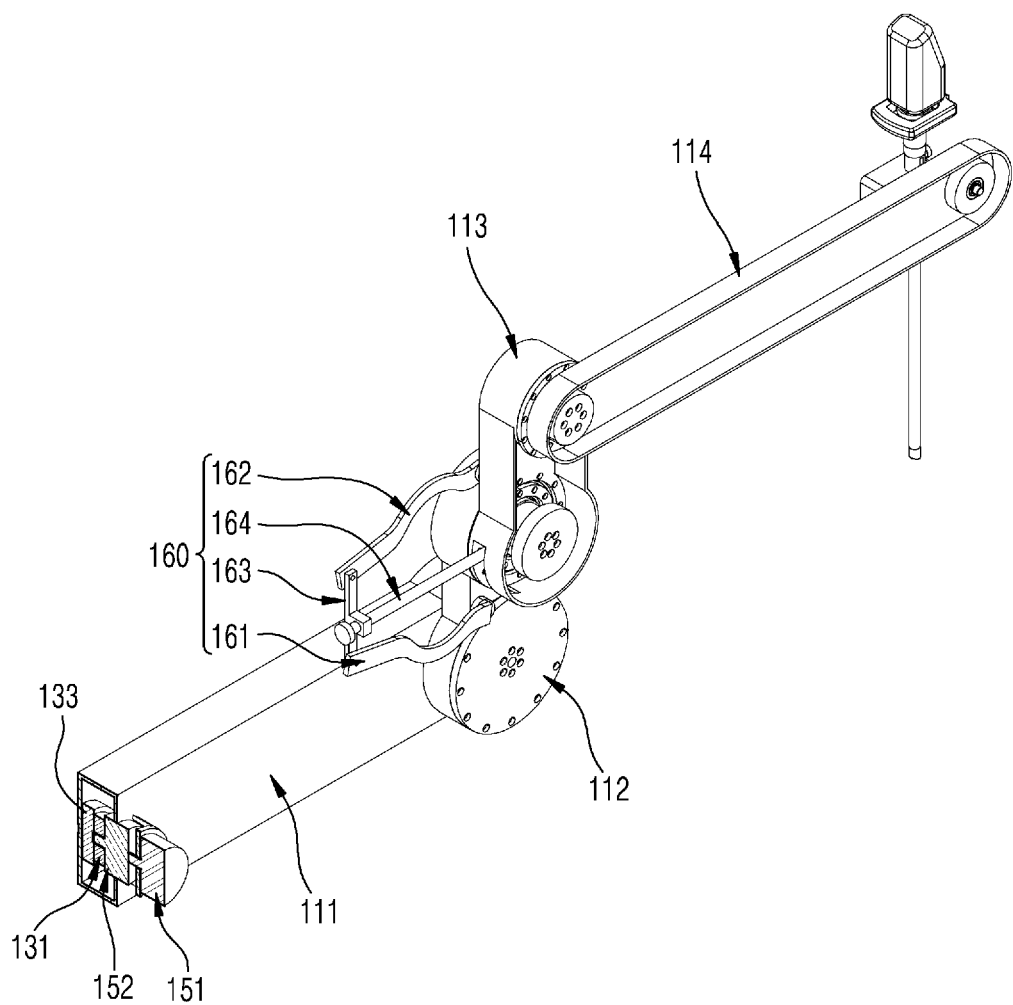
FIG. 12 is a cross-sectional perspective view taken along a line B-B of FIG. 6.
Figure 13:
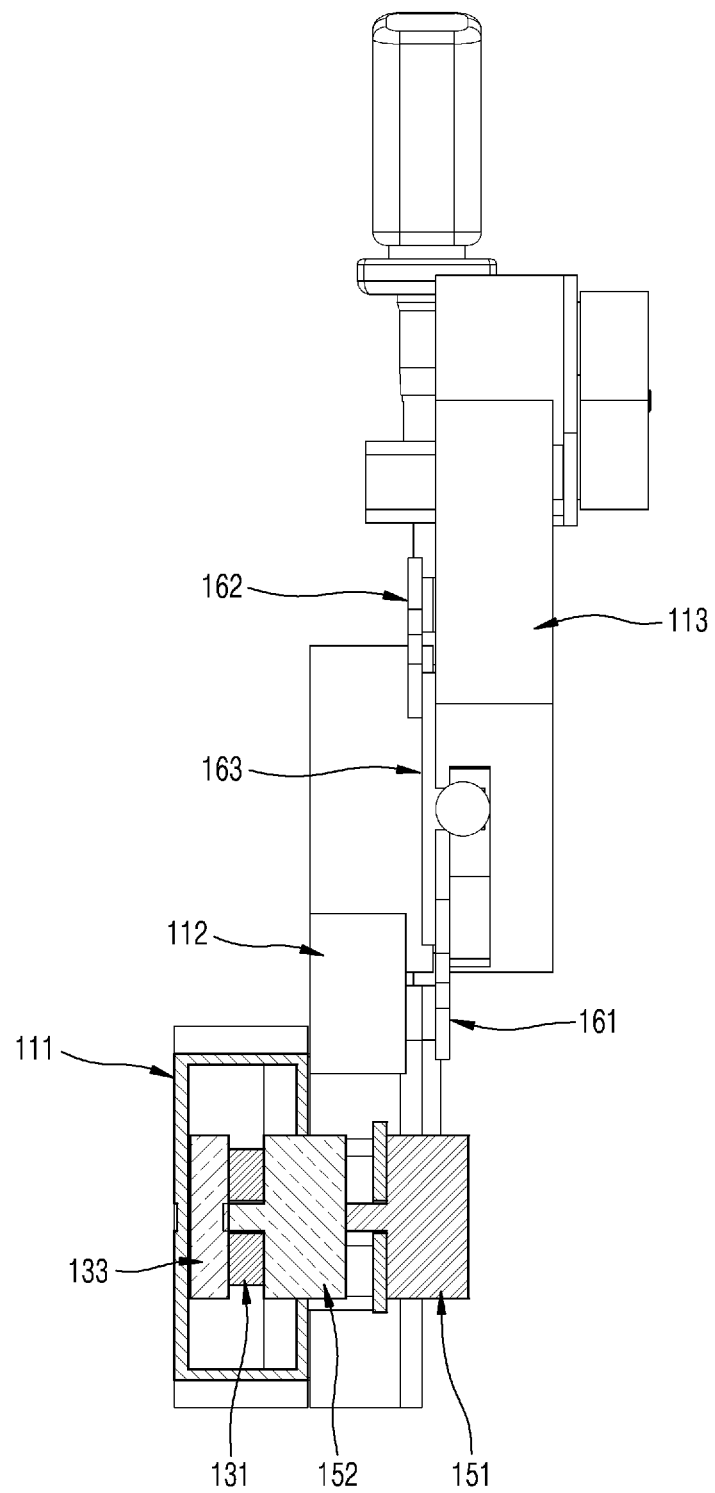
FIG. 13 is a front cross-sectional view taken along the line B-B of FIG. 6.

FIGS. 2 and 3 are perspective views of a surgical robot arm according to the first embodiment of the present disclosure. FIGS. 4A-4C are diagrams showing the operating state of an RCM mechanism of a link structure. FIGS. 5A-5C are diagrams showing the operating state of the RCM mechanism of a belt structure. FIG. 6 is a perspective view of a link structure of the surgical robot arm of FIG. 2. FIG. 7 is a side view of the link structure of the surgical robot arm of FIG. 2. FIG. 8 is an exploded perspective view of a pulley structure of the surgical robot arm of FIG. 2. FIG. 9 is an exploded perspective view of the structure of a pulley and a power transmission member of the surgical robot arm of FIG. 2. FIG. 10 is a cross-sectional perspective view taken along a line A-A of FIG. 6. FIG. 11 is a front cross-sectional view taken along the line A-A of FIG. 6. FIG. 12 is a cross-sectional perspective view taken along a line B-B of FIG. 6. FIG. 13 is a front cross-sectional view taken along the line B-B of FIG. 6. FIGS. 14A and 15C are conceptual diagrams showing an RCM operation (pitch operation) of the surgical robot arm of FIG. 2. FIGS. 16A-19B are conceptual diagrams showing a translation operation of the surgical robot arm of FIG. 2.

First, referring to FIGS. 2 to 13, etc., the surgical robot arm 100 according to the first embodiment of the present disclosure includes a main body 101, a base link 102, a yaw driving part 105, a first link 111, a second link 112, a third link 113, and a fourth link 114. In some embodiments, a fifth link 200 is coupled to the fourth link 114 of the surgical robot arm 100. In some embodiments, the surgical robot arm 100 according to the first embodiment of the present disclosure further includes a motion guide assembly 160.

In some embodiments, the surgical robot arm 100 may include the first joint 121, the second joint 122, the third joint 123, the fourth joint 124, and the fifth joint 125.

In this regard, the second joint 122, the fourth joint 124, the fifth joint 125 and a remote center of motion (RCM) constitute the four vertices of a parallelogram and form an RCM mechanism of some sort.

In detail, a surgical robot is equipped with one or more surgical robot arms for surgical manipulation, and a surgical instrument is mounted on the front end of a surgical robot arm.

In general, a robot arm refers to a device having functions similar to those of a human arm and/or a human wrist and a certain instrument may be attached to a wrist of the robot arm. In this specification, a robot arm may be defined as a concept encompassing all components such as an upper arm, a lower arm, a wrist, and an elbow and surgical instruments coupled to the wrist of the robot arm. Such a surgical robot arm may be implemented to have multiple degrees of freedom.

As such, when a surgical instrument is mounted on the front end of a surgical robot arm to perform a surgery, the surgical instrument moves along with the movement of the surgical robot arm, where there is a risk of causing unnecessary damage to the human skin during the process of puncturing a part of a patient's skin and inserting the surgical instrument thereinto to perform the surgery. In some embodiments, when a surgical site is large, the advantages of a robotic surgery may be halved, because the skin needs to be incised in correspondence to a path along which a surgical instrument moves or the skin needs to be punctured for each surgical site.

Therefore, a virtual center of rotation is set at a certain position (mainly a pivot point where a trocar penetrates through a patient's skin) of a surgical instrument mounted on the front end of a surgical robot arm, and the robot arm is set, such that the surgical instrument rotates around the center of rotation. Such a virtual center of rotation is referred to as a 'remote center' or an 'RCM'. The RCM mechanism of the present disclosure will be described in more detail later.

Hereinafter, each component of the surgical robot arm 100 according to the first embodiment of the present disclosure will be described in more detail.

In this embodiment, for convenience of explanation, the lengthwise direction of a bed on which a patient lies is defined as the X-axis, the widthwise direction of the bed is defined as the Y-axis, and the direction perpendicular to the ground is defined as the Z-axis.

The main body 101 serves as the base of the entire surgical robot arm 100. In this regard, a moving means (not shown) such as a wheel is formed on the bottom surface of the main body 101, and thus the main body 101 may function as a moving member of some sort. In some embodiments, a position fixing means (not shown) may be further formed on the main body 101 to fix the position of the main body 101 during a surgery. However, the present disclosure is not limited thereto, and the main body 101 may be formed in a shape that is attachable to and detachable from a bed or may be formed in a shape that is attachable to and detachable from a wall.

The base link 102 may be formed on one surface, e.g., the top surface, of the main body 101. The base link 102 may be formed to be inclined to a certain angle with respect to the horizontal plane.

In detail, the base link 102 may be formed in the shape of a bent flat-panel, wherein one region of the base link 102 may be coupled to the top surface of the main body 101, and the other region, which is a bent region, of the base link 102 may be disposed perpendicular to the top surface of the main body 101. Although not shown in the drawing, a motor for rotating the yaw driving part 105 may be embedded in the base link 102.

Meanwhile, the yaw driving part 105 is rotatably coupled to the base link 102. In detail, the yaw driving part 105 is formed to yaw-rotatable around the yaw axis Yaw with respect to the base link 102.

In this regard, the yaw axis Yaw may be formed in a direction parallel to the X-axis. At this time, the RCM, which will be described later, may be located on an extension of the yaw axis Yaw. As such, since the RCM is formed to be located on an extension of the yaw axis Yaw, the position and the direction of the RCM for the base link 102 may be maintained constant regardless of the degree of yaw-rotation of the first link 111 with respect to the base link 102.

In this regard, when the yaw driving part 105 rotates around the yaw axis Yaw with respect to the base link 102, the first link 111, the second link 112, and the third link 113, the fourth link 114, and the fifth link 200 connected to the yaw driving part 105 rotate around the yaw axis Yaw together with the yaw driving part 105. Therefore, the coordinate systems of links and the fifth link 200 are not fixed and continuously changes relatively according to the rotation of the yaw driving part 105. In other words, in FIG. 2, etc., the first link 111 is shown as being parallel to the X-axis. However, when the yaw driving part 105 rotates, the coordinate systems of the first link 111 and links connected thereto also rotate. However, for convenience of explanation, in this specification, unless otherwise stated, the first link 111 will be described based on the state in which the first link 111 is located parallel to the X-axis as shown in FIG. 2.

Meanwhile, the yaw driving part 105 and the first link 111 may be fixedly coupled to each other, such that the relative position of the first link 111 with respect to the yaw driving part 105 is constant. In other words, the yaw driving part 105 and the first link 111 may integrally operate together. In this regard, in the drawing, the yaw driving part 105 and the first link 111 are shown as being formed as separate members and fixedly coupled to each other. However, the present disclosure is not limited thereto, and the yaw driving part 105 and the first link 111 may also be integrated with each other.

In this regard, the first link 111 according to the first embodiment of the present disclosure may be formed to be parallel to the horizontal plane. Alternatively, the first link 111 may be formed to be substantially parallel to the fourth link 114, which will be described later. Alternatively, the first link 111 may be disposed on an extension line of the second joint 122 and the RCM or may be disposed to be parallel to this extension line.

At this time, the first joint 121 may include one or more motors and may be connected to the second joint 122 through a belt or a wire. Therefore, the driving force of the first joint 121 can be transmitted to the second joint 122.

The second link 112 is axially coupled to the first link 111 to be rotatable around the second joint 122 with respect to the first link 111. In this regard, the second joint 122 may include one or more pulleys.

The third link 113 is axially coupled to the second link 112 to be rotatable around the third joint 123 with respect to the second link 112. In this regard, the third joint 123 may include one or more pulleys.

The fourth link 114 is axially coupled to the third link 113 to be rotatable around the fourth joint 124 with respect to the third link 113. In this regard, the fourth joint 124 may include one or more pulleys.

The fifth link 200 is axially coupled to the fourth link 114 to be rotatable around the fifth joint 125 with respect to the fourth link 114. In this regard, the fifth joint 125 may include one or more pulleys.

Figure 31:
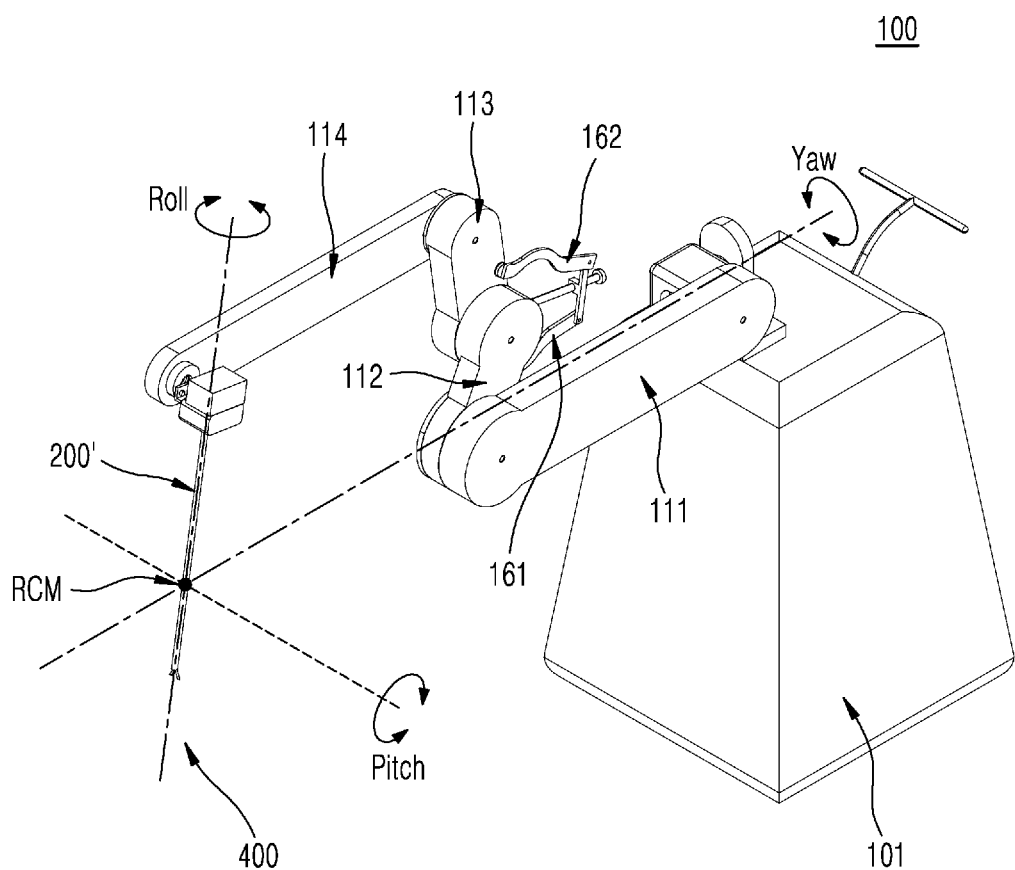
FIG. 31 is a perspective view of a state in which a surgical instrument is mounted on the surgical robot arm of FIG. 2.

In this regard, as shown in FIG. 2, etc., the fifth link 200 may be a camera. Alternatively, as shown in FIG. 31, a fifth link 200' may be a surgical instrument.

Meanwhile, in the drawing, the fifth link 200 itself is shown as a camera or a surgical instrument. However, the present disclosure is not limited thereto, and a camera or a surgical instrument may be formed separately and coupled to the fifth link 200.

In this regard, the fifth link 715 is formed to pass through the RCM. In some embodiments, the fifth link 200 may be formed to be rollable around a roll axis Roll. To this end, although not shown in the drawings, a roll driving part (not shown) may be further formed inside the fifth link 200.

In some embodiments, as described above, the yaw axis Yaw of the base link 102 may also be formed to pass through the RCM.

In other words, the extension line of the fifth link 200 (or the extension line of the roll axis Roll) and the extension line of the yaw axis Yaw may be formed to intersect each other at the RCM.

In this regard, the second joint 122, the fourth joint 124, the fifth joint 125, and the RCM may correspond to four vertices of a parallelogram. In other words, the second joint 122, the fourth joint 124, the fifth joint 125, and the RCM may constitute one parallelogram.

In detail, when there are three vertices including the second joint 122, fourth joint 124, and fifth joint 125, the position of the remaining vertex (i.e., the RCM) of the parallelogram including the three vertices is automatically decided.

In some embodiments, when the second link 112 rotates around the second joint 122 while the position of the second joint 122 is fixed, the second link 112 rotates while the extension line interconnecting the second joint 122 and the RCM and the fourth link 114 is remaining parallel to each other and the extension line interconnecting the second joint 122 and the fourth joint 124 and the fifth joint 125 are remaining parallel to each other. Therefore, the position of the RCM may be maintained constant regardless of the rotation angle of the second link 112.

In this structure, once the surgical robot arm is set up, the RCM always maintains its position. In some embodiments, as links rotate around the RCM, the links maintain a parallelogram-wise arrangement regardless of their positions. In other words, in a state where the main body 101 and the base link 102 are fixed, the position of the RCM does not change regardless of the positions of second to fourth links 112 to 114, and the second joint 122, the fourth joint 124, the fifth joint 125, and the RCM maintain a parallelogram-like arrangement.

In this regard, various power transmission members such as belts, wires, and links may be used to interconnect the first joint 121, the second joint 122, the third joint 123, the fourth joint 124, and the fifth joint 125.

The connection structure between such joints and pulleys will be described in more detail later.

(RCM Concept Diagram—Link Structure)

As an example of the RCM mechanism of the present disclosure, a link structure may be applied.

FIGS. 4A-4C are diagrams showing the operating state of an RCM mechanism of a link structure.

In the case of such a link structure, the surgical robot arm 100 according to the first embodiment of the present disclosure includes the first link 111, the second link 112, the third link 113, the fourth link 114, and the fifth link 200. Furthermore, the surgical robot arm 100 further includes a 2-1 link 112-1 and a 4-1 link 114-1. In some embodiments, the surgical robot arm 100 may include the first joint 121, the second joint 122, the third joint 123, the fourth joint 124, and the fifth joint 125.

In this regard, during an RCM motion, the second link 112 and the third link 113 operate like as one link fixed to each other, and thus, in the description of FIGS. 4A-4C, the second link 112 and the third link 113 will be collectively referred to as the second link 112.

First, when the second link 112 rotates around the second joint 122 with respect to the first link 111, the fourth link 114 and the 2-1 link 112-1 constituting a parallelogram-like arrangement rotate together. At this time, even when links rotate, the parallelogram-like arrangement is maintained, and thus the second link 112 and the 2-1 link 112-1 remain parallel to each other in any rotation state.

Meanwhile, when the fourth link 114 rotates around the fourth joint 124 with respect to the second link 112, the second link 112, the fifth link 200, and the 4-1 Link 114-1 constituting a parallelogram-like arrangement rotate together. At this time, even when links rotate, the parallelogram-like arrangement is maintained, and thus the fourth link 114 and the 4-1 link 114-1 remain parallel to each other in any rotation state.

In this way, in conjunction with the rotation of the second link 112 around the second joint 122, the fourth link 114 also rotates with respect to the second link 112, and the extension line interconnecting the second joint 122 and the RCM and the fourth link 114 remain parallel to each other.

Likewise, in conjunction with the rotation of the fourth link 114 with respect to the second link 112, the fifth link 200 also rotates with respect to the fourth link 114, and thus the second link 112 and the fifth link 200 remain parallel to each other.

As a result, the RCM remains constant in any operating state.

(RCM Concept Diagram—Belt Structure)

As an example of the RCM mechanism of the present disclosure, a belt structure may be applied.

FIGS. 5A-5C are diagrams showing the operating state of the RCM mechanism of a belt structure.

In the case of such a belt structure, the surgical robot arm 100 according to the first embodiment of the present disclosure includes the first link 111, the second link 112, the third link 113, the fourth link 114, and the fifth link 200.

In some embodiments, the surgical robot arm 100 may include the first joint 121, the second joint 122, the third joint 123, the fourth joint 124, and the fifth joint 125.

In this regard, during an RCM motion, the second link 112 and the third link 113 operate like as one link fixed to each other, and thus, in the description of FIGS. 5A-5C, the second link 112 and the third link 113 will be collectively referred to as the second link 112.

In this regard, the first joint 121 may include a pulley 192, the second joint 122 may include a pulley 193-1 and a pulley 193-2, the fourth joint 124 may include a pulley 194-1 and a pulley 194-2, and the fifth joint 125 may include a pulley 195.

In this regard, the pulley 192, the pulley 193-1, the pulley 194-1, and the pulley 195 may be rotating pulleys that rotate around their central axes. Meanwhile, the pulley 193-2 and the pulley 194-2 may be fixed pulleys that do not rotate.

In some embodiments, the surgical robot arm 100 may include a first belt 181, a second belt 182, and a third belt 183.

In this regard, the first belt 181 may interconnect the pulley 192 and the pulley 193-1. The second belt 182 may interconnect the pulley 193-2 and the pulley 194-1. The third belt 183 may interconnect the pulley 194-2 and the pulley 195.

In this regard, the pulley 192, which is a rotating pulley, is connected to a motor (not shown) and may be formed to be rotatable with respect to the first link 111. In some embodiments, it may be assumed that each pulley and a belt are fixedly coupled at one or more points, and thus slip does not occur.

First, the pulley 193-1, which is a rotating pulley, is formed to be rotatable with respect to the first link 111 and is formed integrally with the second link 112. Therefore, when the pulley 193-1 rotates with respect to the first link 111, the second link 112, which is integrated with the pulley 193-1, rotates with respect to the first link 111.

Meanwhile, the pulley 193-2, which is a fixed pulley, is formed integrally with the first link 111.

Meanwhile, the pulley 194-1, which is a rotating pulley, is formed to be rotatable with respect to the second link 112 and is formed integrally with the fourth link 114. Therefore, when the pulley 194-1 rotates with respect to the second link 112, the fourth link 114, which is integrated with the pulley 194-1, rotates with respect to the second link 112.

Meanwhile, the pulley 194-2, which is a fixed pulley, is formed integrally with the second link 112.

Meanwhile, the pulley 195, which is a rotating pulley, is formed to be rotatable with respect to the fourth link 114 and is formed integrally with the fifth link 200. Therefore, when the pulley 195 rotates with respect to the fourth link 114, the fifth link 200, which is integrated with the pulley 195, rotates with respect to the fourth link 114.

At this time, two pulleys tied by one belt need to have the same diameter to maintain an RCM. In other words, it needs to be {diameter of the pulley 192=diameter of the pulley 193-1}, {diameter of the pulley 193-2=diameter of the pulley 194-1}, {diameter of the pulley 194-2=diameter of the pulley 195}.

The motion of such an RCM mechanism of a belt structure will be described.

First, when the pulley 192 connected to a motor (not shown) rotates, the pulley 193-1 connected to the pulley 192 through the first belt 181 also rotates.

In some embodiments, when the pulley 193-1 rotates, the second link 112 formed integrally with the pulley 193-1 rotates with respect to the first link 111.

At this time, while the pulley 193-2 is fixed to the first link 111, the second link 112 rotates with respect to the first link 111, and thus the second belt 182 rotates with respect to the pulley 193-2.

In some embodiments, when the second belt 182 rotates, the pulley 194-1 rotates with respect to the second link 112, and, when the pulley 194-1 rotates, the fourth link 114 integrated with the pulley 194-1 rotates with respect to the second link 112.

In this way, in conjunction with the rotation of the second link 112 with respect to the first link 111, the fourth link 114 also rotates with respect to the second link 112, and the extension line interconnecting the second joint 122 and the RCM and the fourth link 114 remain parallel to each other.

In some embodiments, while the pulley 194-2 is fixed to the second link 112, the fourth link 114 rotates with respect to the second link 112, and thus the third belt 183 rotates with respect to the pulley 194-2.

And, when the belt 183 rotates, the pulley 195 rotates with respect to the fourth link 114, and, when the pulley 195 rotates, the fifth link 200, which is integrated with the pulley 195, rotates with respect to the fourth link 114.

In this way, in conjunction with the rotation of the fourth link 114 with respect to the second link 112, the fifth link 200 also rotates with respect to the fourth link 114, and thus the second link 112 and the fifth link 200 remain parallel to each other.

As a result, the RCM remains constant in any operating state.

(Connection Relationships Between Links, Pulleys, and Joints)

As described above, the surgical robot arm 100 includes the first link 111, the second link 112, the third link 113, the fourth link 114, and the fifth link 200. When the setup of the surgical robot arm 100 is completed, the position of the first link 111 is fixed and may not be moved. Descriptions will be given below under the assumption that the position of the first link 111 is fixed.

The first joint 121 is formed at one end of the first link 111. The second link 112 is coupled to the other end of the first link 111 to be rotatable with respect to the first link 111. The joint between the first link 111 and the second link 112 forms the second joint 122.

The third link 113 is coupled to one end of the second link 112 to be rotatable with respect to the second link 112. The joint between the second link 112 and the third link 113 forms the third joint 123.

The fourth link 114 is coupled to one end of the third link 113 to be rotatable with respect to the third link 113. The joint between the third link 113 and the fourth link 114 forms the fourth joint 124.

The fifth link 200 is coupled to one end of the fourth link 114 to be rotatable with respect to the fourth link 114. The joint between the fourth link 114 and the fifth link 200 forms the fifth joint 125.

The surgical robot arm 100 includes a first driving part 151 and a second driving part 152.

In this regard, the first driving part 151 may be connected to pulleys and links and provide driving force to rotate at least some of the pulleys and the links. In some embodiments, the second driving part 152 may be connected to pulleys and links and provide driving force to rotate at least some of the pulleys and the links. In this regard, the first driving part 151 and the second driving part 152 may be motors.

The first driving part 151 and the second driving part 152 are coupled to the first link 111. More specifically, the first driving part 151 and the second driving part 152 are coupled to one end of the first link 111 at which the first joint 121 is formed.

In this regard, the second driving part 152 is coupled to the rotation axis of the first driving part 151, and thus, when the rotation axis of the first driving part 151 rotates, the entire second driving part 152 rotates.

Meanwhile, the second driving part 152 and a pulley 131 are fixedly coupled to each other, and thus, when the second driving part 152 itself rotates, the pulley 131 also rotates together with the second driving part 152.

In some embodiments, a pulley 133 is coupled to the rotation axis of the second driving part 152, and thus, when the rotation axis of the second driving part 152 rotates, the pulley 133 rotates.

As a result, when the rotation axis of the first driving part 151 rotates, the second driving part 152, the pulley 131, and the pulley 133 all rotate around the rotation axis of the first driving part 151. An RCM motion is performed as the first driving part 151 is driven.

Meanwhile, when the rotation axis of the second driving part 152 rotates, the pulley 133 rotates. A translation motion of the fifth link 200 is performed as the second driving part 152 is driven.

In the present disclosure, an RCM motion may be defined as a motion in which the fifth link 200 rotates around an RCM. In some embodiments, a translation motion may be defined as a motion in which the fifth link 200 moves along a roll axis.

In this regard, the first driving part 151 and the second driving part 152 may rotate independently of each other, and thus the RCM motion and the translation motion may also be performed independently of each other. Detailed descriptions thereof will be given later.

Meanwhile, although the drawings show that the second driving part 152 is coupled to the rotation axis of the first driving part 151, the present disclosure is not limited thereto. In other words, the first driving part 151 and the second driving part 152 may be formed separately. In this case, the first driving part 151 and the second driving part 152 may be controlled to be driven simultaneously for an RCM motion. Meanwhile, to perform a translation motion, only the second driving part 152 may be controlled to be driven.

Below, the connection relationship between pulleys will be described in more detail. In this regard, to express the rotation of each pulley, a reference point is shown above each pulley in FIGS. 14A to 18B.

The pulley 131 and a pulley 132 are connected to each other by a power transmission member 171. Therefore, when any one of the pulley 131 and the pulley 132 rotates, the other one of the pulley 131 and the pulley 132 may also rotate together. In this regard, the diameters of the pulley 131 and the pulley 132 may be identical to each other.

The pulley 132 and a pulley 135 are integrally formed with each other and rotate together. Alternatively, the pulley 132 and the pulley 135 may be connected to each other by a separate connecting member and rotate together.

The pulley 135 and a pulley 136 are connected to each other by a power transmission member 173. Therefore, when any one of the pulley 135 and the pulley 136 rotates, the other one of the pulley 135 and the pulley 136 may also rotate together. In this regard, the diameters of the pulley 135 and the pulley 136 may be identical to each other.

The pulley 136 and a pulley 139 are formed integrally with each other and rotate together. Alternatively, the pulley 136 and the pulley 139 may be connected to each other by a separate connecting member and rotate together.

The pulley 139 and a pulley 140 are connected to each other by a power transmission member 174. Therefore, when any one of the pulley 139 and the pulley 140 rotates, the other one of the pulley 139 and the pulley 140 may also rotate together. In this regard, the diameters of the pulley 139 and the pulley 140 may be identical to each other.

The pulley 140 and a pulley 143 are formed integrally with each other and rotate together. Alternatively, the pulley 140 and the pulley 143 may be connected to each other by a separate connecting member and rotate together.

The pulley 143 and a pulley 144 are connected to each other by a power transmission member 175. Therefore, when any one of the pulley 143 and the pulley 144 rotates, the other one of the pulley 143 and the pulley 144 may also rotate together. In this regard, the diameters of the pulley 143 and the pulley 144 may be identical to each other.

The pulley 144 is coupled to the fifth link 200. In other words, the fifth link 200 may be formed to be rotatable about the rotation axis of the pulley 144.

The connection relationship between the pulley 131, the pulley 132, the pulley 135, the pulley 136, the pulley 139, the pulley 140, the pulley 143, and the pulley 144 is as follows.

When the pulley 131 rotates, the pulley 132 connected to the pulley 131 through the power transmission member 171 rotates. When the pulley 132 rotates, the pulley 135 fixedly coupled to the pulley 132 rotates together. When the pulley 135 rotates, the pulley 136 connected to the pulley 135 through the power transmission member 173 rotates. When the pulley 136 rotates, the pulley 139 fixedly coupled to the pulley 136 rotates together. When the pulley 139 rotates, the pulley 140 connected to the pulley 139 through the power transmission member 174 rotates. When the pulley 140 rotates, the pulley 143 fixedly coupled to the pulley 140 rotates. When the pulley 143 rotates, the pulley 144 connected to the pulley 143 through the power transmission member 175 rotates.

In this regard, the pulley 132 and the pulley 135 are integrally formed, the pulley 136 and pulley 139 are integrally formed, and the pulley 140 and the pulley 143 are integrally formed. Also, the pulley 135 and the pulley 136 are connected to each other by the power transmission member 173, and the pulley 139 and the pulley 140 are connected to each other by the power transmission member 174.

Therefore, when the pulley 131 rotates, the pulley 132, the pulley 135, the pulley 136, the pulley 139, the pulley 140, the pulley 143, and the pulley 144 may all rotate by the same angle.

In this regard, the pulley 131, the pulley 132, the pulley 135, the pulley 136, the pulley 139, the pulley 140, the pulley 143, and the pulley 144 that are connected to each other and rotate together may be defined as a first set of pulleys.

In some embodiments, when the rotation axis of the first driving part 151 rotates, pulleys included in the first set of pulleys may rotate together by the same angle.

Meanwhile, the pulley 133 and a pulley 134 are connected to each other by a power transmission member 172. Therefore, when any one of the pulley 133 and the pulley 134 rotates, the other one of the pulley 133 and the pulley 134 may also rotate together. In this regard, the diameters of the pulley 133 and the pulley 134 may be identical to each other.

The pulley 134 and the second link 112 may be fixedly coupled to each other and rotate together. Alternatively, the pulley 134 and the second link 112 may be formed integrally, or the pulley 134 and the second link 112 may be connected to each other by a separate connecting member and rotate together.

Therefore, when the pulley 133 rotates, both the pulley 134 and the second link 112 may rotate by the same angle.

In this regard, the pulley 133 and the pulley 134 that are connected to each other and rotate together may be defined as a second set of pulleys.

In some embodiments, when the rotation axis of the second driving part 152 rotates, pulleys included in the second set of pulleys may rotate together by the same angle.

A pulley 137 is fixedly coupled to one end of the first link 111.

The pulley 137 and a pulley 138 are connected to each other by a power transmission member 176. Therefore, when any one of the pulley 137 and the pulley 138 rotates, the other one of the pulley 137 and the pulley 138 may also rotate together. In this regard, the diameters of the pulley 137 and the pulley 138 may be identical to each other.

The pulley 138 and a pulley 141 are formed integrally with each other and rotate together. Alternatively, the pulley 138 and the pulley 141 may be connected to each other by a separate connecting member and rotate together.

The pulley 141 and a pulley 142 are connected to each other by a power transmission member 177. Therefore, when any one of the pulley 141 and the pulley 142 rotates, the other one of the pulley 141 and the pulley 142 may also rotate together. In this regard, the diameters of the pulley 141 and the pulley 142 may be identical to each other.

When the pulley 137 rotates, the pulley 138 connected to the pulley 137 through the power transmission member 176 rotates. When the pulley 138 rotates, the pulley 141 fixedly coupled to the pulley 138 rotates together. When the pulley 141 rotates, the pulley 142 connected to the pulley 141 through the power transmission member 177 rotates.

Therefore, when the pulley 137 rotates, the pulley 138, the pulley 141, and the pulley 142 may all rotate by the same angle.

However, the pulley 137 is fixedly coupled to the first link 111. Therefore, when the first link 111 is fixed, the pulley 137 is also fixed and does not move or rotate. Therefore, in this case, the pulley 138, the pulley 141, and the pulley 142 do not rotate around their own axes.

Meanwhile, as the second link 112 and the third link 113 rotate, the positions of the pulley 138, the pulley 141, and the pulley 142 may be moved. In this way, even when the second link 112 and the third link 113 rotate, the pulley 138, the pulley 141, and the pulley 142 do not rotate about their axes, and thus the position of the reference point of each pulley remains the same in any state.

In some embodiments, the pulley 142 and the fourth link 114 may be fixedly coupled to each other. Alternatively, the pulley 142 and the fourth link 114 may be formed integrally, or the pulley 142 and the fourth link 114 may be connected to each other by a separate connecting member and rotate together.

As a result, the first link 111 is fixedly coupled to the pulley 137, the fourth link 114 is fixedly coupled to the pulley 142, and the pulley 137, the pulley 138, the pulley 141, and the pulley 142 all rotate by the same angle by power transmission members, and thus the angle formed by the first link 111 and the fourth link 114 may always be maintained constant. For example, when the first link 111 and the fourth link 114 are initially set to be horizontal, the first link 111 and the fourth link 114 may always be maintained parallel to each other at any position.

In this regard, the pulley 137, the pulley 138, the pulley 141, and the pulley 142, which are connected to one another and do not rotate around their own axes, may be defined as a third set of pulleys.

By the third set of pulleys, the extension line interconnecting the second joint 122 and the RCM and the fourth link 114 may be maintained parallel to each other.

In this regard, the power transmission member 171, the power transmission member 172, the power transmission member 173, the power transmission member 174, the power transmission member 175, the power transmission member 176, and the power transmission member 177 may each include a belt or a wire.

In this regard, each pulley and a power transmission member are fixedly coupled at one or more points, and thus slip does not occur.

Hereinafter, the motion guide assembly 160 will be described in more detail.

The motion guide assembly 160 may include a first auxiliary link 161, a second auxiliary link 162, a third auxiliary link 163, and a fourth auxiliary link 164.

The first auxiliary link 161 may be rotatably coupled to the second link 112. In this regard, a first connection part 165 is formed at one end of the first auxiliary link 161, and the first connection part 165 may be rotatably coupled to a region (e.g., the center region) of the second link 112.

The second auxiliary link 162 may be rotatably coupled to the third link 113. In this regard, a second connection part 166 is formed at one end of the second auxiliary link 162, and the second connection part 166 may be rotatably coupled to one region (e.g., the center region) of the third link 113.

Meanwhile, the third auxiliary link 163 may be axially coupled to the first auxiliary link 161 and the second auxiliary link 162 to be rotatable with respect to the first auxiliary link 161 and the second auxiliary link 162. In other words, one end of the third auxiliary link 163 may be axially coupled to one end of the first auxiliary link 161, such that the first auxiliary link 161 is rotatable with respect to the third auxiliary link 163. In some embodiments, the other end of the third auxiliary link 163 may be axially coupled to one end of the second auxiliary link 162, such that the second auxiliary link 162 is rotatable with respect to the third auxiliary link 163.

Meanwhile, the fourth auxiliary link 164 may protrude from the pulley 139 in one direction. Therefore, the fourth auxiliary link 164 may rotate integrally with the pulley 139.

A through hole is formed in the third auxiliary link 163, and the fourth auxiliary link 164 may be inserted into the through hole. Therefore, the third auxiliary link 163 may be formed to be able to linearly reciprocate along the fourth auxiliary link 164.

Alternatively, as shown in FIGS. 14A to 19B, the third auxiliary link 163 may be omitted, and the first auxiliary link 161 and the second auxiliary link 162 may be directly coupled to the fourth auxiliary link 164.

In this regard, the first auxiliary link 161 and the second auxiliary link 162 may have the same length. In some embodiments, the fourth auxiliary link 164 may be perpendicular to a straight line interconnecting the first connection part 165 and the second connection part 166. Alternatively, a distance between the first connection part 165 and the pulley 139 and a distance between the second connection part 166 and the pulley 139 may be identical to each other.

In this regard, since the lengths of the first auxiliary link 161 and the second auxiliary link 162 do not change, no matter where the first connection part 165 and the second connection part 166 are located, the above-stated triangle maintains the shape of an isosceles triangle. In other words, triangles on both sides of the fourth auxiliary link 164 may always be congruent. Therefore, the angle formed by the first auxiliary link 161 and the fourth auxiliary link 164 and the angle formed by the second auxiliary link 162 and the fourth auxiliary link 164 are always identical to each other. (Refer to α of FIG. 19A or β of FIG. 19B)

In other words, it may be said that, since the first auxiliary link 161 and the second auxiliary link 162 are configured to be coupled to the fourth auxiliary link 164, which is disposed therebetween in a vertical direction, and move along the fourth auxiliary link 164, the above-stated triangle maintains the shape of an isosceles triangle.

Due to the structure, regardless of the positions of the first connection part 165 and the second connection part 166, the angle formed by the first auxiliary link 161 and the fourth auxiliary link 164 and the angle formed by the second auxiliary link 162 and the fourth auxiliary link 164 are always maintained constant, and thus a translation motion may be performed. Meanwhile, although not shown in the drawings, various mechanisms for maintaining the angle formed by the first auxiliary link 161 and the fourth auxiliary link 164 and the angle formed by the second auxiliary link 162 and the fourth auxiliary link 164 always constant are also included in the present disclosure.

In this regard, the motion guide assembly 160 may have a first motion mode and a second motion mode.

The first motion mode of the motion guide assembly 160 is an motion mode that performs an RCM motion. In the first motion mode of the motion guide assembly 160, the second link 112 and the third link 113 integrally rotate together around the second joint 122. Meanwhile, the second motion mode of the motion guide assembly 160 is an motion mode in which a translation motion is performed. In the second motion mode of the motion guide assembly 160, the third link 113 rotates with respect to the second link 112.

In other words, the first motion mode is an motion mode in which the motion guide assembly 160 rotates around the second joint 122 while the motion guide assembly 160 maintains its shape, and thus the second link 112 and the third link 113 integrally rotate together around the second joint 122. Meanwhile, the second motion mode is an motion mode in which the shape of the motion guide assembly 160 changes as the third link 113 rotates with respect to the second link 112.

In other words, the first motion mode of the motion guide assembly 160 is a state in which the first driving part 151 rotates and the second driving part 152 also rotates together. Meanwhile, the second motion mode of the motion guide assembly 160 is a state in which the second driving part 152 rotates independently.

In other words, the first motion mode of the motion guide assembly 160 is a state in which the first set of pulleys and the second set of pulleys stated above rotate together. Meanwhile, the second motion mode of the motion guide assembly 160 is a state in which only the above-stated second set of pulleys rotate.

Hereinafter, an RCM motion and a translation motion of the motion guide assembly 160 in the first motion mode and the second motion mode will be described in more detail.

(RCM Motion)

An RCM motion may be performed as the first driving part 151 is driven.

As described above, according to an embodiment of the present disclosure, since the second driving part 152 is coupled to the rotation axis of the first driving part 151, when the rotation axis of the first driving part 151 rotates, the entire second driving part 152 rotates. In other words, when the first driving part 151 is driven, the rotation axis of the first driving part 151 rotates and, at the same time, the rotation axis of the second driving part 152 also rotates.

In this way, when the rotation axis of the first driving part 151 rotates, the second driving part 152 also rotates, and thus the pulley 131 coupled to the rotation axis of the first driving part 151 and the pulley 133 coupled to the rotation axis of the second driving part 152 rotate together by the same angle.

When the pulley 131 rotates, the pulley 132, the pulley 135, the pulley 136, the pulley 139, the pulley 140, the pulley 143, and the pulley 144 all rotate by the same angle. In other words, when the rotation axis of the first driving part 151 rotates, the pulleys of the first set of pulleys all rotate together by the same angle.

When the pulley 133 rotates, the pulley 134 and the second link 112 fixedly coupled thereto rotate. In other words, when the rotation axis of the first driving part 151 rotates, (the second driving part 152 rotates, and thus) the pulleys of the second set of pulleys all rotate together by the same angle.

At this time, since the pulley 131 and the pulley 133 rotate at the same time by the same angle, the pulley 135 and the pulley 136 also rotate by the same angle by which the pulley 134 and the second link 112 rotate. In some embodiments, since the pulley 136 and the fourth auxiliary link 164 are integrally formed, the fourth auxiliary link 164 also rotates together with the pulley 136.

As a result, when the pulley 131 and the pulley 133 rotate together, the second link 112 and the fourth auxiliary link 164 rotate together, and thus the angle formed by the first auxiliary link 161 and the fourth auxiliary link 164 is maintained constant.

In some embodiments, as described above, the straight line interconnecting the first connection part 165 and the second connection part 166, the extension line of the first auxiliary link 161, and the extension line of the second auxiliary link 162 form an isosceles triangle. Therefore, when the angle formed by the first auxiliary link 161 and the fourth auxiliary link 164 is maintained constant, the angle formed by the second auxiliary link 162 and the fourth auxiliary link 164 also needs to be maintained constant. In some embodiments, when the above-stated angles are maintained constant, the length of the straight line interconnecting the first connection part 165 and the second connection part 166 also needs to be maintained constant. As a result, when the second link 112 rotates, the shape of the isosceles triangle is maintained constant. Therefore, when the second link 112 rotates, the shape of the isosceles triangle is maintained constant, and, as a result, the second auxiliary link 162 moves the third link 113 by pushing or pulling the third link 113.

In other words, when the rotation axis of the first driving part 151 rotates, the pulley 134 and the second link 112 fixedly coupled thereto rotate around the second joint 122, and the isosceles triangle also rotates around the second joint 122 while the shape of the isosceles triangle is maintained constant. Therefore, the second link 112 and the third link 113 integrally rotate around the second joint 122.

In other words, it may be said that, while the relative positions of the second link 112 and the third link 113 are maintained constant, the second link 112 and the third link 113 rotate together around the second joint 122.

In other words, it may be said that, while the distance between the first connection part 165 and the second connection part 166 is maintained constant, the second link 112 and the third link 113 rotate together around the second joint 122.

Hereinafter, during an RCM motion, the two links that integrally rotate will be referred to as 'second link 112/third link 113'.

On the other hand, when the first link 111 is fixed, the pulley 137 fixedly coupled to the first link 111 also does not rotate from a fixed state, and thus the pulley 138, the pulley 141, and the pulley 142 also do not rotate around their axes. In some embodiments, even when the second link 112 and the third link 113 rotate, the pulley 138, the pulley 141, and the pulley 142 do not rotate about their axes, and thus the position of the reference point of each pulley remains the same in any state. In some embodiments, the pulley 142 is fixedly coupled to the fourth link 114. Therefore, the first link 111 and the fourth link 114 remain parallel to each other.

In summary, when the rotation axis of the first driving part 151 rotates, the pulleys of the first set of pulleys and the pulleys of the second set of pulleys all rotate by the same angle. At this time, the pulleys of the third set of pulleys do not rotate around their own axes. Therefore, when the rotation axis of the first driving part 151 rotates, the second link 112 and the third link 113 integrally rotate around the second joint 122. While the first link 111 remains parallel, the pulley 134 and the second link 112/third link 113 connected to the pulley 134 rotate by a certain angle around the central axis of the pulley 134. In some embodiments, while the fourth link 114 remains parallel, the pulley 144 and the fifth link 200 connected to the pulley 144 rotate by a certain angle around the rotation axis of the pulley 144. Therefore, the second link 112/third link 113 and the fifth link 200 rotate while remaining parallel to each other.

In other words, when the rotation axis of the first driving part 151 rotates, the first link 111 and the fourth link 114 maintain a state of being parallel to each other (horizontal state), and the second link 112/third link 113 and the fifth link 200 rotate while maintaining a state of parallel to each other. As a result, the RCM motion is performed. At this time, while the second link 112/third link 113 and the fifth link 200 remain parallel to each other, the distance between the second joint 122 and the fourth joint 124 is maintained constant.

Meanwhile, although not shown in the drawings, when the first driving part 151 and the second driving part 152 are not coupled to each other and rotate independently of each other, the first driving part 151 and the second driving part 152 need to be driven separately for an RCM motion. (Translation Motion)

When only the second driving part 152 is driven and the first driving part 151 is not driven, a translation motion may be performed as the second driving part 152 is driven. In the present disclosure, a translation motion refers to a motion in which the fifth link 200 moves in a constant direction parallel to the roll axis R of the fifth link 200.

Referring to FIGS. 16A to 19B, when the rotation axis of the second driving part 152 rotates, the pulley 133 rotates. (At this time, the pulley 131 does not rotate.)

When the pulley 133 rotates, the pulley 134 connected to the pulley 133 through the power transmission member 172 rotates. When the pulley 134 rotates, the second link 112 fixedly coupled to the pulley 134 rotates in the direction indicated by an arrow A of FIG. 16B. In other words, when the rotation axis of the second driving part 152 rotates, the pulleys of the second set of pulleys and the second link 112 connected thereto all rotate together by the same angle.

At this time, all pulleys not connected to the second driving part 152, i.e., the pulley 131, the pulley 132, the pulley 135, the pulley 136, the pulley 137, the pulley 138, the pulley 139, the pulley 140, the pulley 141, the pulley 142, the pulley 143, and the pulley 144, do not rotate around their own rotation axes. In other words, the pulleys of the first set of pulleys do not rotate around their rotation axes.

In this way, when the second link 112 rotates in the direction indicated by the arrow A of FIG. 16B around the second joint 122 in a state in which the other pulleys do not rotate, the third joint 123 located at the opposite end of the second link 112 revolves around the second joint 122 and the position of the third joint 123 changes.

In some embodiments, when the position of the third joint 123 changes, the fourth auxiliary link 164 fixedly coupled to the pulley 136/pulley 139 of the third joint 123 moves in the direction indicated by an arrow B of FIG. 16B. Therefore, the angle formed by the first auxiliary link 161 and the fourth auxiliary link 164 also changes. At this time, since the shape of an isosceles triangle needs to be maintained, the second auxiliary link 162 rotates with respect to the fourth auxiliary link 164 and the angle formed by the second auxiliary link 162 and the fourth auxiliary link 164 also changes in the same way. In some embodiments, as the second auxiliary link 162 moves in this way, the third link 113 coupled to the second auxiliary link 162 also moves. In other words, the second auxiliary link 162 moves the third link 113 by pushing or pulling the third link 113.

Figure 19B:
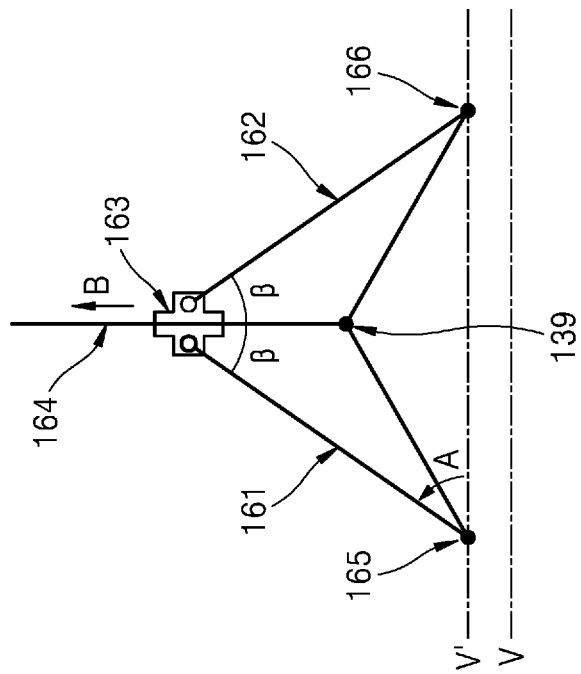
Figure 19A:
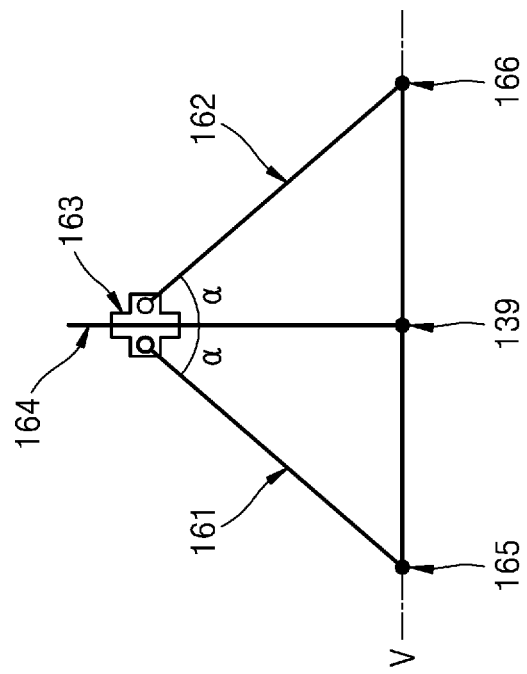

In other words, when only the second driving part 152 is driven, the angle formed by the first auxiliary link 161 and the fourth auxiliary link 164 is changed from α of FIG. 19A to β of FIG. 19B.

However, as described above, the fourth link 114 connected to the third link 113 through the fourth joint 124 always maintains a state of being parallel to the first link 111, and thus the fourth joint 124 moves in the direction indicated by an arrow C of FIG. 16B while the fourth link 114 remains parallel to the first link 111. In some embodiments, when the fourth joint 124 moves in the direction indicated by the arrow C of FIG. 16B, the fourth link 114 connected to the fourth joint 124 and the fifth link 200 connected to the fourth link 114 move overall in the direction indicated by the arrow C. As a result, the translation motion of the fifth link 200 is performed.

In this regard, since the pulley 137, the pulley 138, the pulley 141, and the pulley 142 do not rotate around their own axes, the position of the reference point of each pulley with respect to the rotation axis of each pulley remains the same in any state. Therefore, even when the second link 112 rotates as the second driving part 152 rotates, a virtual link V interconnecting the second joint 122 and the fourth joint 124 always remains constant. In some embodiments, the virtual link V interconnecting the second joint 122 and the fourth joint 124 and a virtual link V' interconnecting the first connection part 165 and the second connection part 166 remain parallel to each other.

In other words, it may be said that, when the second link 112 rotates with respect to the fourth auxiliary link 164, the first auxiliary link 161 and the second auxiliary link 162 rotate by the same angle with respect to the fourth auxiliary link 164, and, due to the rotation of the second auxiliary link 162, the third link 113 rotates with respect to the second link 112, and thus a translation motion is performed.

In other words, it may be said that, during the translation motion, the second link 112 and the third link 113 rotate together around the third joint 123, and, at this time, the second link 112 and the third link 113 rotate together by the same angle around the third joint 123.

During such a translation motion, while the second link 112/third link 113 and the fifth link 200 remain parallel to each other, the distance between the second joint 122 and the fourth joint 124 changes. In other words, while the extension line interconnecting the second joint 122 and the RCM and the fourth link 114 remain parallel to each other, the fourth link 114 moves in parallel to the extension line.

As such, according to the present disclosure, the RCM motion is performed as the first driving part 151 is driven, and the translation motion is performed as the second driving part 152 is driven. In other words, when a straight line passing through the reference point of the pulley 132 and the central axis of the pulley 132 is referred to as a first axis and a straight line passing through the reference point of the pulley 134 and the central axis of the pulley 134 is referred to as a second axis, it may be said that an RCM motion is performed when the first axis and the second axis rotate together and it may be said that a translation motion is performed when the first axis is fixed and only the second axis rotates.

Therefore, according to the present disclosure, it is possible to achieve the effect of mechanically performing an RCM motions and a translation motions without controlling five joints through software. In other words, instead of controlling all 5 degrees of freedom by attaching motors to all 5 joints (degrees of freedom), the effect of enabling an RCM motion and a translation motion by controlling only two motors may be obtained. Furthermore, an RCM motion may be performed mechanically without a separate control, and a translation motion or an RCM motion may each be performed independently without affecting the other motion.

Meanwhile, in an existing surgical robot arms, a translation link equal to or longer than a translation motion distance (i.e., a stroke) is needed to implement a translation motion of a surgical instrument or a camera. However, in the case of the present disclosure, a translation motion may be implemented without a separate translation link. Therefore, the space for a translation link becomes unnecessary, thereby facilitating securing of space.

(Motion of Surgical Robot Arm)

FIGS. 20A to 22B are side and top views showing RCM motion (pitch motion) around a pitch axis P of the surgical robot arm of FIG. 2.

As shown in FIGS. 20A to 22B, when the rotation axis of the first driving part 151 rotates, the pulley 131 and the pulley 133 rotate together by the same angle. As a result, the pulleys of the first set of pulleys and the pulleys of the second set of pulleys all rotate together by the same angle, and thus the second link 112 and the third link 113 integrally rotate around the second joint 122. In some embodiments, in conjunction thereto, the first link 111 and the fourth link 114 maintain a state of being parallel to each other (horizontal state), and the second link 112/third link 113 and the fifth link 200 rotate while maintaining a state of parallel to each other. As a result, the RCM motion is performed. In other words, the RCM of the surgical robot arm 100 is maintained constant in any operating state around the pitch axis P.

Figure 23:
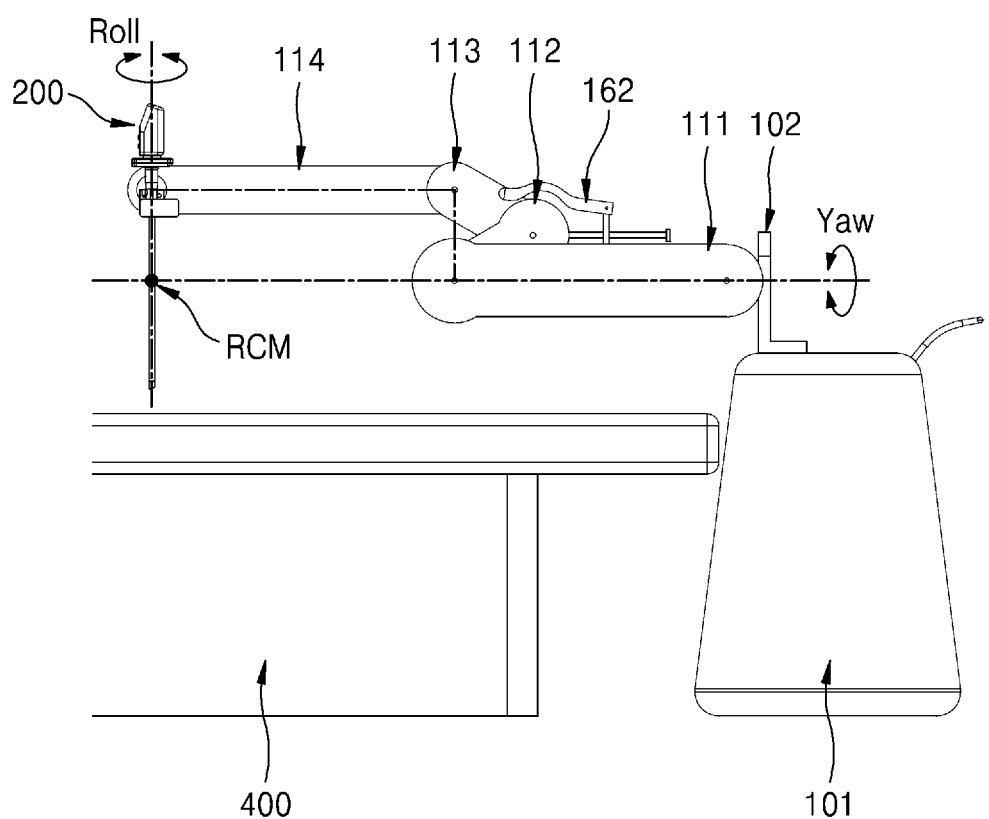
FIGS. 23, 24, and 25 are side views and top views of RCM motions (pitch motions) around the pitch axis P of the surgical robot arm of FIG. 2.
Figure 24:
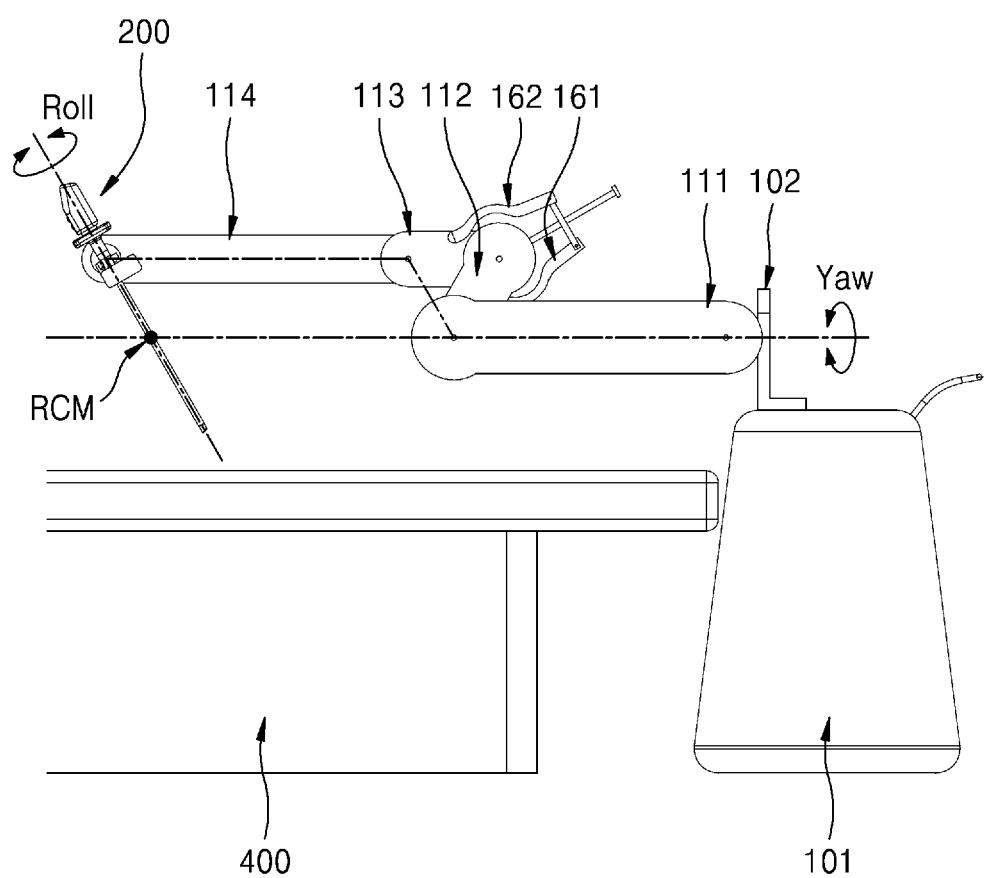
Figure 25:
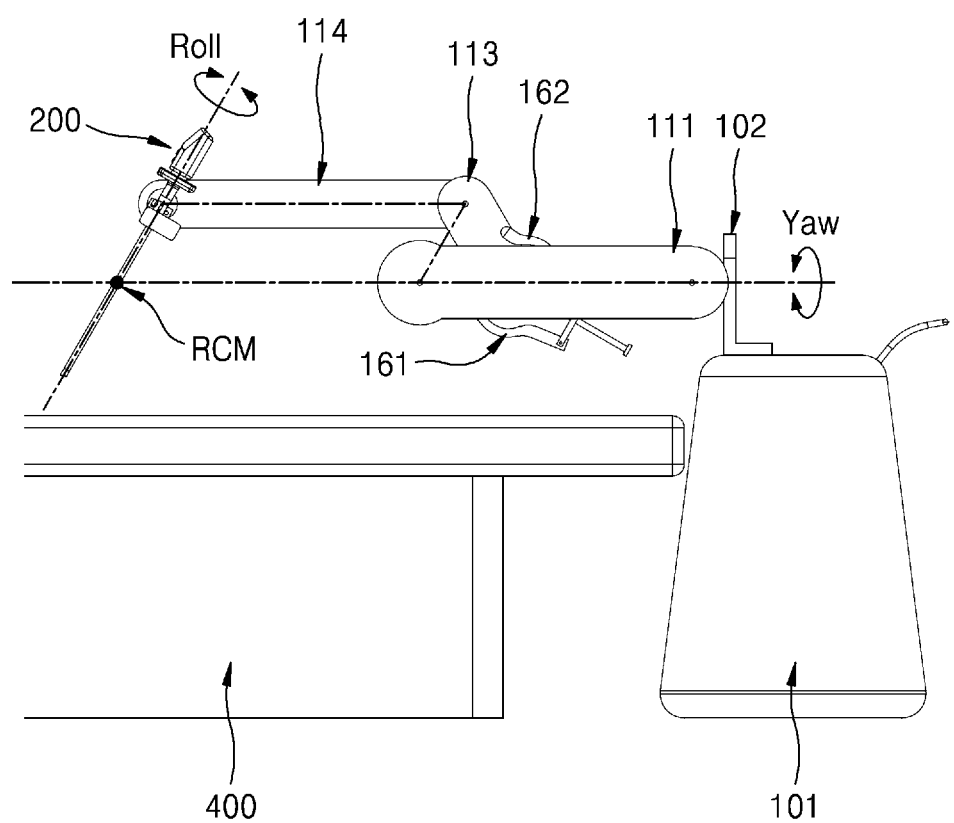

Meanwhile, as shown in the plan view of each drawing, the first link 111, the second link 112, FIGS. 23, 24, and 25 are side views and top views of RCM motions (pitch motions) around the pitch axis P of the surgical robot arm of FIG. 2.

Figure 20B:
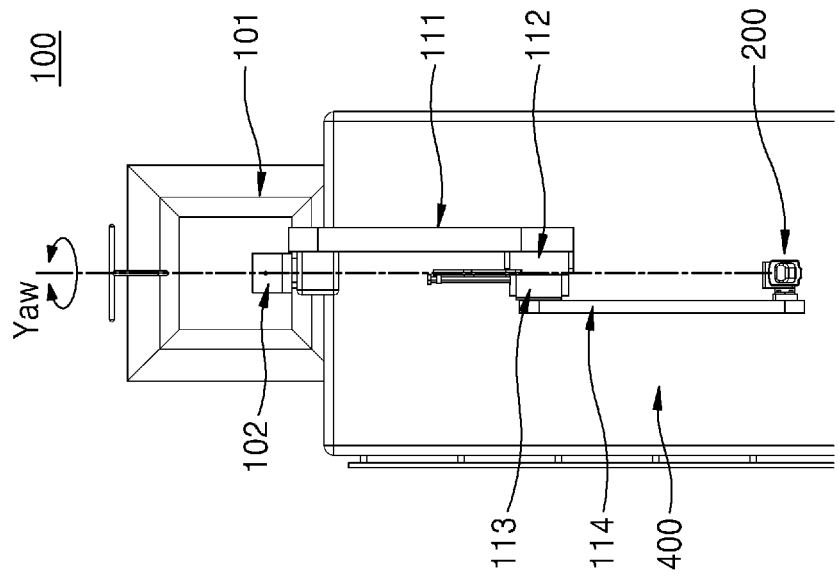
Figure 20A:
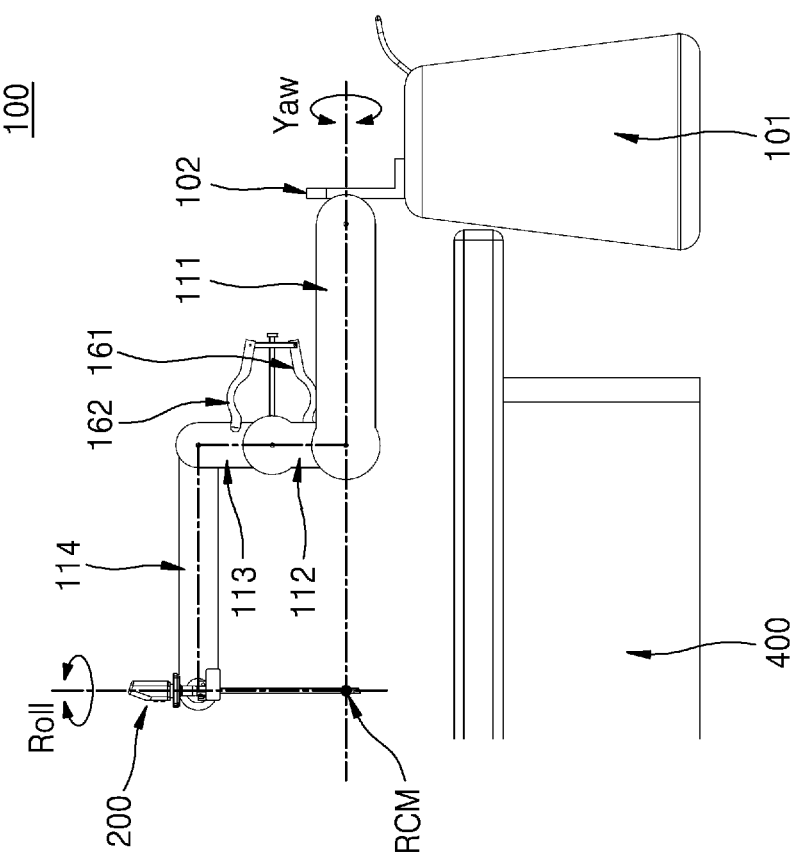
Figure 21B:
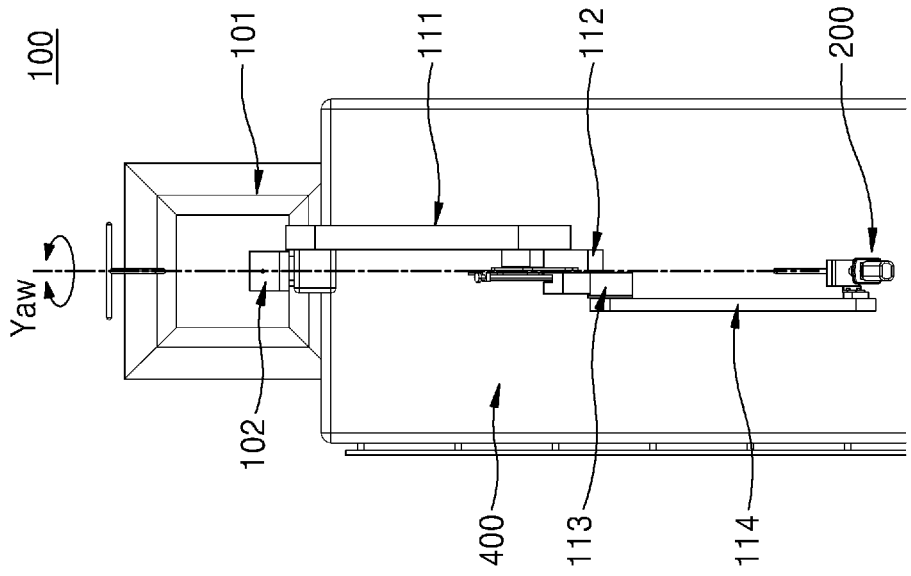
Figure 21A:
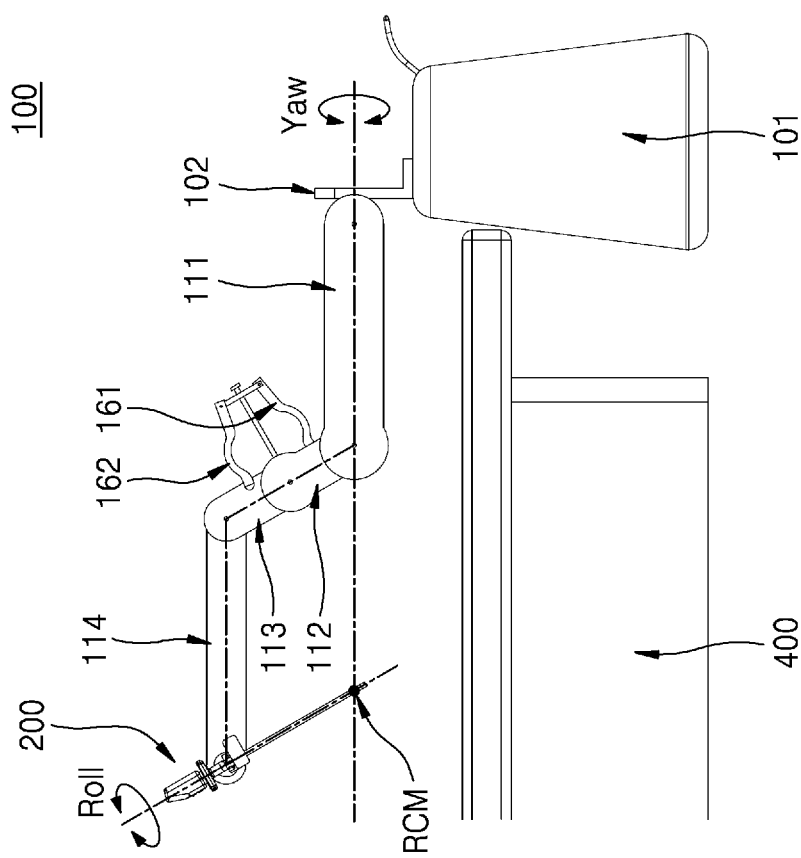

Compared to the posture of the surgical robot arm 100 shown in FIG. 20A, etc., the posture of the surgical robot arm 100 shown in FIG. 23, etc. is in a state in which a certain degree of translation motion has been performed. In other words, compared to FIGS. 20A and 20B, in FIG. 23, the fifth link 200 has moved to a certain degree along the roll axis Roll, and thus, while the second link 112/third link 113 and the fifth link 200 maintain the state of being parallel to each other, the distance between the second joint 122 and the fourth joint 124 changes.

Figure 26:
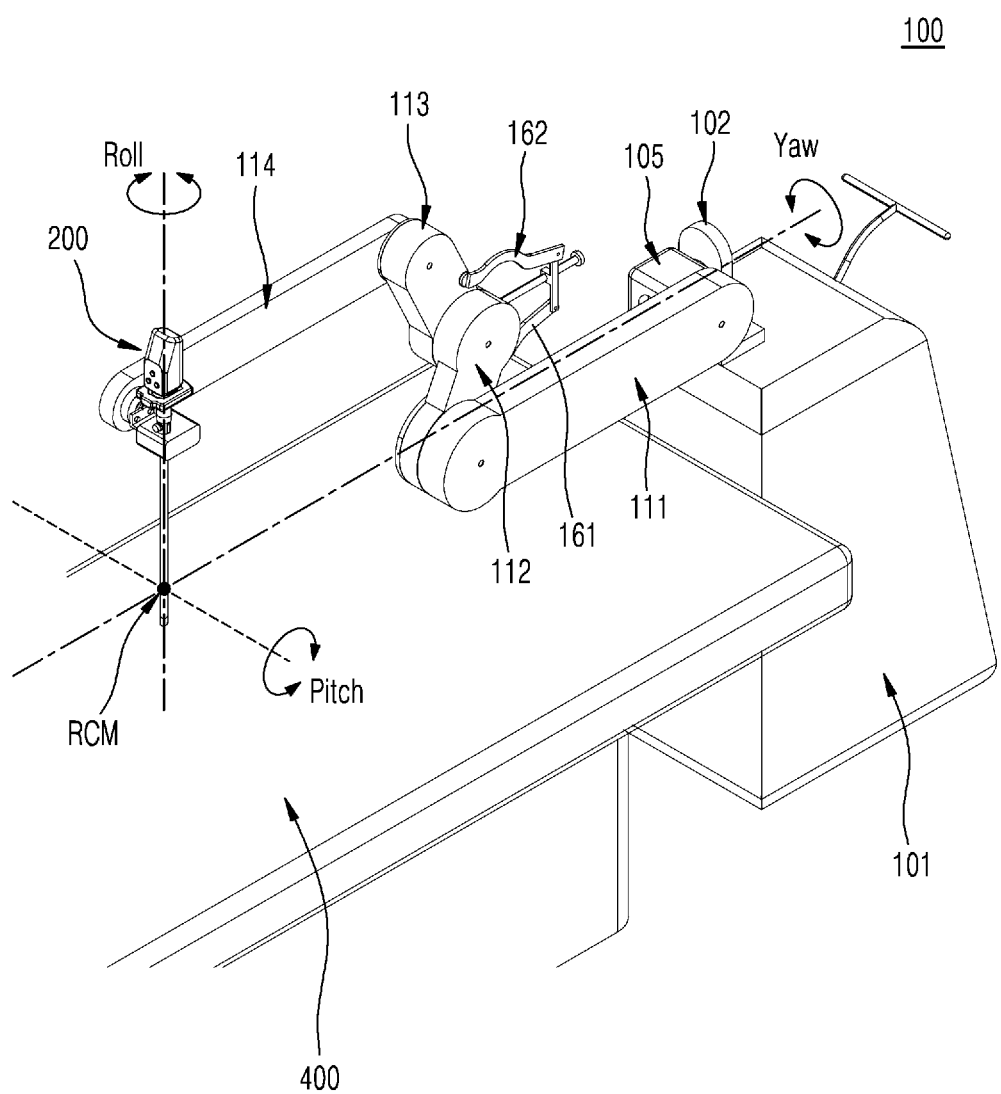
FIGS. 26, 27, and 28 are perspective views of RCM motions (yaw motions) around the yaw axis Yaw of the surgical robot arm of FIG. 2.
Figure 27:
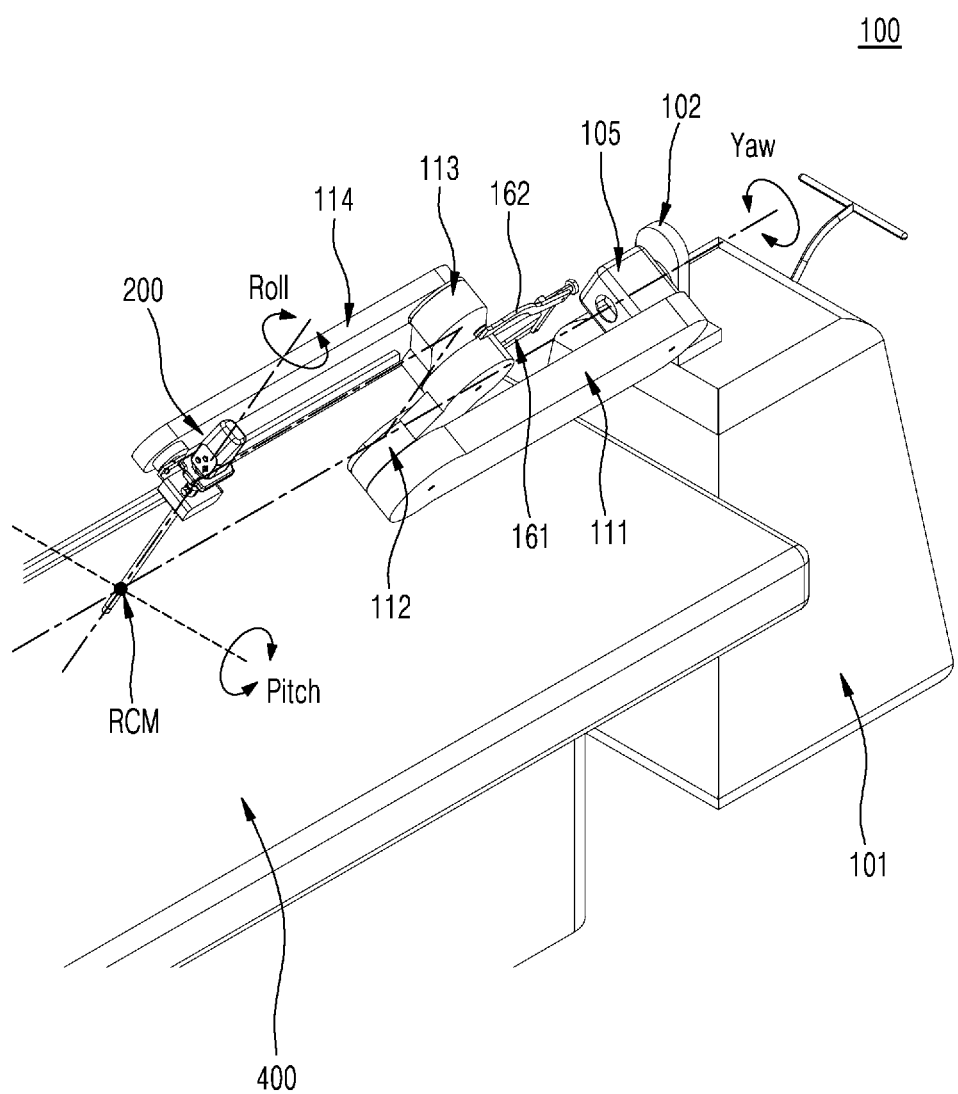
Figure 28:
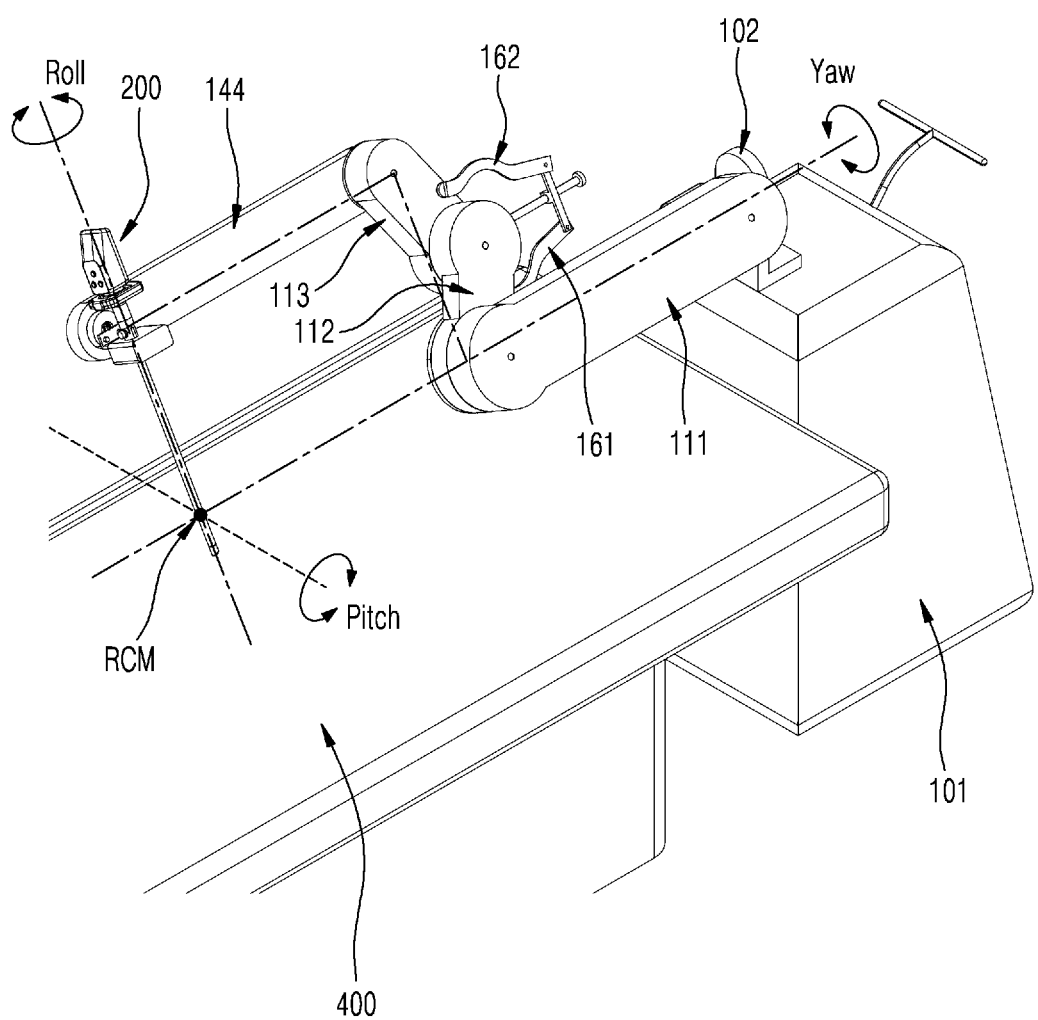

FIGS. 26, 27, and 28 are perspective views of RCM motions (yaw motions) around the yaw axis Yaw of the surgical robot arm of FIG. 2.

As shown in FIGS. 26, 27, and 28, when a motor (not shown) is driven, the first link 111 fixedly coupled to the yaw driving part 105 rotates around the yaw axis Yaw with respect to the base link 102. At this time, since the yaw axis Yaw passes through the RCM, the RCM is maintained constant no matter by what angle the first link 111 rotates with respect to the base link 102.

Figure 29:
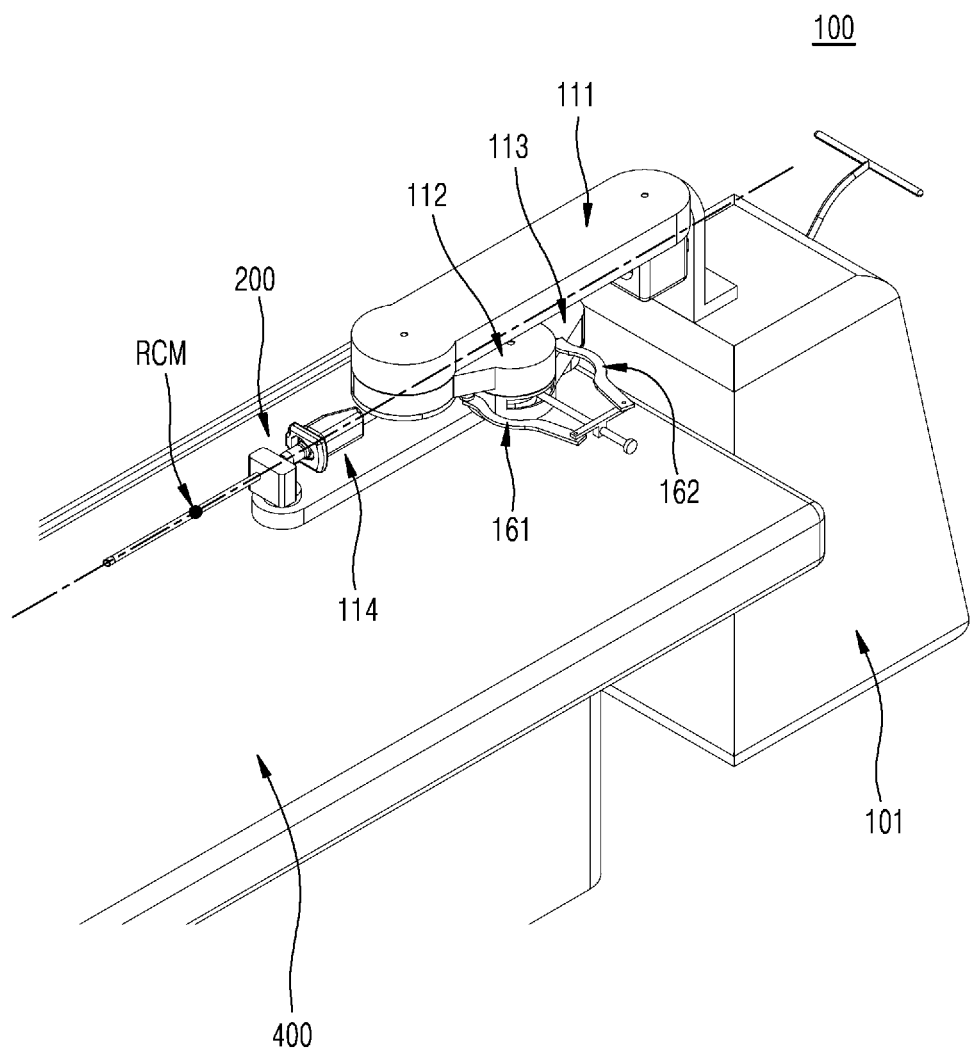
FIG. 29 is a perspective view of the surgical robot arm of FIG. 2 rotated approximately 90° around the yaw axis Yaw.

FIG. 29 is a perspective view of the surgical robot arm of FIG. 2 rotated approximately 90° around the yaw axis Yaw. When the yaw driving part 105 further rotates with respect to the base link 102 in the state shown in FIG. 27, it is possible to arrange the surgical robot arm 100, such that a link surface is horizontal as shown in FIG. 29.

Figure 30:
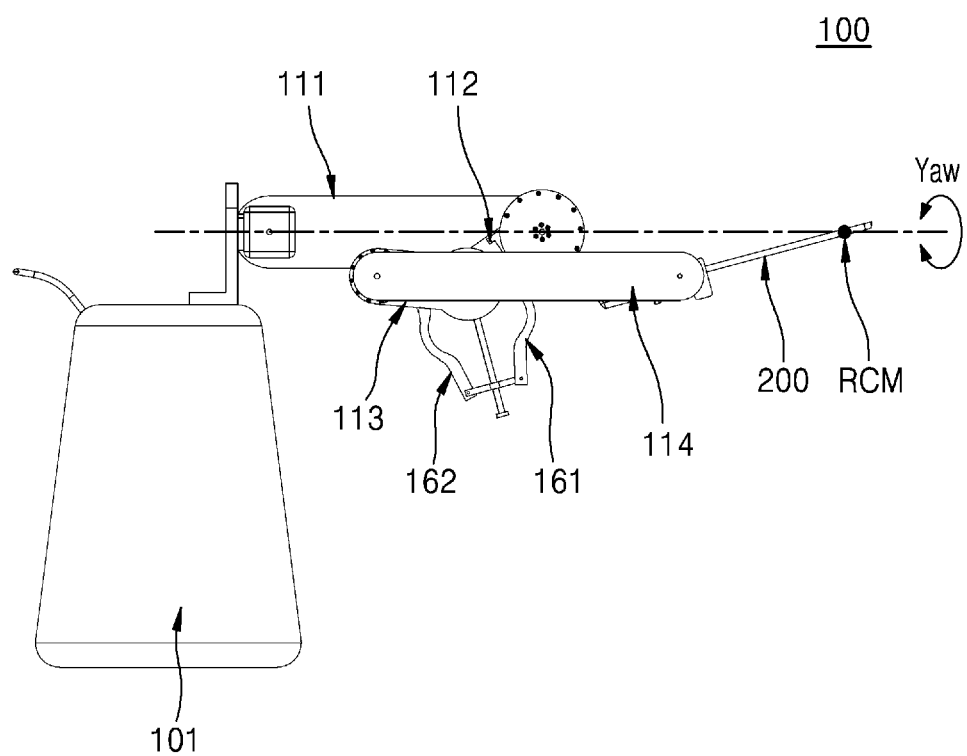
FIG. 30 is a perspective view of a camera of the surgical robot arm of FIG. 2 facing upward.

FIG. 30 is a perspective view of a camera of the surgical robot arm of FIG. 2 facing upward. When the yaw driving part 105 further rotates with respect to the base link 102 in the state shown in FIG. 29, as shown in FIGS. 20A and 20B, the surgical robot arm 100 rotates approximately 180° around the yaw axis Yaw, and thus the fifth link 200 (i.e., the camera) of the surgical robot arm 100 may face upward.

A Modified Example of First Embodiment of Surgical Robot Arm

Hereinafter, the surgical robot arm 100 according to a modified example of the first embodiment of the present disclosure will be described. In this regard, compared to the surgical robot arm (see 100 in FIG. 2, etc.) according to the first embodiment of the present disclosure described above, in the surgical robot arm 100 according to a modified example of the first embodiment of the present disclosure, the coupling relationship between the fourth link 114 and the fifth link 300 is different.

Figure 32:
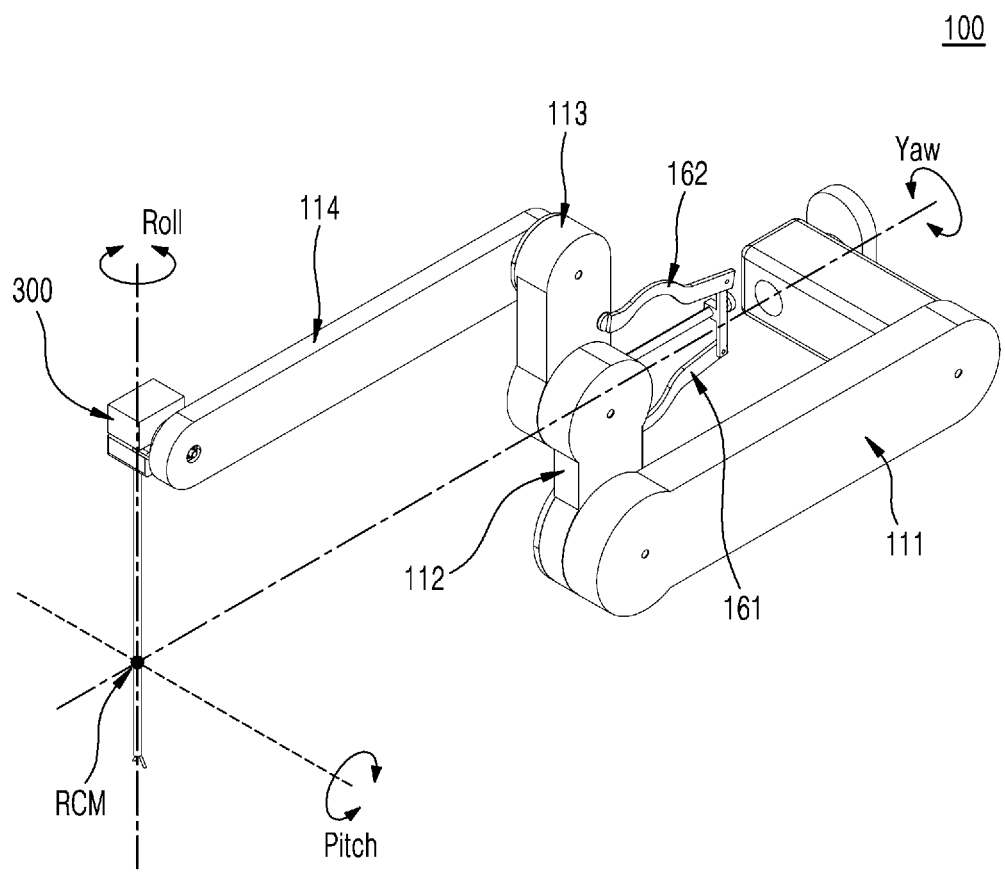
FIG. 32 is a perspective view of a surgical robot arm according to a first modified example of the first embodiment of the present disclosure.

FIG. 32 is a perspective view of a surgical robot arm according to a first modified example of the first embodiment of the present disclosure.

Referring to FIG. 32, according to a modified example of the first embodiment of the present disclosure, links (more particularly, the first link 111, the second link 112, the third link 113, the fourth link 114, and a fifth link 115) are arranged side-by-side without overlapping one another, such that no collision occurs when one link rotates with respect to another link and one link does not interfere with the rotation of the other links. Therefore, the driving range of each link is widened.

In detail, in the surgical robot arm 100 according to a modified example of the present disclosure, when viewed on the XY plane, the first link 111, the second link 112, the third link 113, the fourth link 114, and the fifth link 115 are each formed to be offset from one another to a certain degree in a direction parallel to the rotation axis thereof (that is, the Y-axis direction). In other words, in the Y-axis direction, the second link 112 is disposed on one side of the first link 111, the third link 113 is disposed on one side of the second link 112, and the third link 113 is disposed on one side of the first link 111, the fourth link 114 is disposed on one side of the third link 113, and the fifth link 115 is disposed on one side of the fourth link 114. In other words, it may be said that the first link 111, the second link 112, the third link 113, the fourth link 114, and the fifth link 115 are sequentially arranged in the Y-axis direction.

In particular, as the fifth link 115, which may include a surgical instrument or a camera, is disposed to be offset to a certain degree with respect to the fourth link 114, the limitation of the angle of rotation of the fifth link 115 with respect to the fourth link 114 may be eliminated, and thus the fifth link 115 may rotate freely.

In other words, since one link is formed not to interfere with the rotation of another link, it may be said that at least parts of links may overlap each other in the direction along the yaw axis Yaw. In other words, when the surgical robot arm 100 is folded to a certain degree, in the direction along a yaw axis Y1, the first link 111 and the second link 112 may be arranged to overlap each other to a certain degree, the second link 112 and the third link 113 may arranged to overlap each other to a certain degree, the third link 113 and the fourth link 114 may be arranged to overlap each other to a certain degree, and the fourth link 114 and the fifth link 115 may be arranged to each other to a certain degree.

Second Embodiment of Surgical Robot Arm

Hereinafter, a surgical robot arm 500 according to a second embodiment of the present disclosure will be described. In this regard, compared to surgical robot arm (refer to 100 of FIG. 2, etc.) according to the first embodiment of the present disclosure, the surgical robot arm 500 according to the second embodiment of the present disclosure further includes has a setup link assembly 590. The configuration changed in this way as compared to the first embodiment will be described in detail later.

Figure 33A:
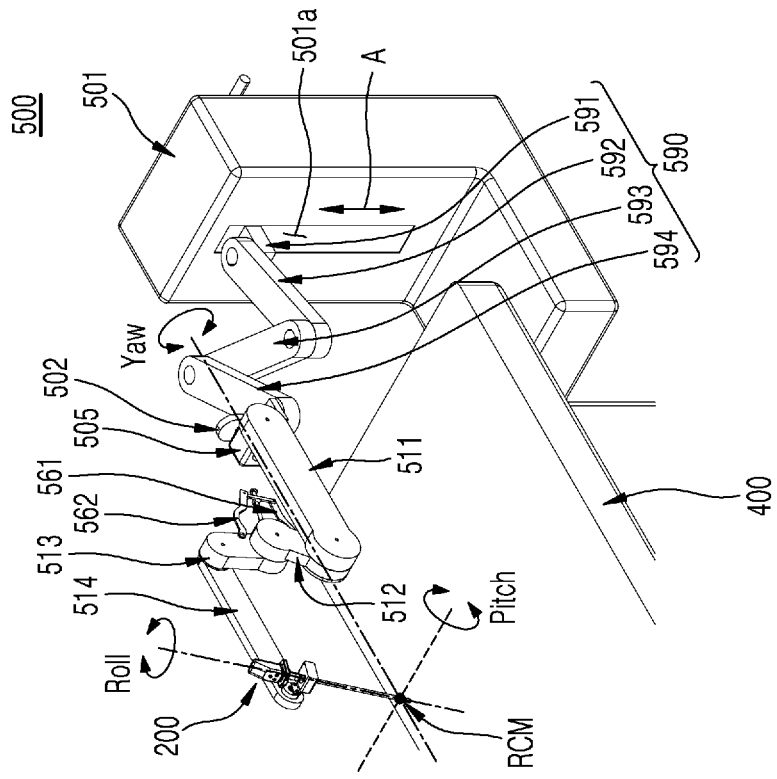
FIGS. 33A and 33B are perspective views of a surgical robot arm according to the second embodiment of the present disclosure.
Figure 33B:
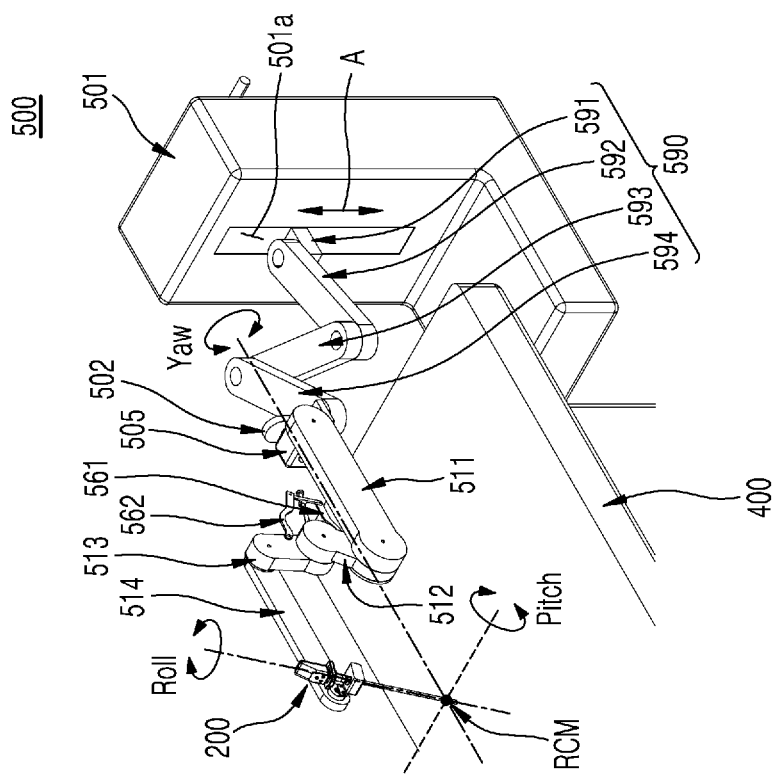
Figure 34A:
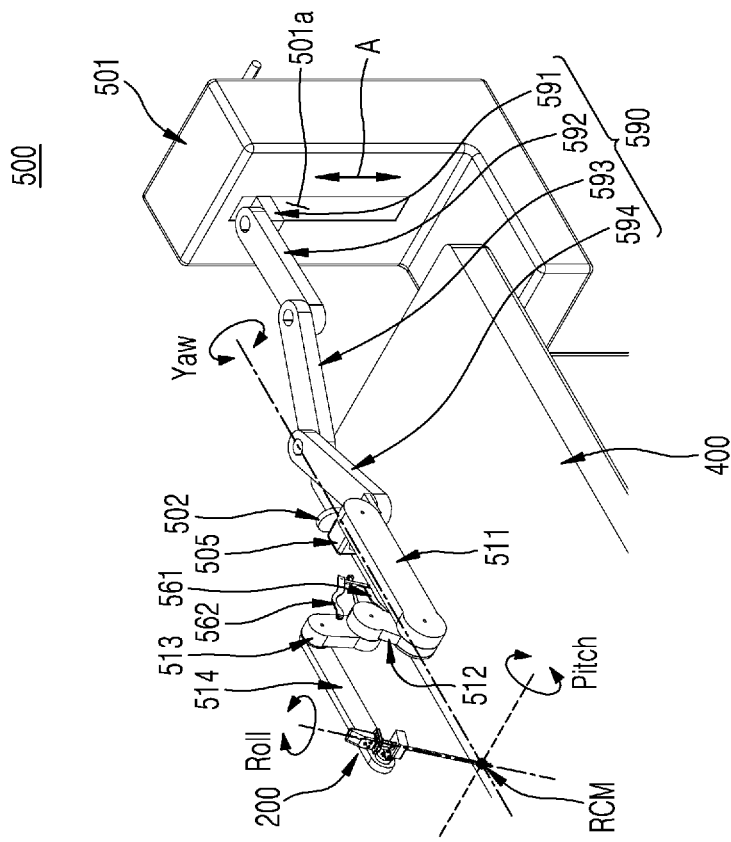
FIGS. 34A and 34B are perspective views showing the motion of a setup link assembly of the surgical robot arm of FIGS. 33A and 33B.
Figure 34B:
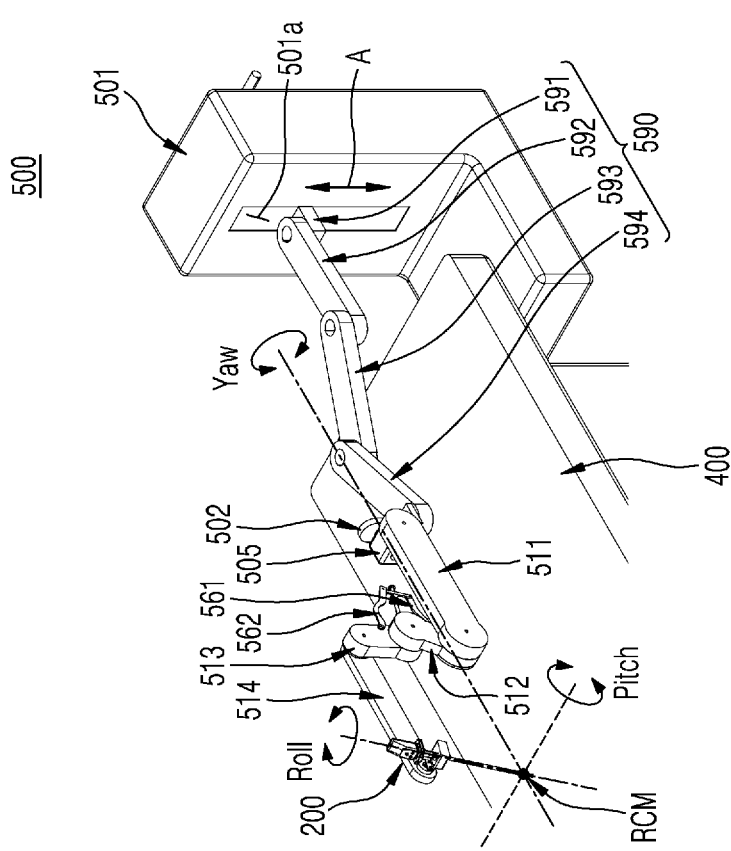

FIGS. 33A and 33B are perspective views of a surgical robot arm according to the second embodiment of the present disclosure. FIGS. 34A and 34 B are perspective views showing the motion of a setup link assembly of the surgical robot arm of FIGS. 33A and 33B.

Referring to FIGS. 33A to 34B, the surgical robot arm 500 according to the second embodiment of the present disclosure includes a main body 501, a base link 502, a yaw driving part 505, a first link 511, a second link 512, a third link 513, a fourth link 514, and a fifth link 515. In some embodiments, the surgical robot arm 500 according to the second embodiment of the present disclosure further includes a motion guide assembly 560, and the motion guide assembly 560 includes a first auxiliary link 561, a second auxiliary link 562, a third auxiliary link 563, and a fourth auxiliary link 564. In some embodiments, the surgical robot arm 500 according to the second embodiment of the present disclosure further includes the setup link assembly 590. In some embodiments, like the first embodiment of FIG. 2, the surgical robot arm 500 of the present embodiment may include a first joint (refer to 121 of FIG. 7), a second joint (refer to 122 of FIG. 7), a third joint (refer to 123 of FIG. 7), a fourth joint (refer to 124 of FIG. 7), and a fifth joint (refer to 125 of FIG. 7).

In this regard, the main body 501 serves as the base of the entire surgical robot arm 500.

Meanwhile, the base link 502 may be formed on one surface, e.g., the top surface, of the main body 501. The base link 502 may be formed to be inclined to a certain angle with respect to the horizontal plane.

Meanwhile, the yaw driving part 505 is rotatably coupled to the base link 502. The yaw driving part 505 is formed to yaw-rotatable around the yaw axis Yaw with respect to the base link 502.

In this regard, the yaw axis Yaw may be formed in a direction parallel to the X-axis. At this time, the RCM, which will be described later, may be located on an extension of the yaw axis Yaw. As such, since the RCM is formed to be located on an extension of the yaw axis Yaw, the position and the direction of the RCM for the base link 502 may be maintained constant regardless of the degree of yaw-rotation of the first link 511 with respect to the base link 502.

Meanwhile, the yaw driving part 505 and the first link 511 may be fixedly coupled to each other, such that the relative position of the first link 511 with respect to the yaw driving part 505 is constant. In other words, the yaw driving part 505 and the first link 511 may integrally operate together. In this regard, in the drawing, the yaw driving part 505 and the first link 511 are shown as being formed as separate members and fixedly coupled to each other. However, the present disclosure is not limited thereto, and the yaw driving part 505 and the first link 511 may also be integrated with each other.

The second link 512 is axially coupled to the first link 511 to be rotatable around a second joint 522 with respect to the first link 511. In this regard, the second joint 522 may include one or more pulleys.

The third link 513 is axially coupled to the second link 512 to be rotatable around a third joint 523 with respect to the second link 512. In this regard, the third joint 523 may include one or more pulleys.

The fourth link 514 is axially coupled to the third link 513 to be rotatable around a fourth joint 524 with respect to the third link 513. In this regard, the fourth joint 524 may include one or more pulleys.

The fifth link 515 is axially coupled to the fourth link 514 to be rotatable around a fifth joint 525 with respect to the fourth link 514. In this regard, the fifth joint 525 may include one or more pulleys.

In this regard, the fifth link 715 is formed to pass through the RCM.

In some embodiments, as described above, the yaw axis Yaw of the base link 502 may also be formed to pass through the RCM.

In this regard, the second joint 522, the fourth joint 524, the fifth joint 525, and the RCM may correspond to four vertices of a parallelogram. In other words, the second joint 522, the fourth joint 524, the fifth joint 525, and the RCM may constitute one parallelogram.

In detail, when there are three vertices including the second joint 522, fourth joint 524, and fifth joint 525, the position of the remaining vertex (i.e., the RCM) of the parallelogram including the three vertices is automatically decided.

In some embodiments, when the second link 512 rotates around the second joint 522 while the position of the second joint 522 is fixed, the second link 512 rotates while the first link 511 and the fourth link 114 is remaining parallel to each other and the extension line interconnecting the second joint 522 and the fourth joint 524 and the fifth joint 525 are remaining parallel to each other. Therefore, the position of the RCM may be maintained constant regardless of the rotation angle of the second link 512.

In this regard, the surgical robot arm 500 according to the second embodiment of the present disclosure further includes the setup link assembly 590. In other words, the surgical robot arm 500 further includes the setup link assembly 590, which is formed between the main body 501 and the base link 502, interconnects the main body 501 and the base link 502, and enables the base link 502 (and links connected thereto) to move in the horizontal direction or the vertical direction with respect to the main body 501, thereby facilitating setup positioning of the setup link assembly 590. Detailed descriptions thereof will be given below.

In detail, the setup link assembly 590 may include a vertical setup link 591 and one or more horizontal setup links 592, 593, and 594.

The vertical setup link 591 is connected to the main body 501 and is formed to be movable in the Z-axis direction with respect to the main body 501.

In this regard, a guide groove 511 is formed in the main body 501 in the vertical direction, and the vertical setup link 591 may linearly move up and down in the direction indicated by an arrow A along the guide groove 511.

Meanwhile, the setup link assembly 590 may include a first horizontal setup link 592, a second horizontal setup link 593, and a third horizontal setup link 594. The first horizontal setup link 592 is axially coupled to the vertical setup link 591 to be rotatable with respect to the vertical setup link 591. The second horizontal setup link 593 is axially coupled to the first horizontal setup link 592 to be rotatable with respect to the first horizontal setup link 592. One end of the third horizontal setup link 594 is axially coupled to the second horizontal setup link 593 to be rotatable with respect to the second horizontal setup link 593. In some embodiments, the base link 502 is formed at the other end of the third horizontal setup link 594. In this regard, the rotation axis of each of the one or more horizontal setup links 592, 593, and 594 may be parallel to the Z-axis. In other words, the one or more horizontal setup links 592, 593, and 594 may rotate on the XY plane.

As such, since the setup link assembly 590 includes the one or more horizontal setup links 592, 593, and 594, the base link 502 connected to the setup link assembly 590 may be deployed at various setup positions on the XY plane.

Meanwhile, although the drawings show that the vertical setup link 591 is connected to the main body 501 and the horizontal setup links 592, 593, and 594 are connected to the vertical setup link 591, the present disclosure is not limited thereto. In other words, a configuration in which a horizontal setup link is connected to the main body 501 and a vertical setup link is connected to the horizontal setup link is also possible. Alternatively, it is possible to provide any one of a vertical setup link or a horizontal setup link only. Alternatively, various configurations and arrangements of horizontal setup links and vertical links may be possible, such as a configuration in which a vertical setup link is arranged in the middle of a plurality of horizontal setup links.

In this regard, the setup link assembly 590 may be formed to operate only during a setup period in which the surgical robot arm 500 is placed at an appropriate position on one side of a patient before the surgical robot arm 500 actually starts a surgery and maintain a fixed state without moving while the surgical robot arm 500 is performing a surgery after deployment of the robot arm 500 is completed. To this end, although not shown in the drawing, the setup link assembly 590 may further include a brake module (not shown) capable of maintaining a stationary state and a manipulation member (not shown) capable of selecting activated state/deactivated state of the brake module.

In this way, the setup link assembly 590 may be provided to facilitate the setup positioning of the surgical robot arm 500.

Third Embodiment of Surgical Robot Arm

Hereinafter, a surgical robot arm 600 according to a third embodiment of the present disclosure will be described. In this regard, compared to surgical robot arm (refer to 100 of FIG. 2, etc.) according to the first embodiment of the present disclosure, the surgical robot arm 600 according to the third embodiment of the present disclosure further includes has a setup link assembly 690. The configuration changed in this way as compared to the first embodiment will be described in detail later.

Figure 35A:
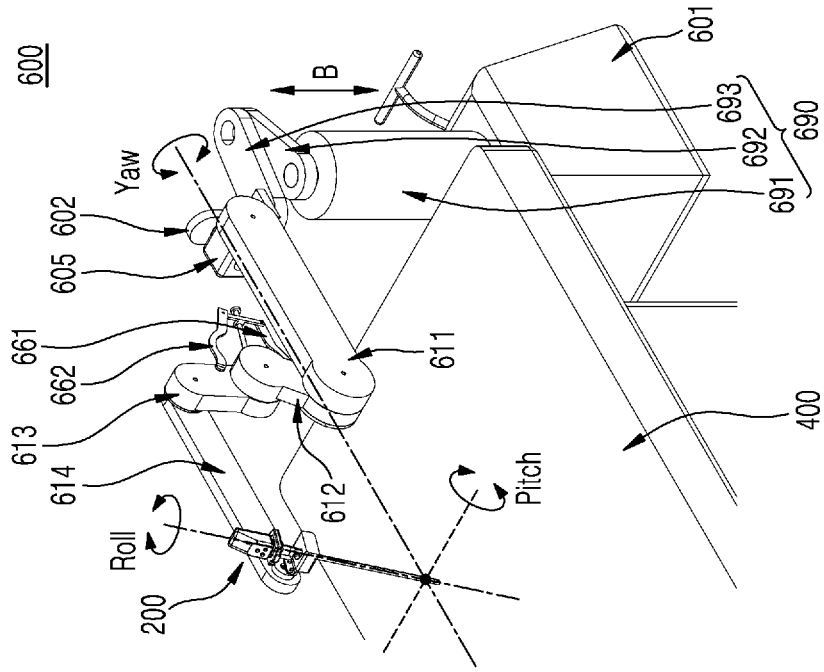
FIGS. 35A and 35B are perspective views of a surgical robot arm according to the third embodiment of the present disclosure.
Figure 35B:
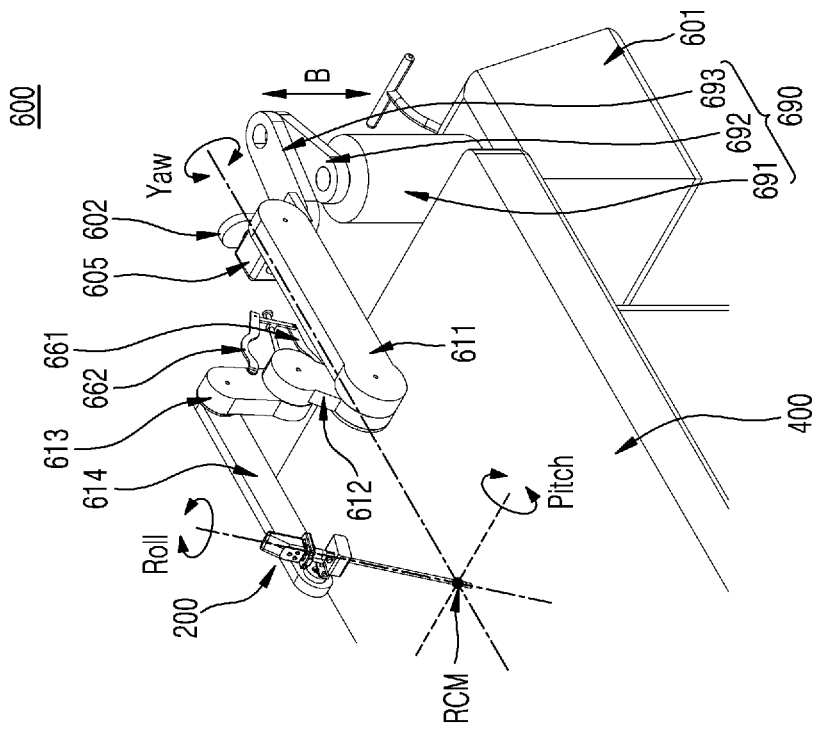
Figure 36A:
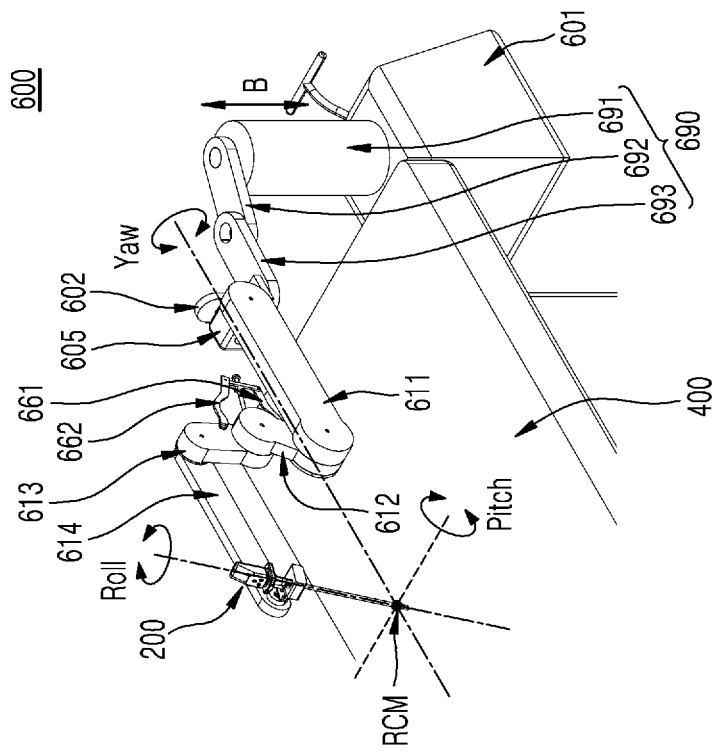
FIGS. 36A and 36B are perspective views showing the motion of a setup link assembly of the surgical robot arm of FIGS. 35A and 35B.
Figure 36B:
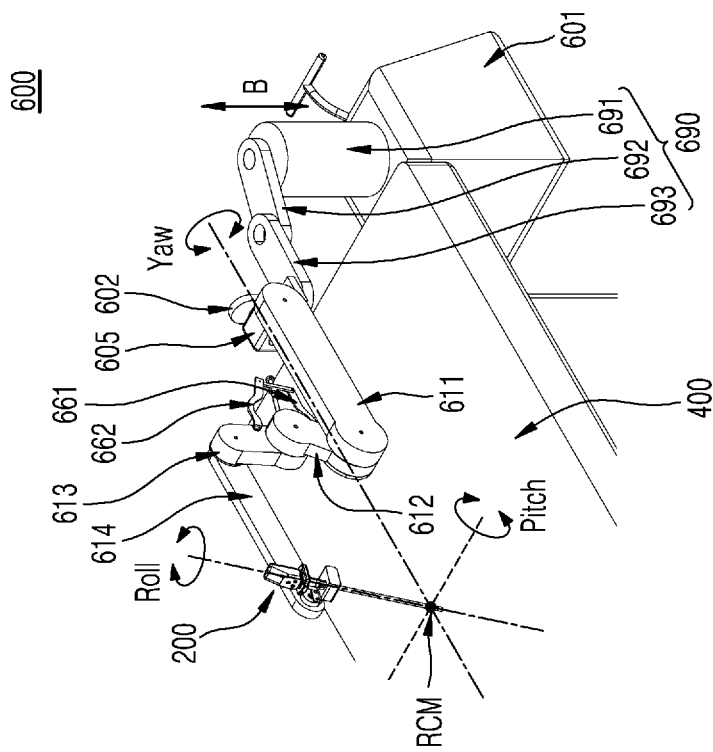

FIGS. 35A and 35B are perspective views of a surgical robot arm according to the third embodiment of the present disclosure. FIGS. 36A and 36B are perspective views showing the motion of a setup link assembly of the surgical robot arm of FIGS. 35A and 35B.

Referring to FIGS. 35A to 36B, the surgical robot arm 600 according to the second embodiment of the present disclosure includes a main body 601, a base link 602, a yaw driving part 605, a first link 611, a second link 612, a third link 613, a fourth link 614, and a fifth link 615. In some embodiments, the surgical robot arm 600 according to the third embodiment of the present disclosure further includes a motion guide assembly 660, and the motion guide assembly 660 includes a first auxiliary link 661, a second auxiliary link 662, a third auxiliary link 663, and a fourth auxiliary link 664. In some embodiments, the surgical robot arm 600 according to the third embodiment of the present disclosure further includes the setup link assembly 690. In some embodiments, like the first embodiment of FIG. 2, the surgical robot arm 600 of the present embodiment may include a first joint (refer to 121 of FIG. 7), a second joint (refer to 122 of FIG. 7), a third joint (refer to 123 of FIG. 7), a fourth joint (refer to 124 of FIG. 7), and a fifth joint (refer to 125 of FIG. 7).

In this regard, the main body 601 serves as the base of the entire surgical robot arm 600.

Meanwhile, the base link 602 may be formed on one surface, e.g., the top surface, of the main body 601. The base link 602 may be formed to be inclined to a certain angle with respect to the horizontal plane.

Meanwhile, the yaw driving part 605 is rotatably coupled to the base link 602. The yaw driving part 605 is formed to yaw-rotatable around the yaw axis Yaw with respect to the base link 602.

In this regard, the yaw axis Yaw may be formed in a direction parallel to the X-axis. At this time, the RCM, which will be described later, may be located on an extension of the yaw axis Yaw. As such, since the RCM is formed to be located on an extension of the yaw axis Yaw, the position and the direction of the RCM for the base link 602 may be maintained constant regardless of the degree of yaw-rotation of the first link 611 with respect to the base link 602.

Meanwhile, the yaw driving part 605 and the first link 611 may be fixedly coupled to each other, such that the relative position of the first link 611 with respect to the yaw driving part 605 is constant. In other words, the yaw driving part 605 and the first link 611 may integrally operate together. In this regard, in the drawing, the yaw driving part 605 and the first link 611 are shown as being formed as separate members and fixedly coupled to each other. However, the present disclosure is not limited thereto, and the yaw driving part 605 and the first link 611 may also be integrated with each other.

The second link 612 is axially coupled to the first link 611 to be rotatable around a second joint 622 with respect to the first link 611. In this regard, the second joint 622 may include one or more pulleys.

The third link 613 is axially coupled to the second link 612 to be rotatable around a third joint 623 with respect to the second link 612. In this regard, the third joint 623 may include one or more pulleys.

The fourth link 614 is axially coupled to the third link 613 to be rotatable around a fourth joint 624 with respect to the third link 613. In this regard, the fourth joint 624 may include one or more pulleys.

The fifth link 615 is axially coupled to the fourth link 614 to be rotatable around a fifth joint 625 with respect to the fourth link 614. In this regard, the fifth joint 625 may include one or more pulleys.

In this regard, the fifth link 715 is formed to pass through the RCM.

In some embodiments, as described above, the yaw axis Yaw of the base link 602 may also be formed to pass through the RCM.

In this regard, the second joint 622, the fourth joint 624, the fifth joint 625, and the RCM may correspond to four vertices of a parallelogram. In other words, the second joint 622, the fourth joint 624, the fifth joint 625, and the RCM may constitute one parallelogram.

In detail, when there are three vertices including the second joint 622, fourth joint 624, and fifth joint 625, the position of the remaining vertex (i.e., the RCM) of the parallelogram including the three vertices is automatically decided.

In some embodiments, when the second link 612 rotates around the second joint 622 while the position of the second joint 622 is fixed, the second link 612 rotates while the first link 611 and the fourth link 114 is remaining parallel to each other and the extension line interconnecting the second joint 622 and the fourth joint 624 and the fifth joint 625 are remaining parallel to each other. Therefore, the position of the RCM may be maintained constant regardless of the rotation angle of the second link 612.

In this regard, the surgical robot arm 600 according to the third embodiment of the present disclosure further includes the setup link assembly 690. In other words, the surgical robot arm 600 further includes the setup link assembly 690, which is formed between the main body 601 and the base link 602, interconnects the main body 601 and the base link 602, and enables the base link 602 (and links connected thereto) to move in the horizontal direction or the vertical direction with respect to the main body 601, thereby facilitating setup positioning of the setup link assembly 690. Detailed descriptions thereof will be given below.

In detail, the setup link assembly 690 may include a vertical setup link 691 and one or more horizontal setup links 692 and 693.

The vertical setup link 691 is connected to the main body 601 and is formed to be movable in the Z-axis direction with respect to the main body 601.

In this regard, the vertical setup link 691 is formed in a cylindrical shape and may linearly move up and down a straight line while being drawn into or out of the main body 601 in the direction indicated by an arrow B.

Meanwhile, the setup link assembly 690 may include a first horizontal setup link 692 and a second horizontal setup link 693. The first horizontal setup link 692 is axially coupled to the vertical setup link 691 to be rotatable with respect to the vertical setup link 691. The second horizontal setup link 693 is axially coupled to the first horizontal setup link 692 to be rotatable with respect to the first horizontal setup link 692. In some embodiments, the base link 602 is formed at the other end of the second horizontal setup link 693.

As such, since the setup link assembly 690 includes the one or more horizontal setup links 692 and 693, the base link 602 connected to the setup link assembly 690 may be deployed at various setup positions on the XY plane.

Meanwhile, although the drawings show that the vertical setup link 691 is connected to the main body 601 and the horizontal setup links 692 and 693 are connected to the vertical setup link 691, the present disclosure is not limited thereto. In other words, a configuration in which a horizontal setup link is connected to the main body 601 and a vertical setup link is connected to the horizontal setup link is also possible. Alternatively, it is possible to provide any one of a vertical setup link or a horizontal setup link only. Alternatively, various configurations and arrangements of horizontal setup links and vertical links may be possible, such as a configuration in which a vertical setup link is arranged in the middle of a plurality of horizontal setup links.

In this regard, the setup link assembly 690 may be formed to operate only during a period in which the surgical robot arm 600 is placed at an appropriate position on one side of a patient before the surgical robot arm 600 actually starts a surgery and maintain a fixed state without moving while the surgical robot arm 600 is performing a surgery after deployment of the robot arm 600 is completed. To this end, although not shown in the drawing, the setup link assembly 690 may further include a brake module (not shown) capable of maintaining a stationary state and a manipulation member (not shown) capable of selecting activated state/deactivated state of the brake module.

In this way, the setup link assembly 690 may be provided to facilitate the setup positioning of the surgical robot arm 600.

Fourth Embodiment of Surgical Robot Arm

Hereinafter, a surgical robot arm 700 according to a fourth embodiment of the present disclosure will be described. In this regard, compared to surgical robot arm (refer to 100 of FIG. 2, etc.) according to the first embodiment of the present disclosure, in the surgical robot arm 700 according to the third embodiment of the present disclosure, the direction of the yaw axis Yaw is different. The configuration changed in this way as compared to the first embodiment will be described in detail later.

Figure 37A:
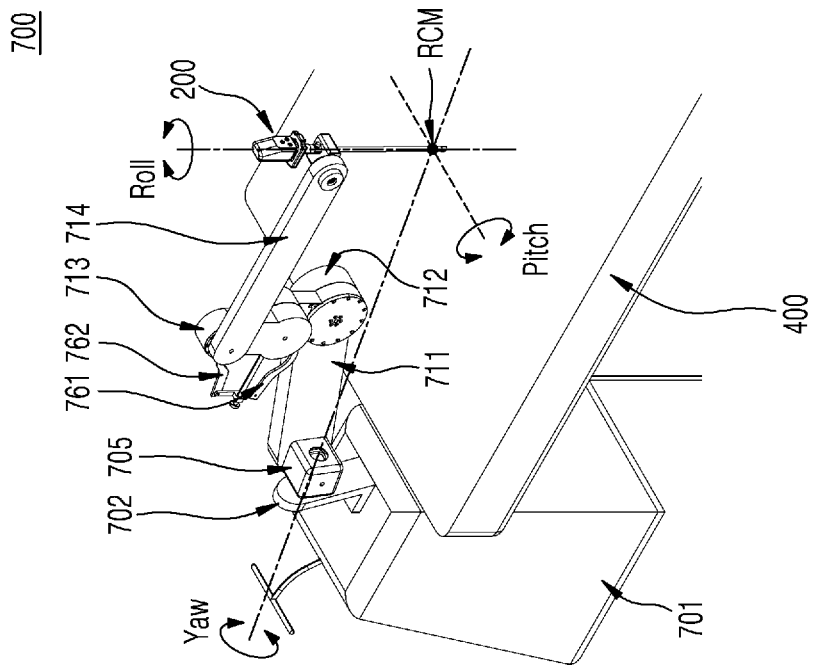
FIGS. 37A and 38B are perspective views of a surgical robot arm according to the fourth embodiment of the present disclosure.
Figure 37B:
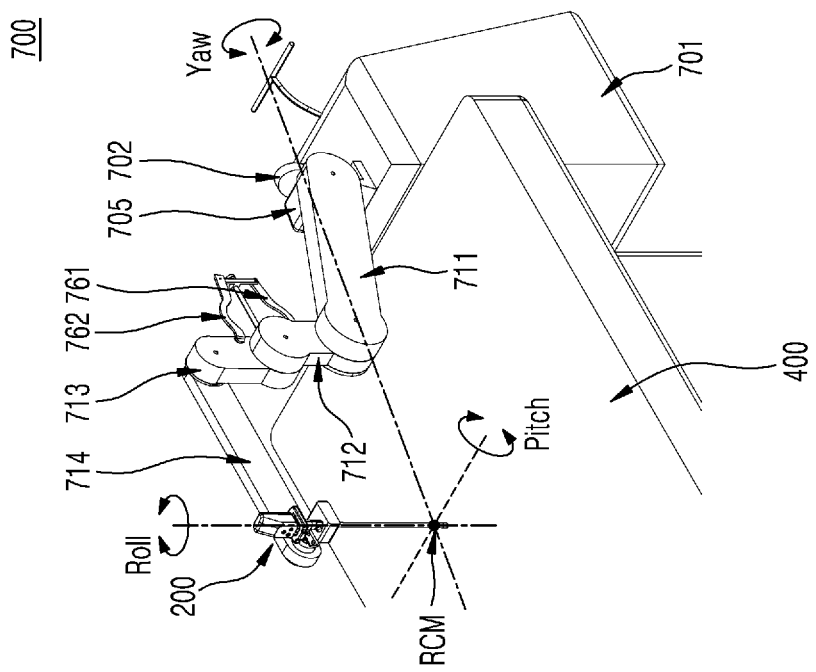

FIGS. 37A and 37B are perspective views of a surgical robot arm according to the fourth embodiment of the present disclosure.

Referring to FIGS. 33A to 37B, the surgical robot arm 700 according to the second embodiment of the present disclosure includes a main body 701, a base link 702, a yaw driving part 705, a first link 711, a second link 712, a third link 713, a fourth link 714, and a fifth link 715. In some embodiments, the surgical robot arm 700 according to the second embodiment of the present disclosure further includes a motion guide assembly 760, and the motion guide assembly 760 includes a first auxiliary link 761, a second auxiliary link 762, a third auxiliary link 763, and a fourth auxiliary link 764. In some embodiments, the surgical robot arm 700 according to the fourth embodiment of the present disclosure further includes a setup link assembly 790. In some embodiments, like the first embodiment of FIG. 2, the surgical robot arm 700 of the present embodiment may include a first joint (refer to 121 of FIG. 7), a second joint (refer to 122 of FIG. 7), a third joint (refer to 123 of FIG. 7), a fourth joint (refer to 124 of FIG. 7), and a fifth joint (refer to 125 of FIG. 7).

In this regard, the main body 701 serves as the base of the entire surgical robot arm 700.

Meanwhile, the base link 702 may be formed on one surface, e.g., the top surface, of the main body 701. The base link 702 may be formed to be inclined to a certain angle with respect to the horizontal plane.

Meanwhile, the yaw driving part 705 is rotatably coupled to the base link 702. The yaw driving part 705 is formed to yaw-rotatable around the yaw axis Yaw with respect to the base link 702.

In this regard, the yaw axis Yaw may be formed in a direction parallel to the X-axis. At this time, the RCM, which will be described later, may be located on an extension of the yaw axis Yaw. As such, since the RCM is formed to be located on an extension of the yaw axis Yaw, the position and the direction of the RCM for the base link 702 may be maintained constant regardless of the degree of yaw-rotation of the first link 711 with respect to the base link 702.

Meanwhile, the yaw driving part 705 and the first link 711 may be fixedly coupled to each other, such that the relative position of the first link 711 with respect to the yaw driving part 705 is constant. In other words, the yaw driving part 705 and the first link 711 may integrally operate together. In this regard, in the drawing, the yaw driving part 705 and the first link 711 are shown as being formed as separate members and fixedly coupled to each other. However, the present disclosure is not limited thereto, and the yaw driving part 705 and the first link 711 may also be integrated with each other.

The second link 712 is axially coupled to the first link 711 to be rotatable around a second joint 722 with respect to the first link 711. In this regard, the second joint 722 may include one or more pulleys.

The third link 713 is axially coupled to the second link 712 to be rotatable around a third joint 723 with respect to the second link 712. In this regard, the third joint 723 may include one or more pulleys.

The fourth link 714 is axially coupled to the third link 713 to be rotatable around a fourth joint 724 with respect to the third link 713. In this regard, the fourth joint 724 may include one or more pulleys.

The fifth link 715 is axially coupled to the fourth link 714 to be rotatable around a fifth joint 725 with respect to the fourth link 714. In this regard, the fifth joint 725 may include one or more pulleys.

In this regard, the fifth link 715 is formed to pass through the RCM.

In some embodiments, as described above, the yaw axis Yaw of the base link 702 may also be formed to pass through the RCM.

In this regard, the second joint 722, the fourth joint 724, the fifth joint 725, and the RCM may correspond to four vertices of a parallelogram. In other words, the second joint 722, the fourth joint 724, the fifth joint 725, and the RCM may constitute one parallelogram.

In detail, when there are three vertices including the second joint 722, fourth joint 724, and fifth joint 725, the position of the remaining vertex (i.e., the RCM) of the parallelogram including the three vertices is automatically decided.

In some embodiments, when the second link 712 rotates around the second joint 722 while the position of the second joint 722 is fixed, the second link 712 rotates while the first link 711 and the fourth link 114 is remaining parallel to each other and the extension line interconnecting the second joint 722 and the fourth joint 724 and the fifth joint 725 are remaining parallel to each other. Therefore, the position of the RCM may be maintained constant regardless of the rotation angle of the second link 712.

In this regard, in the surgical robot arm 700 according to the fourth embodiment of the present disclosure, the yaw axis Yaw is formed in an oblique direction that is not parallel to the X-axis/Y-axis/Z-axis.

In detail, in this embodiment, the extension line interconnecting the second joint 722 and the RCM and the yaw axis Yaw may be formed to be different from each other, and the extension line interconnecting the second joint 722 and the RCM and the yaw axis Yaw may be formed to intersect each other at the RCM. At this time, the RCM, which will be described later, may be located on an extension of the yaw axis Yaw. In other words, the extension line interconnecting the second joint 722 and the RCM and the yaw axis Yaw may be formed to form a certain angle rather than being parallel to each other. As such, since the RCM is formed to be located on an extension of the yaw axis Yaw, the position and the direction of the RCM for the base link 702 may be maintained constant regardless of the degree of yaw-rotation of the first link 711 with respect to the base link 702.

In this regard, the base link 702 may be formed to be inclined to a certain degree (e.g., 30°) instead of a right angle, and thus the yaw axis Yaw penetrating through the base link 702 may also be formed to not to be parallel to the horizontal direction (i.e., the X-axis direction). In some embodiments, the extension line interconnecting the second joint 722 and the RCM and the yaw axis Yaw may be formed to be different from each other.

In other words, it may be said that the height of a position, through which the yaw axis Yaw penetrates through the base link 702, in the Z-axis direction may be greater than the height of the RCM in the Z-axis direction.

In other words, it may be said that the height of the yaw axis Yaw at the distal end of the surgical robot arm 700 in the Z-axis direction is greater than the height of the yaw axis Yaw at the proximal end of the surgical robot arm 700 in the Z-axis direction. In this regard, in the surgical robot arm 700, the main body 701 or a region adjacent to the main body 701 may be defined as the proximal end, and a region furthest from the main body 701, e.g., an end nearby the fifth link 715, may be defined as the distal end.

In other words, it may be said that the base link 702 is formed to be inclined at a certain angle with respect to the horizontal plane, and thus the central axis of the base link 702 coincides with the yaw axis Yaw.

In this way, the extension line interconnecting the second joint 722 and the RCM and the yaw axis Yaw are formed to be different from each other, the fifth link 715 may be deployed in the horizontal direction without causing a gimbal lock phenomenon.

Figure 38A:
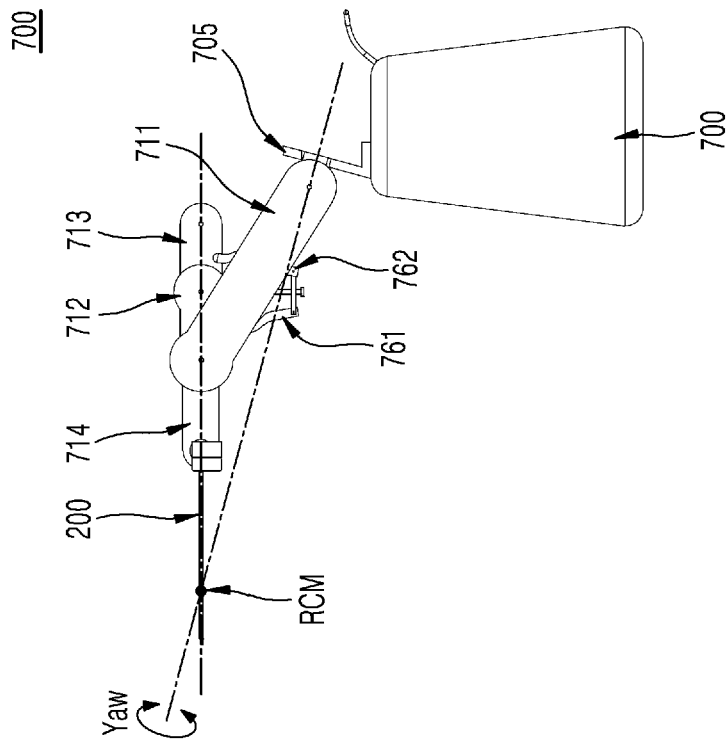
Figure 38B:
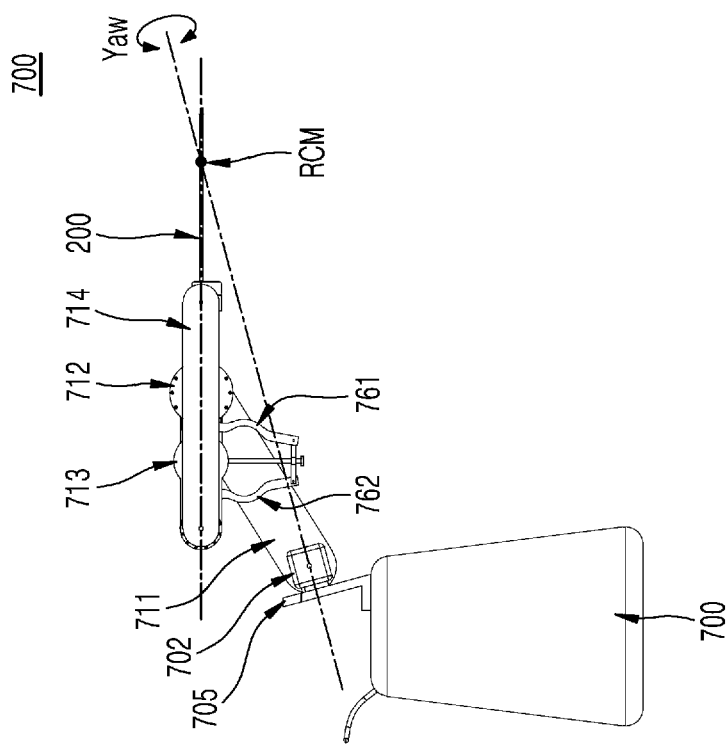

FIGS. 38A and 38B are diagrams showing the fifth link 715 of the surgical robot arm 700 of FIGS. 37A and 37B arranged in parallel.

As described above, the surgical robot arm 700 according to the fourth embodiment of the present disclosure is formed, such that the extension line interconnecting the second joint 722 and the RCM and the yaw axis Yaw are different from each other, thereby enabling deployment of the fifth link 715 in the horizontal direction without the gimbal lock phenomenon.

Figure 39:
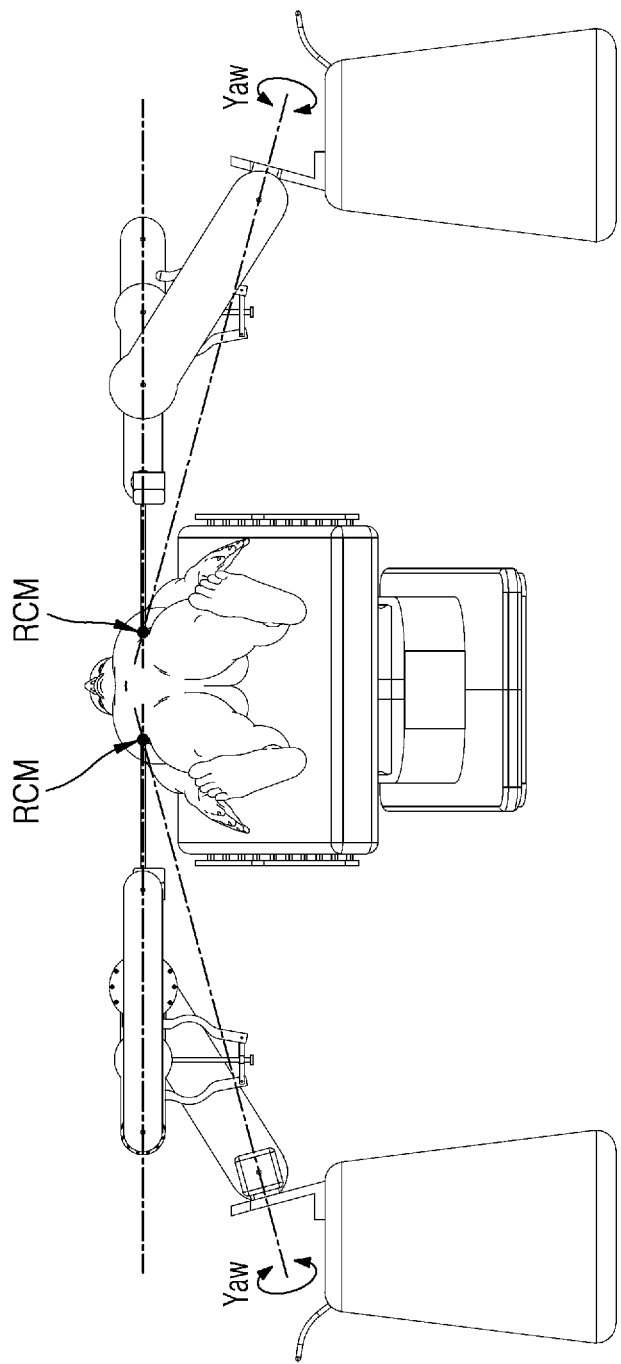
FIG. 39 is a diagram showing the surgical robot arm shown in FIGS. 37A and 37B being deployed nearby a surgical site of a patient and a surgical instrument is deployed to face directly toward the patient.

FIG. 39 is a diagram showing the surgical robot arm 700 shown in FIGS. 38A and 38B being deployed nearby a surgical site of a patient and the fifth link 715 is deployed to face directly toward the patient.

As described above, in the surgical robot arm 700 according to the fourth embodiment of the present disclosure, each robot arm is formed in a modular form, and the fifth link 715 may be deployed in parallel. Therefore, each modular surgical robot arm 700 may be deployed nearby a surgical site of a patient, and the fifth link 715 may be deployed to face the patient directly.

Furthermore, the surgical robot arm 700 according to the fourth embodiment of the present disclosure is formed, such that the extension line interconnecting the second joint 722 and the RCM and the yaw axis Yaw intersect each other at the RCM, and thus the fifth link 715 may face upward beyond the horizontal direction.

According to the fourth embodiment of the present disclosure, the extension line interconnecting the second joint 722 and the RCM and the yaw axis Yaw are formed to be different from each other, the fifth link 760 and the coupled thereto may be deployed in the horizontal direction without the gimbal lock phenomenon. Furthermore, the fifth link 200 may be deployed to face upward beyond the horizontal direction.

In some embodiments, by arranging links to be offset from one another to a certain degree, the rotational motion of each link is not restricted by other links, and thus the range of motion of an instrument increases, e.g., the moving direction of an instrument is directed upward beyond the horizontal direction. Therefore, even in the case of a frequently performed surgery in which instruments are deployed horizontally, gimbal lock does not occur and instruments may move within sufficient ranges.

Fifth Embodiment of Surgical Robot Arm

Hereinafter, a surgical robot arm 800 according to a fifth embodiment of the present disclosure will be described. In this regard, compared to surgical robot arm (refer to 100 of FIG. 2, etc.) according to the first embodiment of the present disclosure, the surgical robot arm 800 according to the fifth embodiment of the present disclosure further includes has a setup link assembly 890. The configuration changed in this way as compared to the first embodiment will be described in detail later.

Figure 40:
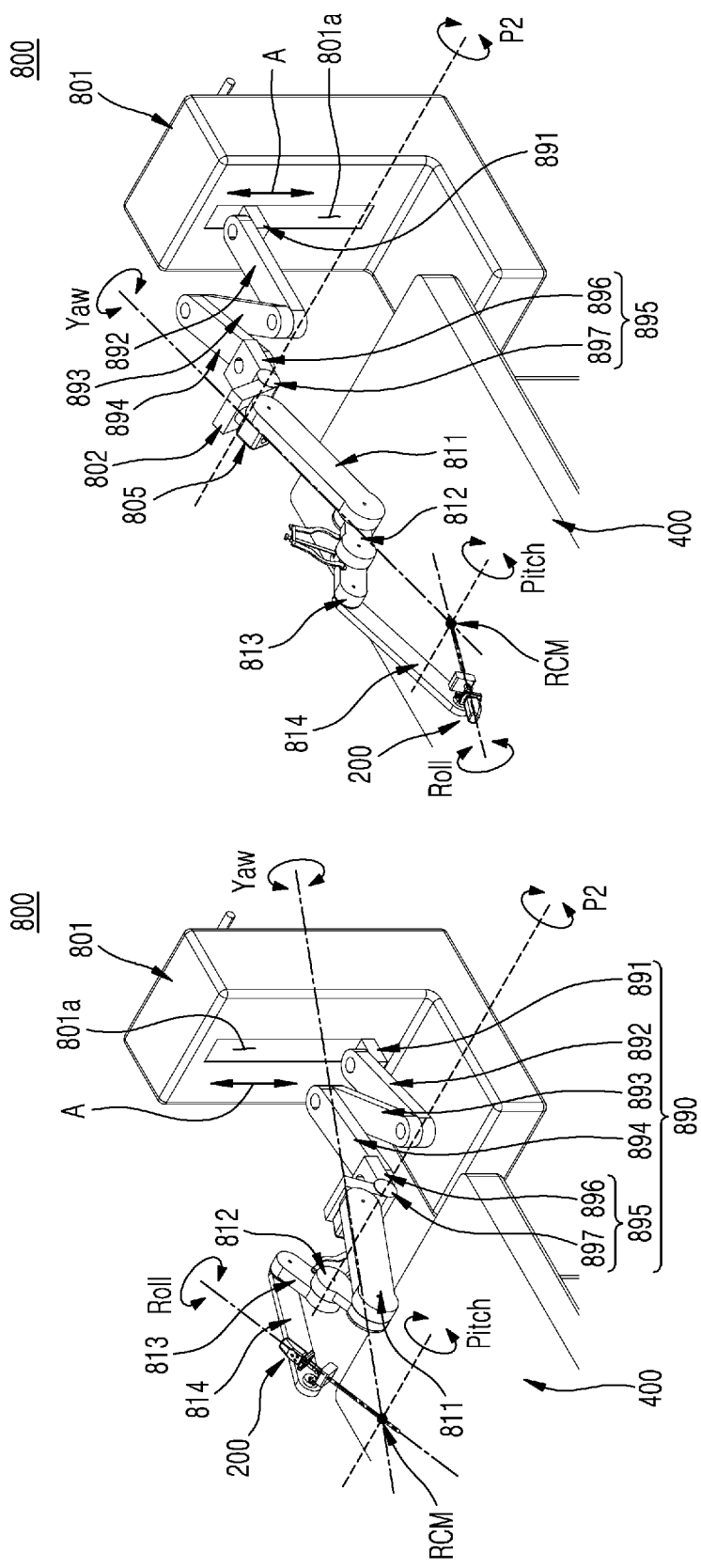
FIG. 40 is a perspective view of a surgical robot arm according to the fifth embodiment of the present disclosure.

FIG. 40 is a perspective view of a surgical robot arm according to the fifth embodiment of the present disclosure.

Referring to FIG. 40, the surgical robot arm 800 according to the second embodiment of the present disclosure includes a main body 801, a base link 802, a yaw driving part 805, a first link 811, a second link 812, a third link 813, a fourth link 814, and a fifth link 815. In some embodiments, the surgical robot arm 800 according to the fifth embodiment of the present disclosure further includes a motion guide assembly 860, and the motion guide assembly 860 includes a first auxiliary link 861, a second auxiliary link 862, a third auxiliary link 863, and a fourth auxiliary link 864. In some embodiments, the surgical robot arm 800 according to the fifth embodiment of the present disclosure further includes the setup link assembly 890. In some embodiments, like the first embodiment of FIG. 2, the surgical robot arm 800 of the present embodiment may include a first joint (refer to 121 of FIG. 7), a second joint (refer to 122 of FIG. 7), a third joint (refer to 123 of FIG. 7), a fourth joint (refer to 124 of FIG. 7), and a fifth joint (refer to 125 of FIG. 7).

In this regard, the surgical robot arm 800 according to the fifth embodiment of the present disclosure further includes the setup link assembly 890. In other words, the surgical robot arm 800 further includes the setup link assembly 890, which is formed between the main body 801 and the base link 802, interconnects the main body 801 and the base link 802, and enables the base link 802 (and links connected thereto) to move in the horizontal direction or the vertical direction with respect to the main body 801, thereby facilitating setup positioning of the setup link assembly 890. Detailed descriptions thereof will be given below.

In detail, the setup link assembly 890 may include a vertical setup link 891 and one or more horizontal setup links 892, 893, and 894.

The vertical setup link 891 is connected to the main body 801 and is formed to be movable in the Z-axis direction with respect to the main body 801.

In this regard, a guide groove 811 is formed in the main body 801 in the vertical direction, and the vertical setup link 891 may linearly move up and down in the direction indicated by an arrow A along the guide groove 811.

Meanwhile, the setup link assembly 890 may include a first horizontal setup link 892, a second horizontal setup link 893, and a third horizontal setup link 894. The first horizontal setup link 892 is axially coupled to the vertical setup link 891 to be rotatable with respect to the vertical setup link 891. The second horizontal setup link 893 is axially coupled to the first horizontal setup link 892 to be rotatable with respect to the first horizontal setup link 892. One end of the third horizontal setup link 894 is axially coupled to the second horizontal setup link 893 to be rotatable with respect to the second horizontal setup link 893. In some embodiments, a pitch positioning joint 895 to be described later and the base link 802 connected thereto are formed at the other end of the third horizontal setup link 894. In this regard, the rotation axis of each of the one or more horizontal setup links 892, 893, and 894 may be parallel to the Z-axis. In other words, the one or more horizontal setup links 892, 893, and 894 may rotate on the XY plane.

As such, since the setup link assembly 890 includes the one or more horizontal setup links 892, 893, and 894, the base link 802 connected to the setup link assembly 890 may be deployed at various setup positions on the XY plane.

Meanwhile, the setup link assembly 890 may further include the pitch positioning joint 895. In some embodiments, the pitch positioning joint 895 may further include a pitch positioning base 896 and a pitch positioning axis 897. The pitch positioning base 896 is coupled to one end of the third horizontal setup link 894. In some embodiments, the pitch positioning base 896 and the base link 802 may be coupled to be rotatable around a second pitch axis P2 by the pitch positioning axis 897. In this regard, the pitch positioning axis 897 or the second pitch axis P2 may be substantially parallel to the pitch axis P or the rotation axis of the second joint (refer to 122 of FIG. 7).

In other words, as shown in FIG. 40, as the base link 802 rotates with respect to the pitch positioning base 896 around the pitch positioning axis 897, setup in the direction of the second pitch axis P2 may be further performed.

Meanwhile, although the drawings show that the vertical setup link 891 is connected to the main body 801 and the horizontal setup links 892, 893, and 894 are connected to the vertical setup link 891, the present disclosure is not limited thereto. In other words, a configuration in which a horizontal setup link is connected to the main body 801 and a vertical setup link is connected to the horizontal setup link is also possible. Alternatively, it is possible to provide any one of a vertical setup link or a horizontal setup link only. Alternatively, various configurations and arrangements of horizontal setup links and vertical links may be possible, such as a configuration in which a vertical setup link is arranged in the middle of a plurality of horizontal setup links.

In this regard, the setup link assembly 890 may be formed to operate only during a setup period in which the surgical robot arm 800 is placed at an appropriate position on one side of a patient before the surgical robot arm 800 actually starts a surgery and maintain a fixed state without moving while the surgical robot arm 800 is performing a surgery after deployment of the robot arm 800 is completed. To this end, although not shown in the drawing, the setup link assembly 890 may further include a brake module (not shown) capable of maintaining a stationary state and a manipulation member (not shown) capable of selecting activated state/deactivated state of the brake module.

In this way, the setup link assembly 890 may be provided to facilitate the setup positioning of the surgical robot arm 800.

As such, the present disclosure has been described with reference to one embodiment shown in the drawings, but this is merely exemplary, and those skilled in the art will understand that various modifications and variations of the embodiment are possible therefrom. Therefore, the true technical scope of protection of the present disclosure should be determined by the technical spirit of the appended claims.

INDUSTRIAL APPLICABILITY

The present disclosure is applicable to a surgical robot arm, and more particularly, to a minimally invasive surgical robot arm formed in a modular form to be used in laparoscopic surgery or various other surgeries.

The invention claimed is:

1. A surgical robot arm comprising:
a main body; a first link connected to the main body;
a second link axially coupled to the first link to be rotatable around a second joint with respect to the first link;
a third link axially coupled to the second link to be rotatable around a third joint with respect to the second link;
a fourth link axially coupled to the third link to be rotatable around a fourth joint with respect to the third link;
a fifth link is axially coupled to the fourth link to be rotatable around a fifth joint with respect to the fourth link,
wherein a remote center of motion (RCM) is formed at a remaining vertex of a parallelogram whose the other vertices correspond to the second joint, the fourth joint, and the fifth joint;
a motion guide assembly interconnecting the second link, the third link, and the third joint, wherein,
in a first motion mode of the motion guide assembly, the second link and the third link integrally rotate together around the second joint such that an RCM motion is performed in which the fifth link rotates around the RCM, and,
in a second motion mode of the motion guide assembly, the third link rotates with respect to the second link around the third joint such that a translation motion in which the fifth link moves along a roll axis is performed.

2. The surgical robot arm of claim 1, wherein,
in the first motion mode, when the motion guide assembly maintains its shape and rotates around the second joint, the second link and the third link integrally rotate together around the second joint, and,
in the second motion mode, when the third link rotates with respect to the second link, the shape of the motion guide assembly changes.

3. The surgical robot arm of claim 2, wherein the motion guide assembly comprises:
a first auxiliary link axially coupled to a region of the second link and to be rotatable with respect to the second link;
a second auxiliary link axially coupled to a region of the third link and to be rotatable with respect to the third link; and
a fourth auxiliary link fixedly coupled to the third joint, rotating together with the third joint, and connected to each of the first auxiliary link and the second auxiliary link.

4. The surgical robot arm of claim 3, wherein an angle formed by an extension line of the first auxiliary link and an extension line of the fourth auxiliary link and an angle formed by an extension line of the second auxiliary link and the extension line of the fourth auxiliary link are always identical to each other.

5. The surgical robot arm of claim 3, wherein, when the second link and the third link integrally rotate together around the second joint,
an angle formed by an extension line of the first auxiliary link and an extension line of the fourth auxiliary link is maintained constant.

6. The surgical robot arm of claim 3, wherein, when the third link rotates with respect to the second link,
the angle formed by the extension line of the first auxiliary link and the extension line of the fourth auxiliary link changes.

7. The surgical robot arm of claim 3, wherein, when the second link rotates at the same angle as the fourth auxiliary link,
the motion guide assembly comprising the fourth auxiliary link rotates around the second joint while maintaining its shape, and
the second link and the third link integrally rotate together around the second joint.

8. The surgical robot arm of claim 3, wherein, when the second link rotates with respect to the fourth link,
the first auxiliary link and the second auxiliary link rotate with respect to the fourth auxiliary link, and
the third link rotates with respect to the second link due to a rotation of the second auxiliary link.

9. The surgical robot arm of claim 1, wherein, during the RCM motion, while the second link and the fifth link maintain a state of being parallel to each other, a distance between the second joint and the fourth joint is maintained constant.

10. The surgical robot arm of claim 1, wherein, during the translation motion, while the second link and the fifth link maintain a state of being parallel to each other, a distance between the second joint and the fourth joint changes.

11. The surgical robot arm of claim 1, wherein, during the translation motion,
the fourth link moves in parallel while an extension line interconnecting the second joint and the RCM and the fourth link remain parallel to each other.

12. The surgical robot arm of claim 1, wherein a position of the RCM is maintained constant regardless of rotation of the second link.

13. The surgical robot arm of claim 1, wherein, in any motion state of the surgical robot arm,
the second link and the fifth link maintain a state of being parallel to each other, and
the extension line interconnecting the second joint and the RCM and the fourth link maintain a state of being parallel to each other.

14. The surgical robot arm of claim 1, wherein, during the translation motion, the second link and the third link rotate together around the third joint.

15. The surgical robot arm of claim 14, wherein, during the translation motion, the second link and the third link rotate by a same angle around the third joint.

16. The surgical robot arm of claim 1, further comprising:
a base link formed on one side of the main body; and
a yaw driving part coupled to the base link and configured to yaw-rotate around the yaw axis with respect to the base link,
wherein the first link is fixedly coupled to the yaw driving part around the first joint.

17. The surgical robot arm of claim 16, wherein an extension line interconnecting the second joint and the RCM and the yaw axis are formed to be different from each other.

18. The surgical robot arm of claim 16, wherein the RCM is located on an extension of the yaw axis.

19. The surgical robot arm of claim 1, wherein the third link, the fourth link, and the fifth link are formed to be offset to a certain degree in a direction of their own rotation axes.

20. The surgical robot arm of claim 1, wherein the surgical robot arm further comprises:
a base link formed on one side of the main body; and
a setup link assembly formed between the main body and the base link and interconnecting the main body and the base link.

21. The surgical robot arm of claim 20, wherein the setup link assembly comprises
a vertical setup link that interconnects the main body and the base link and formed to be movable in a Z-axis direction with respect to the main body.

22. The surgical robot arm of claim 20, wherein the setup link assembly comprises
one or more horizontal setup links that interconnect the main body and the base link and formed to be rotatable around an Z-axis direction with respect to the main body.

23. The surgical robot arm of claim 20, wherein the setup link assembly comprises a pitch positioning joint that interconnects the main body and the base link, and is formed to be rotatable with respect to the base link around an axis substantially parallel to a rotation axis of the third joint.

24. The surgical robot arm of claim 20, wherein the setup link assembly is formed to be operable only during a setup period in which the surgical robot arm is deployed at an appropriate position on one side of a patient.

* * * * *